(12) United States Patent
Yao

(10) Patent No.: US 12,510,637 B2
(45) Date of Patent: Dec. 30, 2025

(54) SCAN-LESS 3D OPTICAL SENSING DEVICES AND ASSOCIATED LIDAR BASED ON STACKING OF INTEGRATED PHOTONIC CHIPS, WAVELENGTH DIVISION DEMULTIPLEXING AND POSITION-TO-ANGLE CONVERSION OF A LENS

(71) Applicant: Xiaotian Steve Yao, Las Vegas, NV (US)

(72) Inventor: Xiaotian Steve Yao, Las Vegas, NV (US)

(\*) Notice: Subject to any disclaimer, the term of this patent is extended or adjusted under 35 U.S.C. 154(b) by 984 days.

(21) Appl. No.: 17/513,779

(22) Filed: Oct. 28, 2021

(65) Prior Publication Data

US 2022/0050187 A1 Feb. 17, 2022

Related U.S. Application Data

(63) Continuation-in-part of application No. 16/279,586, filed on Feb. 19, 2019, now Pat. No. 11,650,296.
(Continued)

(51) Int. Cl.
| | | |
|---|---|---|
| *G01S 7/4865* | (2020.01) | |
| *G01S 7/481* | (2006.01) | |
| *G01S 7/484* | (2006.01) | |
| *G01S 17/89* | (2020.01) | |
| *G01S 17/931* | (2020.01) | |
| *G02B 3/04* | (2006.01) | |
| *G02B 6/12* | (2006.01) | |

(Continued)

(52) U.S. Cl.
CPC ......... *G01S 7/4865* (2013.01); *G01S 7/4814* (2013.01); *G01S 7/4816* (2013.01); *G01S 7/484* (2013.01); *G01S 17/89* (2013.01); *G01S 17/931* (2020.01); *G02B 3/04* (2013.01); *G02B 6/12019* (2013.01); *G02B 7/02* (2013.01); *G02B 27/4244* (2013.01); *G02B 6/2938* (2013.01)

(58) Field of Classification Search
CPC ...... G01S 17/89; G01S 7/4817; G01S 7/4818; G02B 6/12019; G02B 6/2938
See application file for complete search history.

(56) References Cited

U.S. PATENT DOCUMENTS

| | | |
|---|---|---|
| 5,359,409 A | 10/1994 | Wildnauer et al. |
| 5,723,856 A | 3/1998 | Yao et al. |

(Continued)

FOREIGN PATENT DOCUMENTS

WO 2019161388 A1 8/2019

OTHER PUBLICATIONS

Zhaowen Xu et al. "Characteristics of Subcarrier Modulation and Its Application in WDM-PONs, Journal of Lightwave Technology, vol. 27, No. 12, Jun. 15, 2009" (Year: 2009).*

(Continued)

*Primary Examiner* — Yuqing Xiao
*Assistant Examiner* — Jempson Noel
(74) *Attorney, Agent, or Firm* — Perkins Coie LLP

(57) ABSTRACT

Disclosed is devices and techniques for 3D LiDAR sensing without beam scanning with moving parts or 2D optical imaging based on the combination of a lens' position-to-angle conversion and the wavelength division multiplexing/demultiplexing (WDM) in the output probe light for LiDAR sensing. This 3D LiDAR sensing can be implemented on stacked photonic integrated chips to provide.

12 Claims, 30 Drawing Sheets

Related U.S. Application Data

(60) Provisional application No. 63/106,798, filed on Oct. 28, 2020, provisional application No. 62/710,577, filed on Feb. 16, 2018.

(51) Int. Cl.
  G02B 6/293 (2006.01)
  G02B 7/02 (2021.01)
  G02B 27/42 (2006.01)

(56) References Cited

U.S. PATENT DOCUMENTS

| | | | |
|---|---|---|---|
| 5,777,778 | A | 7/1998 | Yao |
| 5,917,179 | A | 6/1999 | Yao |
| 5,929,430 | A | 7/1999 | Yao et al. |
| 6,387,197 | B1 | 5/2002 | Bewley et al. |
| 6,417,957 | B1 | 7/2002 | Yao |
| 6,476,959 | B2 | 11/2002 | Yao |
| 6,487,336 | B1 | 11/2002 | Yao |
| 6,567,436 | B1 | 5/2003 | Yao et al. |
| 6,580,532 | B1 | 6/2003 | Yao et al. |
| 6,778,739 | B1* | 8/2004 | Jerphagnon ........ G02B 6/12011 398/48 |
| 6,795,481 | B2 | 9/2004 | Maleki et al. |
| 6,873,631 | B2 | 3/2005 | Yao et al. |
| 7,061,657 | B1 | 6/2006 | Fishman et al. |
| 9,689,968 | B2 | 6/2017 | Zou et al. |
| 9,823,118 | B2* | 11/2017 | Doylend ................ G01S 7/484 |
| 10,838,047 | B2 | 11/2020 | Chong |
| 2003/0160148 | A1 | 8/2003 | Yao et al. |
| 2007/0233396 | A1 | 10/2007 | Tearney et al. |
| 2008/0074640 | A1 | 3/2008 | Walsh et al. |
| 2012/0206712 | A1* | 8/2012 | Chang .................. G01S 17/87 356/28 |
| 2015/0345950 | A1* | 12/2015 | Yao ...................... G01C 19/721 356/365 |
| 2017/0155225 | A1 | 6/2017 | Villeneuve et al. |
| 2017/0184450 | A1 | 6/2017 | Doylend et al. |
| 2017/0307648 | A1 | 10/2017 | Kotake et al. |
| 2018/0224547 | A1 | 8/2018 | Crouch et al. |
| 2018/0306925 | A1 | 10/2018 | Hosseini et al. |
| 2019/0204419 | A1 | 7/2019 | Baba et al. |
| 2019/0219779 | A1* | 7/2019 | Beresnev ................ G02B 6/32 |
| 2019/0250253 | A1 | 8/2019 | Hung et al. |
| 2019/0257927 | A1 | 8/2019 | Yao |
| 2019/0265574 | A1 | 8/2019 | Skirlo et al. |
| 2019/0353977 | A1 | 11/2019 | Hung |
| 2020/0241119 | A1 | 7/2020 | Asghari et al. |
| 2020/0400822 | A1 | 12/2020 | Ando et al. |
| 2022/0011643 | A1 | 1/2022 | Shrestha et al. |
| 2022/0121080 | A1 | 4/2022 | Yao |
| 2022/0229162 | A1 | 7/2022 | Tsadka |
| 2022/0365214 | A1 | 11/2022 | Sandborn et al. |
| 2023/0152525 | A1 | 5/2023 | Hosseini et al. |
| 2023/0168560 | A1 | 6/2023 | Mcmanamon et al. |

OTHER PUBLICATIONS

Tae-Jong Baek et al. "A 94-GHz Receiver Front End for Passive Millimeter-Wave Imaging. Proceedings of the 7th European Radar Conference Sep. 30-Oct. 1, 2010, Paris, France" (Year: 2010).*
LiDAR drives forwards, Nature Photon 12, 441 (2018).
Lee, Benjamin G., et al., Silicon Photonic Switch Fabrics: Technology and Architecture, J. Lightwave Technology, 37 (1), 2018.
Amann, Markus-Christian, et al., "Laser ranging: a critical review of usual techniques for distance measurement," Opt. Eng. 40(1), 10-19 (2001).
Chang, Lin, et al., "Ultra-efficient frequency comb generation in AlGaAs-on-insulator microresonators," Nat. Commun. 11, 1331 (2020).
Choi, Jaebum, et al., "Multi-target tracking using a 3D-Lidar sensor for autonomous vehicles," 16th International IEEE Conference on Intelligent Transportation Systems (ITSC 2013), The Hague, 2013, pp. 881-886.
Diddams, Scott A., et al., "Optical frequency combs: Coherently uniting the electromagnetic spectrum," Science, 369 (6501), eaay3676 (2020).
Duan, P., et al., "Chip-to-chip interconnects based on 3D stacking of optoelectrical dies on Si," Proc. SPIE 8267, Optoelectronic Interconnects XII, 82670U (2012).
Feneyrou, P., et al., "Frequency-modulated multifunction lidar for anemometry, range finding, and velocimetry-1. Theory and signal processing," Appl. Opt. 56, 9663-9675 (2017).
Heck, Martijn J.R., "Highly integrated optical phased arrays: photonic integrated circuits for optical beam shaping and beam steering," De Gruyer, Nanophotonics 2016.
Hibino, Yoshinori, "Recent advances in high-density and large-scale AWG multi/demultiplexers with higher index-contrast silica-based PLCs," IEEE J. Select. Topics Quantum Electron, 8(6), 1090-1101 (2002).
Holmström, Sven T. S., et al., "MEMS laser scanners: a review," J. Microelectromech. Syst., 23(2), 259-275(2014).
International Search Report and Written Opinion mailed May 24, 2019 for International Patent Application No. PCT/US2019/018585.
Jiang, Yunshan, et al., "Time-stretch LiDAR as a spectrally scanned time of-flight ranging camera," Nat. Photon. 14, 14-18(2020).
Jingye, Chen, et al., "Research progress in solid-state LiDAR," Opto-Electronic Engineering, 46(7), 190218, (2019).
Jirauschek, Christian, et al., "A theoretical description of Fourier domain mode locked lasers," Opt. Express 17, 24013-24019 (2009).
Johnson, Steven, et al., "Analysis of Geiger-mode APD laser radars," Proc. SPIE 5086, Laser Radar Technology and Applications VIII, (2003).
Karpf, Sebastian, et al., "Fourier-domain mode-locked laser combined with a master-oscillator power amplifier architecture," Opt. Lett. 44, 1952-1955 (2019).
Kimoto, Katsumi, et al., "Development of small size 3D LIDAR," IEEE International Conference on Robotics and Automation (ICRA), Hong Kong, 2014, pp. 4620-462.
Konoike, R., et al., "SOA-Integrated silicon photonics switch and its lossless multistage transmission of high-capacity WDM signals," J Lightwave Technol, 37(1), 123-130 (2019).
Lalonde, Jean-Francois, et al., "Natural terrain classification using three-dimensional ladar data for ground robot mobility," J. Field Robot. 23, 839-861 (2006).
Lin, Yi, et al., "Mini-UAV-Borne LIDAR for fine-scale mapping," IEEE Geosci. Remote Sens. Lett. 8(3), 426-430, (2011).
MacDonald, R. I. "Frequency domain optical reflectometer," Appl. Opt. 20, 1840-1844 (1981).
McManamon, Paul F., et al., "Comparison of flash lidar detector options," Opt. Eng. 56(3), 031223 (2017).
Mizumoto, T., et al., "Verification of waveguide-type optical circulator operation," Electronics Letters, 26(3), 199-200 (1990).
Moss, Robert, et al., "Low-cost compact MEMS scanning ladar system for robotic applications," Proc. SPIE 8379, Laser Radar Technology and Applications XVII, 837903 (2012).
Nguyen, Nam-Trung, "Micro-optofluidic lenses: a review," Biomicrofluidics, 4(3), 031501 (2010).
Okano, Masayuki, et al., "Swept Source Lidar: simultaneous FMCW ranging and nonmechanical beam steering with a wideband swept source," Opt. Express 28, 23898-23915 (2020).
Poulton, Christopher V., et al., "Coherent solid-state LIDAR with silicon photonic optical phased arrays," Opt. Lett. 42, 4091-4094 (2017).
Raja, Arslan S., et al., "Electrically pumped photonic integrated soliton microcomb," Nat Commun 10, 680 (2019).
Shen, Boqiang, et al., "Integrated turnkey soliton micro combs," Nature 582, 365-369 (2020).
Sugimoto, N., et al., "Waveguide polarization-independent optical circulator," IEEE Photon. Technol. Lett. 11, 355-357 (1999).
Svelto, Orazio "Principles of Lasers", Ray and wave propagation through optical media, 5th ed. (Springer-Verlag US 2010), 150-161.
Tateda, Mitsuhiro, et al., "Advances in optical time-domain reflectometry," J. Lightwave Technol, 7(8), 1217-1224(1989).

(56) References Cited

OTHER PUBLICATIONS

Tyler, Nicola A., et al., "SiN integrated optical phased arrays for two-dimensional beam steering at a single near-infrared wavelength," Opt. Express 27, 5851-5858 (2019).
Wang, Jian, et al., "On-chip silicon photonic signaling and processing: a review," Sci. Bull., 63(19), 1267-1310 (2018).
Whyte, Refael, et al., "Application of lidar techniques to time-of-flight range imaging," Appl. Opt. 54, 9654-9664 (2015).
Yang, Ki Youl, et al., "Inverse-designed non-reciprocal pulse router for chip-based LiDAR," Nat. photonics 14, 369-374 (2020).
Yao, X. Steve, et al., "Coupled opto-electronic oscillators for generating both RF signals and optical pulses," J. of Lightwave Tech., 18, 73 (2000).
Yoo, H. W., et al., "MEMS-based lidar for autonomous driving," Elektrotech. Inftech. 135, 408-415 (2018).
Zadka, Moshe, et al., "On-chip platform for a phased array with minimal beam divergence and wide field-of-view," Opt. Express 26, 2528-2534 (2018).
Zhou, Guoqing, et al., "Flash Lidar sensor using fiber-coupled APDs," IEEE Sensors Journal, 15(9), 4758-4768 (2015).

* cited by examiner

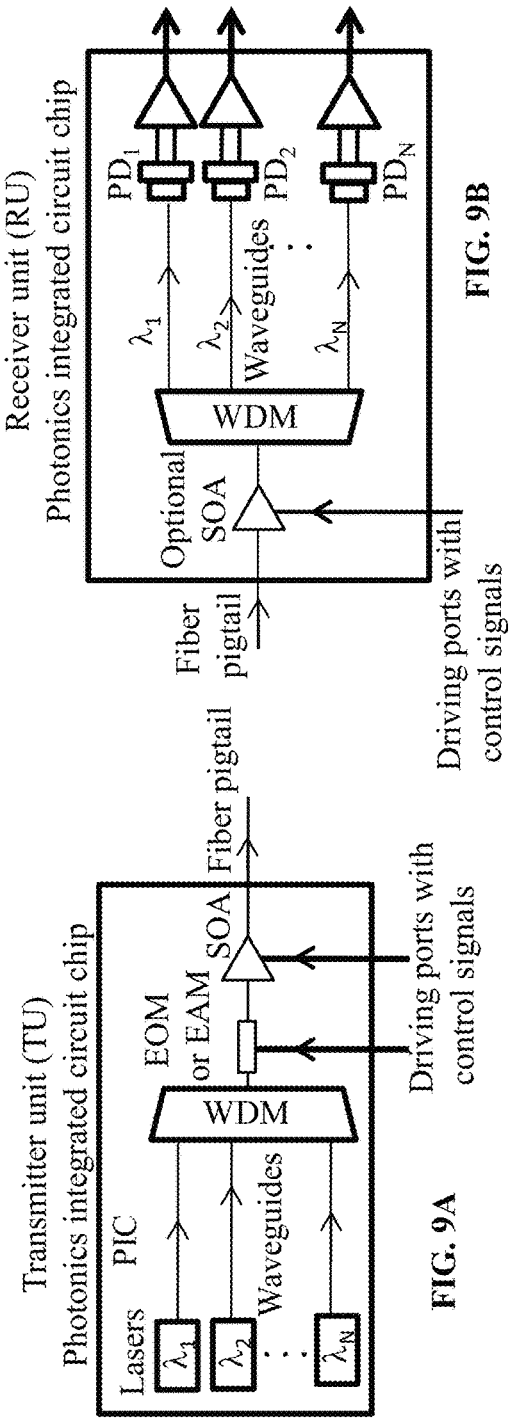
FIG. 9A
FIG. 9B
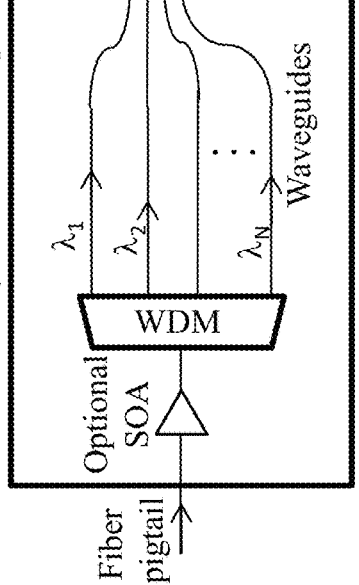
FIG. 9C
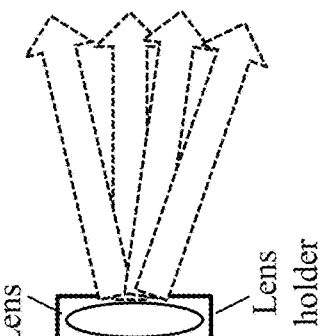
FIG. 9D

SCAN-LESS 3D OPTICAL SENSING DEVICES AND ASSOCIATED LIDAR BASED ON STACKING OF INTEGRATED PHOTONIC CHIPS, WAVELENGTH DIVISION DEMULTIPLEXING AND POSITION-TO-ANGLE CONVERSION OF A LENS

PRIORITY CLAIMS AND RELATED PATENT APPLICATIONS

This patent document timely claims priority to and benefits of U.S. Patent Application No. 63/106,798 entitled "A scan-less 3D optical sensing and associated LiDAR based on stacking of integrated photonic chips, wavelength division demultiplexing and position-to-angle conversion of a lens" and filed on Oct. 28, 2020.

This patent document is also a continuation-in-part application of U.S. application Ser. No. 16/279,586 entitled "OPTICAL SENSING BASED ON WAVELENGTH DIVISION MULTIPLEXED (WDM) LIGHT AT DIFFERENT WAVELENGTHS IN LIGHT DETECTION AND RANGING LIDAR SYSTEMS" and filed on Feb. 19, 2019, which is published as U.S. Patent Application Publication No. US 20190257927 A1 on Aug. 22, 2019. U.S. application Ser. No. 16/279,586 further timely claims the priority to and benefits of U.S. Provisional Patent Application No. 62/710,577 entitled "OPTICAL SENSING BASED ON WAVELENGTH DIVISION MULTIPLEXED (WDM) LIGHT AT DIFFERENT WAVELENGTHS IN LIGHT DETECTION AND RANGING LIDAR SYSTEMS" and filed Feb. 16, 2018.

The entire content of the before-mentioned patent applications is incorporated by reference as part of the disclosure of this patent document.

TECHNICAL FIELD

This patent document is directed to techniques, devices and applications for scanning an optical beam.

BACKGROUND

Optical scanning of light is used in various optical devices and systems. Applications based on three dimensional (3D) optical sensing use optical scanning to scan probe light to a desired target area. Various light detection and ranging (LiDAR) systems are 3D optical sensing and is used a wide range of applications, including autonomous vehicles, unmanned aerial vehicles (UAV), robotics, industrial automation, 3D reality capturing, and aerial mapping due to its high spatial and angular resolution not attainable with Radar systems.

SUMMARY

The technology disclosed in this patent document can be implemented to provide novel 3D sensing or LiDAR designs without the need for beam scanning with moving parts or 2D optical imaging. Such implementations can be enabled by the combination of a lens' position-to-angle conversion and the wavelength division multiplexing/demultiplexing (WDM) commonly used in optical fiber communication systems. Unlike in a WDM system for optic fiber communication applications where light at different wavelengths is modulated to carry different data channels, the light beams of different WDM wavelengths in the disclosed devices or systems are demultiplexed into different waveguides or fibers with their exiting end facets placed in the focal plane of the lens. This optical arrangement converts the exiting lights into beams of different angles to form a 1D or 2D beam array according to the relative position of the fiber/waveguide end facets with respect to the optical axis of the lens for illuminating the targets and finally sensing the light reflected from different directions. The returned signals are then demultiplexed into different photodetectors to determine the distances of the reflections in different directions. This design can be implemented in photonics integrated circuit (PIC) for low cost production. Preliminary tests were successfully demonstrated the operation of the scheme with the off-the-shelf discrete fiber optic components using different WDM channels and time-of-flight (ToF) technique for distance measurement, showing scalability to a large number of WDM channels, e.g., hundreds of WDM wavelength channels from a photonic integrated microcomb. The disclosed technology enable improving the angular resolution of the beam array of different wavelengths by dithering the fiber array or the lens. The disclosed technology provides an attractive alternative to the MEMS and optical phased array based beam scanning and can be explored further to enable low cost and high speed 3D sensing, particularly Lidar systems.

In one aspect, the disclosed technology can be implemented to provide a light detection and ranging (LiDAR) device that includes a plurality of different photonic chips formed on separate substrates, respectively, wherein the different photonic chips are engaged and stacked with one another and each photonic chip carries laser light at different laser wavelengths; and a lens spaced from the different photonic chips and shared by the different photonic chips to receive light from the different photonic chips and to direct returned light back to the different photonic chips. Each photonic chip includes an optical circulator or coupler supported by a corresponding substrate to receive an optical beam of laser light at different laser wavelengths and redirect the optical beam; a first wavelength division demultiplexing device supported by the substrate to receive the optical beam from the optical circulator or coupler and to separate the received optical beam into different optical beams at the different laser wavelengths, respectively; and an array of optical waveguides supported by the substrate and structured to include first waveguide ports, respectively, which are coupled to receive the different optical beams at the different laser wavelengths, respectively, from the first wavelength division demultiplexing device, and second waveguide ports, respectively, which output the different optical beams at the different laser wavelengths received by the optical waveguides as different output optical beams at the different laser wavelengths, respectively. Each optical waveguide is designed to carry light at a designated laser wavelength of the different laser wavelengths. The lens shared by the different photonic chips is spaced from the second waveguide ports by a distance equal to or near a focal length of the lens to receive the different output optical beams at the different laser wavelengths, respectively, to direct each output optical beam to a unique beam direction based on a position of a corresponding second waveguide port of the each waveguide relative to the lens so that each output optical beam directed from each of the differently located second waveguide ports is directed by the lens to a different direction after passing through the lens, wherein the lens is further operable to receive and direct returned light at the different laser wavelengths to the second waveguide ports, respectively, so that each waveguide used to carry a designated laser wavelength is to receive and direct a returned optical beam at the same designated laser wavelength to the first wavelength division demultiplexing device which combines different returned optical beams at the different laser wavelengths as a combined returned beam of light at the different laser wavelengths to the optical circulator or coupler. The device includes a second wavelength division demultiplexing device supported by the substrate and located relative to the optical circulator or coupler to receive the combined returned beam from the optical circulator or coupler and operable to separate the combined returned beam into different returned optical beams at the different laser wavelengths, respectively; and an optical detector array of photodetectors supported by the substrate and coupled to receive the different returned optical beams at the different laser wavelengths from the second wavelength division demultiplexing device, respectively, to produce different detector output signals from the different returned optical beams at the different laser wavelengths for optical sensing.

In another aspect, the disclosed technology can be implemented to provide a device that includes a substrate; an optical circulator or coupler supported by the substrate to receive an optical beam that includes laser light at different laser wavelengths and re-direct the optical beam; a first wavelength division demultiplexing device supported by the substrate to receive the optical beam from the optical circulator or coupler and to separate the received optical beam into different optical beams at the different laser wavelengths, respectively; and an array of optical waveguides supported by the substrate and structured to include first waveguide ports, respectively, which are coupled to receive the different optical beams at the different laser wavelengths, respectively, from the first wavelength division demultiplexing device, and second waveguide ports, respectively, which output the different optical beams at the different laser wavelengths received by the optical waveguides as different output optical beams at the different laser wavelengths, respectively. Each optical waveguide is designed to carry light at a designated laser wavelength of the different laser wavelengths. This device includes a lens spaced from the second waveguide ports by a distance equal to or near a focal length of the lens to receive the different output optical beams at the different laser wavelengths, respectively, to direct each output optical beam to a unique beam direction based on a position of a corresponding second waveguide port of the each waveguide relative to the lens so that each output optical beam directed from each of the differently located second waveguide ports is directed by the lens to a different direction after passing through the lens. The lens is further operable to receive and direct returned light at the different laser wavelengths to the second waveguide ports, respectively, so that each waveguide used to carry a designated laser wavelength is to receive and direct a returned optical beam at the same designated laser wavelength to the first wavelength division demultiplexing device which combines different returned optical beams at the different laser wavelengths as a combined returned beam of light at the different laser wavelengths to the optical circulator or coupler. The device also includes a second wavelength division demultiplexing device supported by the substrate and located relative to the optical circulator or coupler to receive the combined returned beam from the optical circulator or coupler, and operable to separate the combined returned beam into different returned optical beams at the different laser wavelengths, respectively; and an optical detector array of photodetectors supported by the substrate and coupled to receive the different returned optical beams at the different laser wavelengths from the second wavelength division demultiplexing device, respectively, to produce different detector output signals from the different returned optical beams at the different laser wavelengths for optical sensing.

Those and other aspects, features and implementations of the disclosed technology are described in greater detail in the drawings, the description and the claims.

BRIEF DESCRIPTION OF DRAWINGS

FIG. 9A shows an example of a multi-wavelength transmitter integrated in a photonics integrated circuit (PIC) for using in FIG. 2 and FIG. 6. FIG. 9B Illustration of a multi-wavelength receiver integrated in a photonics integrated circuit (PIC) for using in FIGS. 2, 3, 4, 6, 7, 8.

FIG. 9C shows an example of a first embodiment of the beam forming unit integrated on a PIC chip.

FIG. 9D shows an example of a second embodiment of the beam forming unit integrated on a PIC chip.

FIG. 18 shows an example of a scan-less 3D sensing/LiDAR chip made with photonics integrated circuit technology based on the disclosed technology, wherein

FIG. 20 shows an experimental setup for testing the WDM beam forming device in FIG. 17A and the 3D sensing/LiDAR in FIG. 19.

FIG. 22B shows examples of echo signals from the four toy cars as placed in FIG. 22A. Insets in FIG. 22B show the 2×2 sub-array activated with 4 wavelengths in a 5×8 fiber array.

FIG. 22D shows examples of echo signals from the four toy cars as placed in FIG. 22C. Insets in FIG. 22C show the 2×2 sub-array activated with 4 wavelengths in a 5×8 fiber array.

FIG. 23B shows examples of experimental results of improving vertical angular resolution by the micro-stepping motion. Center picture insert in FIG. 23B shows the 2×2 sub-array (yellow circles) moving downward, together with the 5×8 array. Arrows and dots on the two sides show the corresponding directions and vertical angles of the beam motion for each translation stage step.

DETAILED DESCRIPTION

Figure 1:
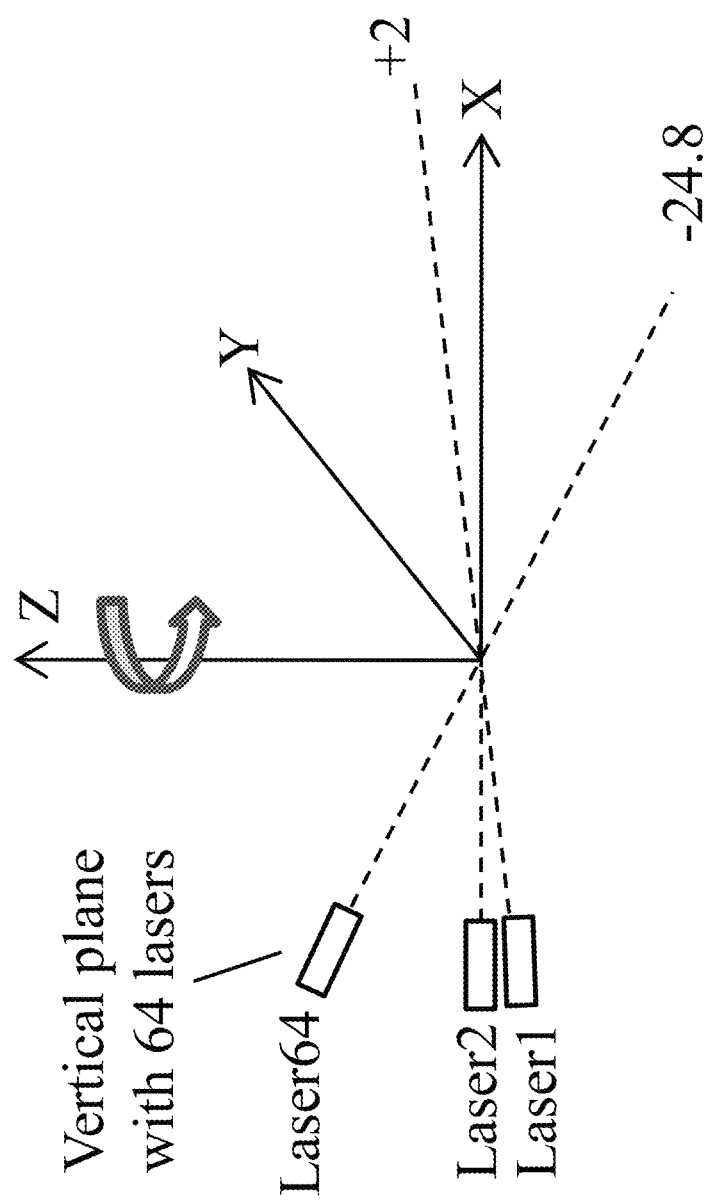
FIG. 1 shows an example of a conventional light detection and ranging (LiDAR) system using 64 lasers pointing at different directions to get 26.8 degrees FOV in the XZ plane. The whole assembly rotates around Z axis to get full 360 azimuth FOV.

A typical 3D sensing/Lidar system generally performs two major functions, one is ranging by measuring the distance of a light reflecting object from the system (the z coordinate), which can be accomplished using the optical time domain reflectometry (OTDR) technique (commonly referred to as time-of-flight (TOF) LiDAR), and the optical frequency domain reflectometry (OFDR) technique (often referred to as chirped Lidar, coherence Lidar or frequency-modulated continuous wave (FMCW) Lidar). The other function is beam forming by to illuminating the surrounding space either sequentially or parallel to enable the system to identify the angular direction of the beam reflected by the object for determining its transverse spatial location (the x and y coordinates). The early adopted sequential beam forming techniques, including the 360-degree rotation of the optical beam by a motor and the 1D and 2D vibrating mirrors, are based mechanical motions and suffer from wear and tear, relatively low scanning rate, large size and high cost. MEMS based 2D scanning mirror were later developed with much smaller size and lower cost. Finally, an optical phase array (OPA) with photonics integrated circuit was developed to enable 2D beam scan with potentially low cost and high speed without any mechanical motion. However, a major issue associated with OPA is the small beam size or large beam divergence angle, which limits the sensing distance. In addition, the precise control of the relative phases of hundreds of the array elements is a challenge, compromising the beam quality (with large side lobes) and pointing accuracy if not precisely controlled.

Beam forming with no moving parts (inertia-free) is desirable for fast imaging and immunity against vibration in part because moving parts are subject to response limitations for high speed scanning and are prone to device failures due to device wear and tear caused by the motion. For this reason, a scan-less 3D sensing/Lidar was developed by a team at M.I.T., which used a silicon Geiger-mode avalanche photodiode (APD) array with an integrated timing circuitry for each pixel, to build 3D Lidar. This flash imaging Lidar is a laser-based 3-D imaging system in which a large area is illuminated by each laser pulse and a focal plane array (FPA) is used to simultaneously detect light from thousands of adjacent directions. However, because in this scheme a larger number of pixels must be simultaneously illuminated, much higher laser power is required as compared to a beam scanning systems to attain the same return signal power due to the spreading of the laser power over the entire field of view (FOV).

A time-stretch Lidar can be designed to use a broadband source (from a gain-switched supercontinuum laser) or a Fourier Domain Mode-Locked Laser (FDML) was spectro-temporally modulated into a train of discrete pulses with varying central wavelengths. The spectro-temporally multiplexed pulses are diffracted in space to discrete collimated beams so that different wavelengths illuminate targets in different angles at the beginning of each corresponding time window. The returned spectro-temporal echoes are received by a single-pixel detector with internal gain and digitally processed to recover the depth image. The spectro-temporal encoding eliminates the ambiguity of mapping between time, wavelength and lateral position in spectral Lidar imaging, as well as permits single-pixel detection and demodulation without a spectrometer. The disadvantage is that greater laser pulse energy is required to simultaneously illuminate over the entire FOV. Meanwhile, the returned spectro-temporal echoes are received by a single-pixel, which may limit the imaging speed.

This patent document discloses a novel scheme for 3D sensing/Lidar without the need for beam scan or 2D photo-detection by utilizing wavelength division demultiplexing (WDM) and position-to-angle conversion of a lens. Instead of using different wavelengths to carry different signal channels as in an optical fiber WDM communication system, here beams of different wavelengths are demultiplexed into different fibers or waveguides with their exiting ends forming an array, which is placed on the focal plane of a collimating lens. The light from each fiber or waveguide in the array will be collimated to point at a particular direction according to its relative position with respect to the optical axis of the lens. Collectively, lights from all the fibers or waveguides in the array form a 1D or 2D beam array pointing at different directions for sensing the light reflected from these directions. The returned signals are then focused back into their perspective waveguides/fibers by the same lens and then directed into different photodetectors (PD) to determine the distances of the reflections in different directions. Because each PD is only responsible for ranging in one direction, the detection and digital electronics associated with each PD can be of low speed. In addition, longer integration time is allowed for increased signal to noise ratio (SNR) compared with the beam scan scheme. We show that the scheme has the potential to be implemented in photonics integrated circuit (PIC) for low cost production by using a photonic integrated microcomb as the light source, although multiplexing multiple WDM lasers can also be considered. Compared with an optical phase array (OPA), no precise and fast phase tuning of a large number of waveguides are required for reduced complexity and power consumption. In addition, the beam size and beam quality of our scheme can be much bigger and better, respectively, comparing what can be achieved with an OPA. Such a PIC based WDM Lidar has great potential in autonomous vehicles, unmanned aerial vehicles (UAV's), industrial robotics, and 3D reality capturing. A 3D imaging LiDAR system was constructed and demonstrated based on the disclosed technology by using a fiber array of 4 WDM channels for beam forming and the ToF scheme for ranging. Off-the-shelf discrete components were used for constructing the demonstration and the WDM channels used in testing were in the ITU-C band. Conducted measurements demonstrate that the angular resolution of the WDM beam array can be improved by dithering the relative position between the lens and the fiber array.

Figure 17A:
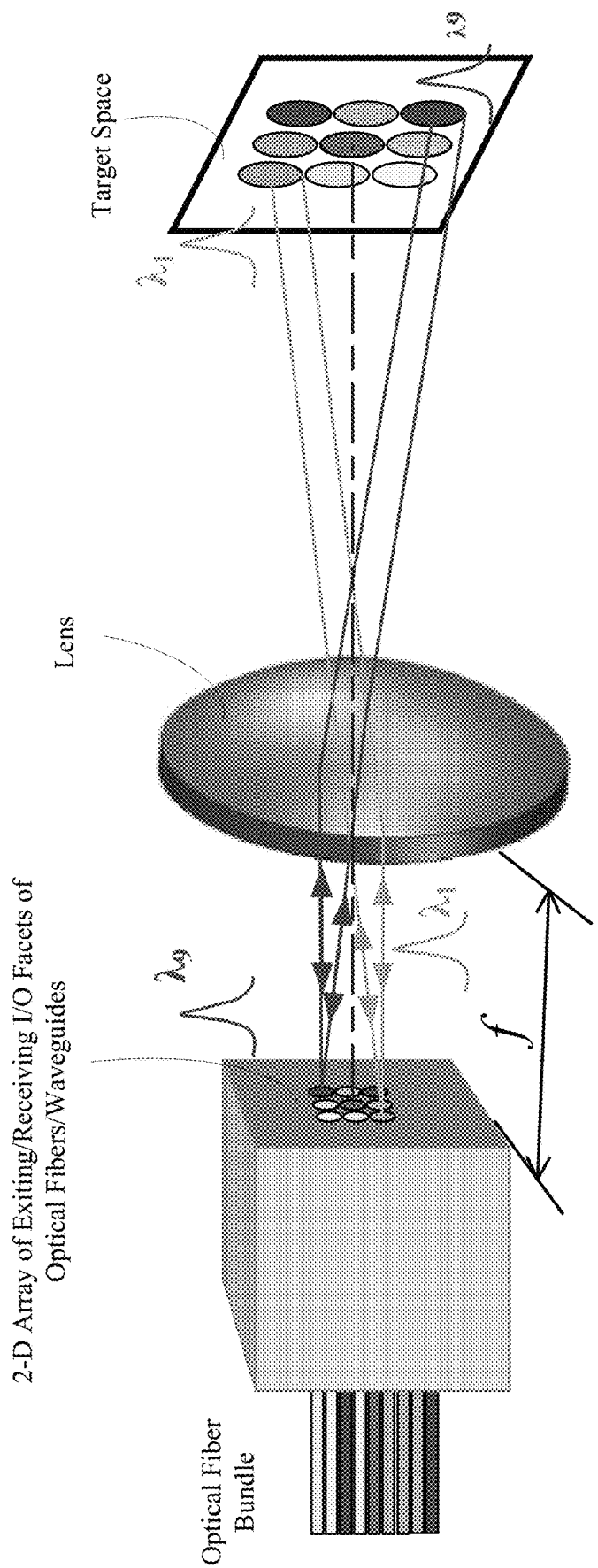
FIG. 17A shows an example of a WDM beam forming device based on the position-to-angle conversion of a lens for implementing the disclosed technology. Light of different wavelengths are demultiplexed into different fibers with their exiting ends forming an array, which is placed on the focal plane of the lens.
Figure 17B:
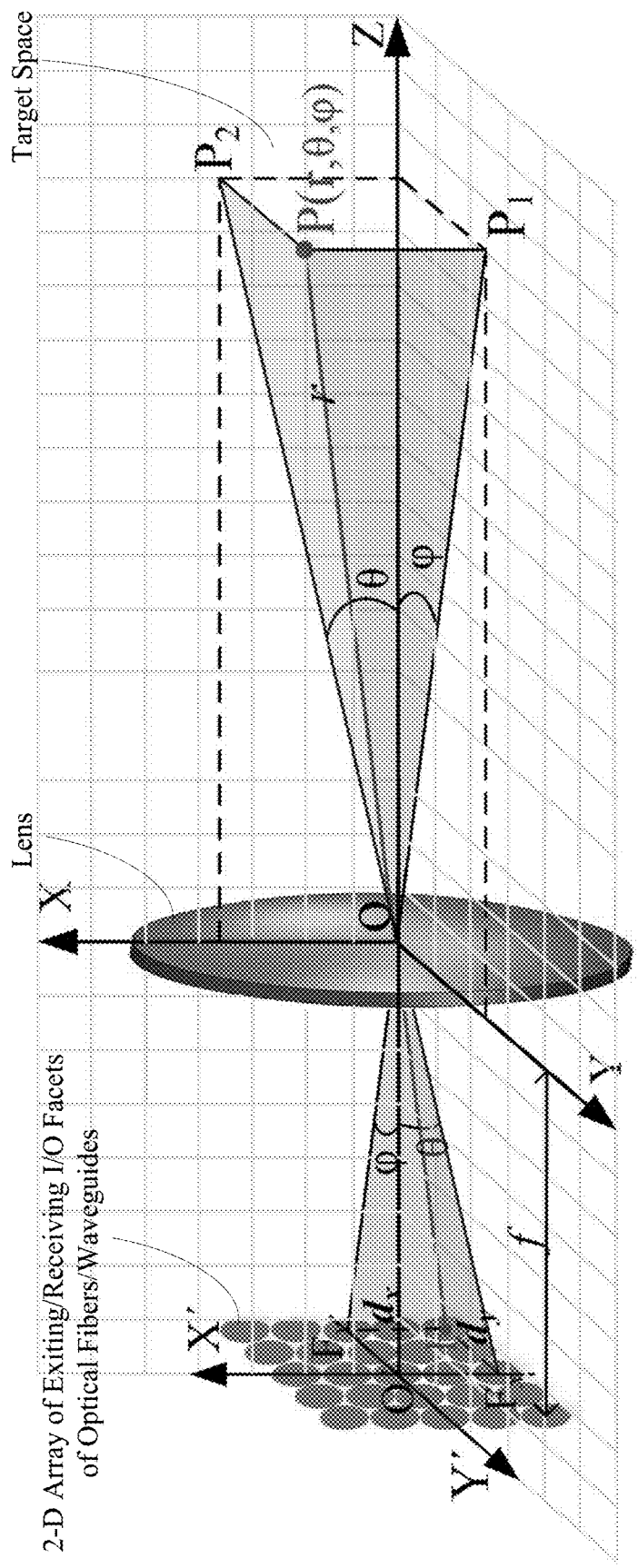
FIG. 17B illustrates the position coordinates ($d_x$, $d_y$) of fiber array relative to optical axis of the lens and the space position coordinates (r, θ, φ) of an object at point P to be sensed in the device in FIG. 17A, where r is the distance of the object from the lens, θ is the vertical beam deflection angle measured from the YOZ plane, and φ is the horizontal beam deflection angle from the XOZ plane. $OP_1$ is the projection of OP in plane YOZ, $OP_2$ is the projection of OP in plane XOZ.

The disclosed technology implements a 3D beam forming as illustrated in FIG. 17A. Imagine light signals from a multi-wavelength source, such as a mode-locked laser or a photonic integrated microcomb, is first demultiplexed into different fibers. The exiting ends of the fibers form a 2D array which is placed in the focal plane (X'O'Y') of a lens. Each fiber with a coordinate of ($d_x$, $d_y$) emits a light signal of a unique wavelength and is collimated by the lens and directed into a unique direction in the space. The location (the distance and angular direction) of an object can be denoted as P (r, θ, φ) as shown in FIG. 17B, where r is the distance between the object and the lens center, which can be measured with either the time of flight (ToF) or frequency-modulated continuous wave (FMCW) technique. The sensing beam direction angles θ and φ which are defined as the vertical and horizontal beam angles from the YOZ and XOZ planes, respectively, as shown in FIG. 17B, can be obtained from the position of the corresponding waveguide/fiber array element as:

$$\theta = \tan^{-1}\left(\frac{-d_x}{f}\right) \quad (1\text{-}a)$$

-continued $$\varphi = \tan^{-1}\left(\frac{-d_y}{f}\right) \quad (1\text{-}b)$$

where $d_x$ and $d_y$ are the position coordinates of the fiber array element on the focal plane (X'O'Y') measured from the optical axis of the lens and f is the focal length of the lens. As can be seen, the further the fiber is from the optical axis of the lens, the larger the beam angle, and the smaller the focal length of the lens, the larger the beam angle. Taking the derivative of Eq. (1), one obtains the angular deviation of the beam with respect to a small change in $d_x$ or $d_y$ as:

$$\Delta\theta = \frac{-\Delta d_x / f}{1 + d_x^2/f^2} \quad (2\text{-}a)$$

$$\Delta\varphi = \frac{-\Delta d_y / f}{1 + d_y^2/f^2} \quad (2\text{-}b)$$

As shown by the above equations, the angular deviation of the beam is linearly proportional to the small change in $\Delta d_x$ and $\Delta d_y$. In addition, the angular deviation of the beam is inversely proportional to the focal length when $d_x$ and $d_y$ are much less than f.

In such a 2-D fiber/waveguide array, assuming the field distribution at each waveguide/fiber exit is of a Gaussian shape, the waist diameter D of the corresponding collimated beam and its divergence angle $\delta\psi$ can be expressed as:

$$D = \frac{4\lambda f}{\pi d D_0} \quad (3)$$

$$\delta\psi = \frac{D_0}{f} \quad (4)$$

where $D_0$ is the beam diameter at the fiber/waveguide exit (or the mode field diameter) and $\lambda$ is the wavelength. For a single mode fiber with a mode field diameter $D_0$ of 9 μm and lens with a focal length f of 20 mm, the diameter D and the divergence angle of the beam are about 4.4 mm and 0.026 degrees from Eqs. (3) and (4). For a silicon waveguide with a beam waist $D_0$ of 1 μm at the array exit, the diameter and the divergence angle of the collimated beams are 39.5 mm and $2.9\times10^{-3}$ degrees.

The angular resolution of the 2-D WDM beam array is determined by the spacing $\Delta d_x$ or $\Delta d_y$ between the adjacent fibers or waveguides using Eq. (2), which can be improved by reducing the fiber/waveguide spacing. However, the ultimate angular resolution will be limited by the beam divergence angle. Taking $\Delta\theta=\delta\psi$ and $\Delta\varphi=\delta\psi$, one obtains the smallest meaningful waveguide spacing $\Delta d_{min}$ from Eqs. (2) and (4) as:

$$\Delta d_{min}=D_0 \quad (5)$$

For example, for a 1-D array of silicon waveguides with a spacing of $D_0=1$ μm and a lens with a focal length f=20 mm, the angular resolution of the beam array is $2.9\times10^{-3}$ degrees. Such a high beam quality is difficult to obtain with an optical phase array (OPA), especially considering that an OPA generally has side lobes in its spatial beam profile which would undesirably reduce the beam quality and thus the angular resolution. As a result, some OPA implementations exhibit much larger beam divergence angles, for example on the order of 0.089 degrees.

The field of view (FOV) in the horizontal or vertical direction for the disclosed examples of 1-D waveguide arrays is generally dictated by the diameter of the lens or size of the array, whichever is smaller. In many practical implementations, it is likely that the array size is the limitation because the size of the lens can be made sufficiently large at relatively low costs. For example, for a lens with a focal length of 20 mm, an array with a width of 20 mm and a height of 5 mm, the FOV in the horizontal direction is 49.13 degrees and vertical direction is 13.275 degrees. As a specific example where the spacing of fibers or waveguides is about 0.125 mm for the above 2-D fiber/waveguide array with an array size of 160×40, the angular beam resolution is about 0.36 degrees.

Figure 17C:
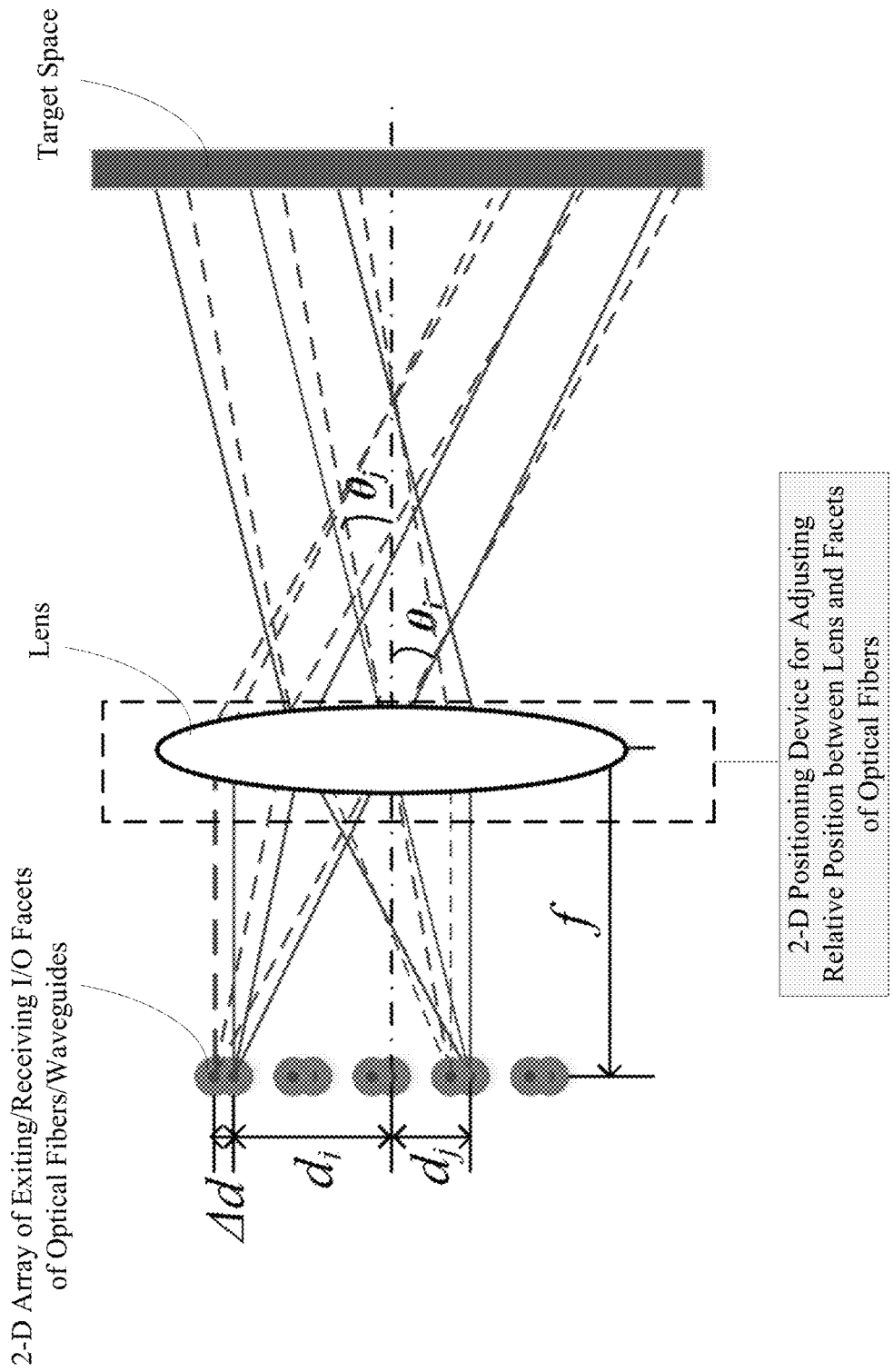
FIG. 17C illustrates simultaneous fine-scanning of all the WDM beams by dithering either the lens or the fiber array for improving beam angular resolution in operating the device in FIG. 17A.

FIG. 17C further shows a positioning mechanism for controlling the relative positioning between the lens and the output facets of the fibers. Referring to Eq. (2), if the relative position between the lens and the fiber/waveguide array is slightly shifted in the x or y direction, the beam angles can be shifted. Therefore, the beam angular resolution can be greatly improved by dithering the lens or the array with an amplitude equal to the fiber/waveguide spacing. This can be achieved by providing a 2-D positioning device engaged to the PIC chip or the lens in FIG. 17C to enable a relative adjustment in both the x and y directions that are substantially perpendicular to the optic axis of the lens or in the plane formed by the output facets of the fibers. A 2-D xy positioning stage or other positioning actuation devices may be used to implement this mechanism. Conversely, the fiber/waveguide spacing can be enlarged for reducing the total number of array elements without scarifying the beam angular resolution. For example, if the lens can be dithered with an amplitude of 500 μm, the array size can be reduced to 40×10, with an angular resolution determined by the number of sampling points N in half of each dithering cycle. Assuming a sampling point of 20 in each half cycle, the beam angular resolution is 0.072 degrees. An aspheric or composite lens can be used in practice to minimize any beam distortions.

Another method to improve the beam angular resolution is to increase the focal length of the lens at the expense of reducing FOV from Eqs. (1) and (2). A lens with fast-variable focal length, such as a liquid lens, may also be used in the system to zoom in or out a target with adjustable angular resolution and FOV.

The ranging function can be performed with either the time of flight (ToF) or frequency-modulated continuous wave (FMCW) technique. The ToF measurements were conducted to demonstrate the WDM beam forming enabled 3D sensing/Lidar. As shown in FIG. 17A, light pulses of different wavelengths are collimated and directed into different directions to form an array of beams for illuminating the objects or targets in the space. Each light beam reflected from an object will be focused by the same lens back into the fiber/waveguide originated the beam due to the reciprocity of light. In other words, the reflected light reflected from an object and received by the fiber/waveguide has the one-to-one correspondence with the fiber/waveguide emitting the light. The 3D information of the targets is encoded onto the time domain of the returned spectro-pulse echoes, where the angular position and the reflectivity are mapped to wavelengths that are located in different WDM channels, and the distance is measured by the time of flight (ToF) measurements. Compared to some flash LiDAR system with a single APD array, the scan-less 3D sensing/Lidar scheme enabled by WDM presented in this document can effectively decrease the electrical crosstalk of adjacent APD detectors.

Referring back to FIG. 17A where different optical waveguides are used to guide different beams at different WDM wavelengths so that two adjacent APD detectors in each chip shown in FIG. 17 are designed to detect light at two different WDM wavelengths to improve the detection efficiency and to reduce the optical crosstalk between two adjacent detectors.

Figure 18A:
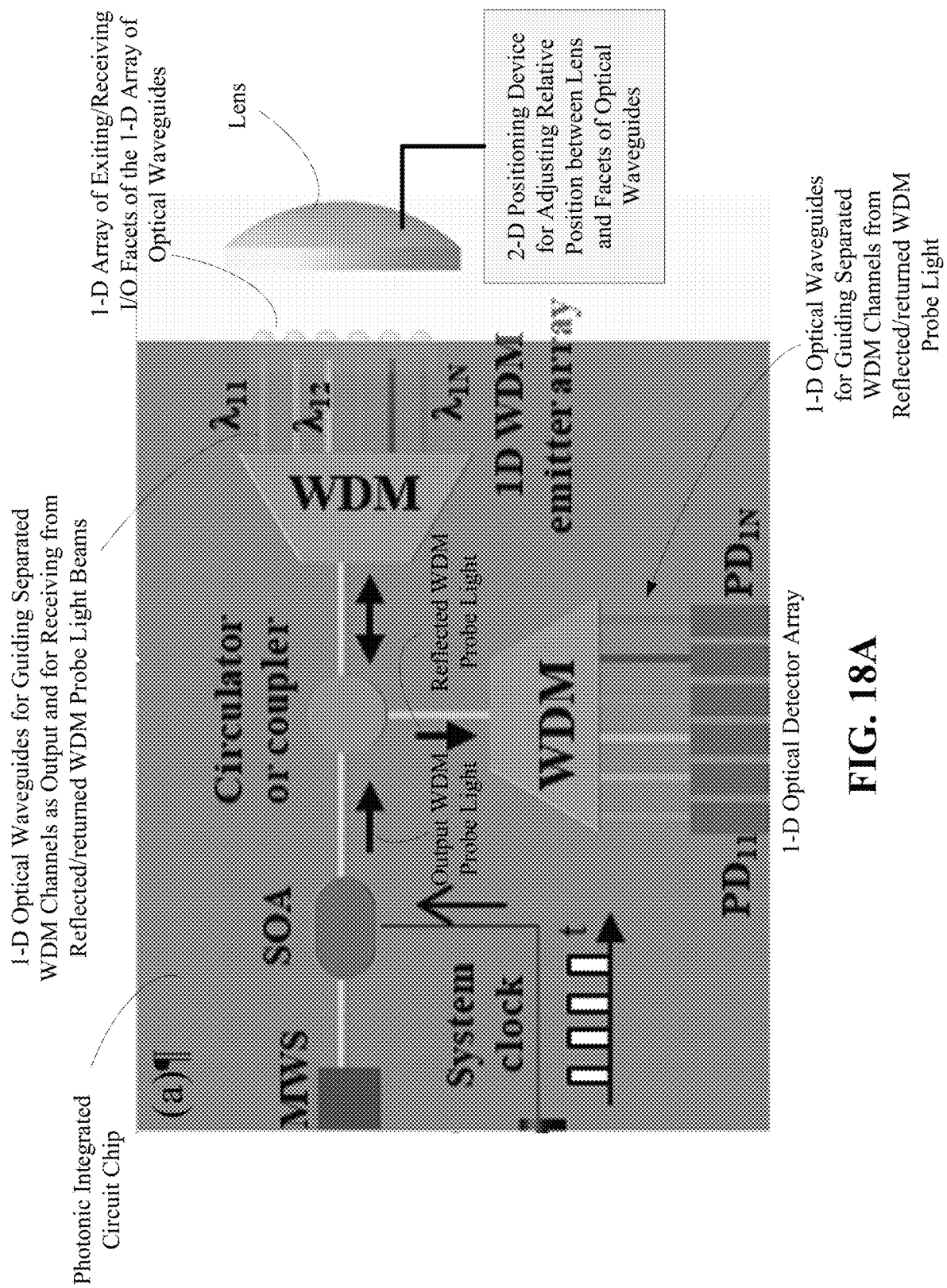
FIG. 18A shows a WDM LiDAR on chip with a 1D WDM emitter array.

The proposed scan-less 3D sensing/Lidar has the potential to be implemented in photonics integrated circuit (PIC) suitable for low cost production. FIG. 18A shows an example of a PIC WDM LiDAR chip with a 1-D waveguide array for as a 1D WDM emitter array. Multiple 1-D PIC WDM LiDAR chips can be stacked together to form a multi-chip WDM LiDAR device with a 2D WDM emitter array to achieve 3D LiDAR sensing as shown in the example in FIG. 18B. In each 1-D PIC WDM LiDAR as shown in FIG. 18A, a multi-wavelength source (MWS) is provided to generate light at different WDM wavelengths, and a semiconductor optical amplifier (SOA) is provided to receive the MWS light with WDM wavelengths and is used both as an optical modulator for generating short pulses by modulating the received MWS light and an optical amplifier to provide gain to the generated optical pulses. A first WDM device is placed in the output optical path as a WDM demultiplexer to separate the output light of different WDM wavelengths produced by the SOA into different WDM beams that are coupled into different waveguides and to operate as a WDM multiplexer on returned light beams at the different WDM wavelengths to combine the returned light beams of the different WDM wavelength in different waveguides as a combined returned beam towards a second WDM placed to receive the combined returned beam. This second WDM is used as a WDM demultiplexer, which separates the combined returned beam into returned light signals of different WDM wavelengths into different photodetectors (PD's). A system clock signal is provided to cause optical modulation of the gain at the SOA to generate optical pulses at the output of the SOA while amplifying the optical energy. The output WDM probe light is pulsed light at the different WDM wavelengths and is guided from the SOA to an optical circulator which is an optical input and output (I/O) circulator. The first WDM is placed to receive the output WDM probe light from the optical circulator and separates the output WDM probe light into output probe light beams at different WDM wavelengths, respectively. An array of optical waveguides is provided to receive and guide the output probe light beams at different WDM wavelengths, respectively, from the first WDM to the edge of the PIC chip to exit the output facets of the waveguides to the lens that is located so that the output facets of the waveguides are at or near the focal plane of the lens.

The MWS can be multiple DFB lasers combined by an arrayed waveguide grating based WDM, a mode-locked laser, or a coupled opto-electronic oscillator (COEO) such as COEOs in U.S. Pat. Nos. 5,929,430 A, 6,567,436B1 and 7,218,662B1, all with equal frequency spacing. A photonic integrated microcomb can be used for generating hundreds of spectral lines. For example, a Kerr frequency comb generated with an AlGaAs-on-isolator microresonator was recently demonstrated, which had an ultra-low pump threshold of only 36 µW and generated a comb with a broad span of 250 nm with a pump power of 0.3 mW. Assuming a frequency spacing of 50 GHz, over 600 comb lines can be generated to enable a large array of beams with different wavelengths. Such a nonlinear frequency comb can be readily pumped by an integrated DFB laser such as a laser with a power of only a few mW in some implementations.

Figure 18B:
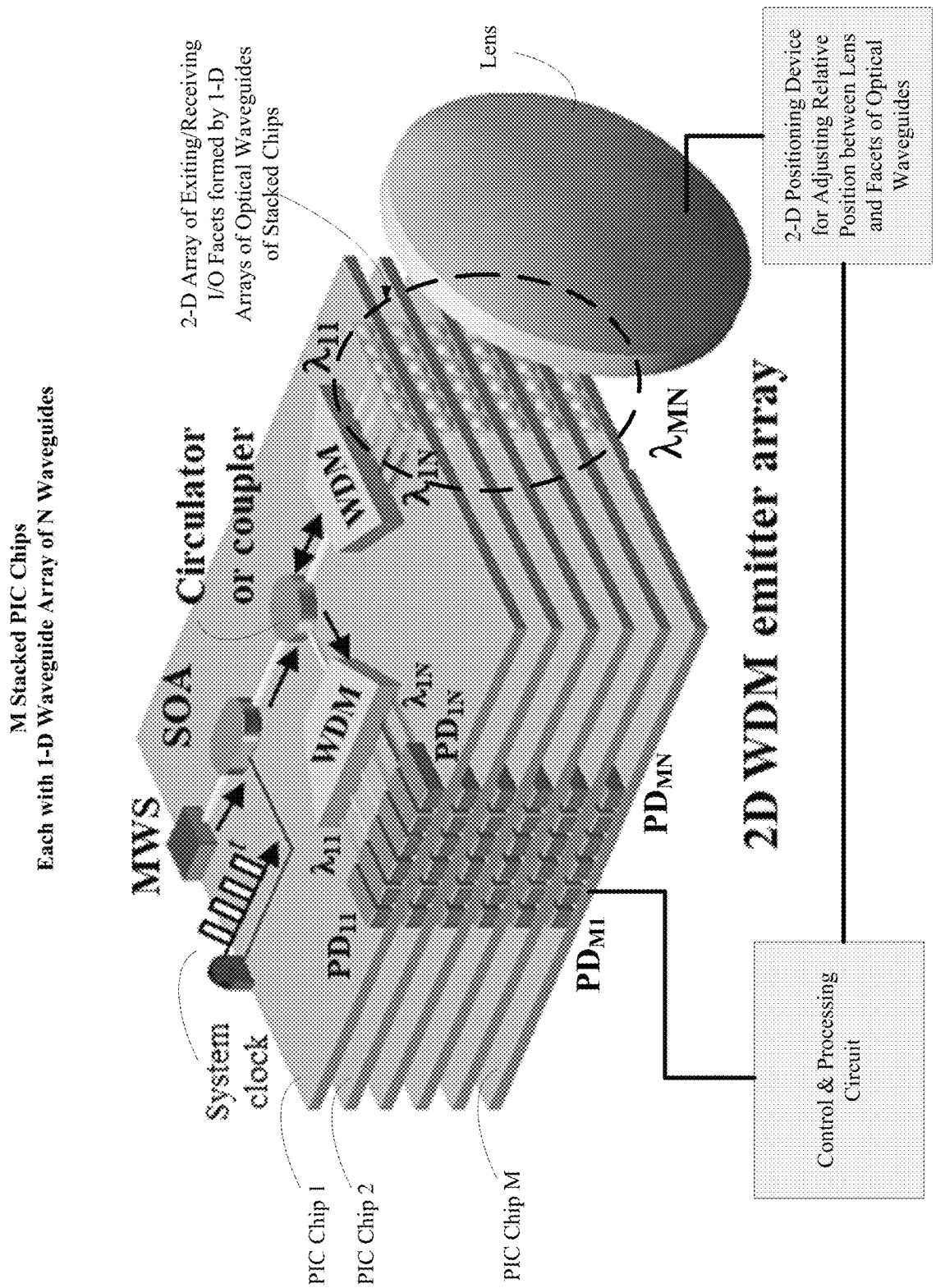
FIG. 18B shows an example of a 3D WDM LiDAR with a 2D WDM emitter array by stacking multiple 1D arrays together. MWS: multi-wavelength source, WDM: wavelength division multiplexer, SOA: semiconductor optical amplifier which also functions as an optical modulator, PD: photodetector.

A 2D WDM waveguide array can be built by stacking multiple 1D arrays on top of each other, as shown in FIG. 18B. It is also possible to make a 2D waveguide output array with vertical gratings on a single PIC chip. Therefore, it is technically feasible to develop a 3D sensing Lidar with a PIC chip and use the associated lens for converting the lights from different waveguides into beams of different directions according to their positions on the focal plane of the lens. Referring to FIG. 17C, a positioning device may be engaged to adjust a relative position between the lens and the different photonic chips in FIG. 18B to improve the angular resolution of the beams by slightly dithering the relative position between the array and the lens.

FIG. 18B further shows that a control and processing circuit or module is provided to receive the detector output signals from the optical detector arrays of the different chips for processing for LiDAR sensing and may also be used to control various components or functions of the LidDAR such as the 2-D positioning device for adjusting and/or controlling the relative position between lens and I/O facets of the optical waveguides for outputting probe light at different WDM wavelengths and for receiving returned light from the targets. This control and processing circuit may be integrated to one or more chips or may be a circuit separate from the stacked chip module. In some implementations, this control and processing circuit may include a detection circuit that is configured to provide information of lateral locations of objects detected in the target space based on the wavelength information of the different wavelengths received at optical detectors at the optical detector arrays; and timing information from detector signals from the optical detectors of the optical detector arrays in the different photonic chips to determine distance information of objects detected in the target space from the center of the lens. The information of lateral locations of objects detected in the target space and the determined distance information of objects detected from the center of the lens are used to obtain a 3-D mapping of the objected detected in the target space.

The designs in FIGS. 17 and 18 represent examples of a light detection and ranging (LiDAR) device based on the disclosed technology. Such a LiDAR incudes a plurality of different photonic chips formed on separate substrates, respectively, wherein the different photonic chips are engaged and stacked with one another; different light sources in the different photonic chips, respectively, to produce different optical beams that include laser light at different laser wavelengths so that a light source on one photonic chip produces laser light at different laser wavelengths that are different from the laser light produced by another light source in another one of the different photonic chips; and a lens spaced from the different photonic chips and shared by the different photonic chips to receive light from the different photonic chips and to direct returned light back to the different photonic chips.

Each photonic chip includes an optical circulator or coupler supported by a corresponding substrate to receive an optical beam from a corresponding light source that includes laser light at different laser wavelengths and re-direct the optical beam; a first wavelength division demultiplexing device supported by the substrate to receive the optical beam from the optical circulator or coupler and to separate the received optical beam into different optical beams at the different laser wavelengths, respectively; an array of optical waveguides supported by the substrate and structured to include first waveguide ports, respectively, which are coupled to receive the different optical beams at the different laser wavelengths, respectively, from the first wavelength division demultiplexing device, and second waveguide ports, respectively, which output the different optical beams at the different laser wavelengths received by the optical waveguides as different output optical beams at the different laser wavelengths, respectively. Each optical waveguide is designed to carry light at a designated laser wavelength of the different laser wavelengths.

In this LiDAR device, the lens shared by the different photonic chips is spaced from the second waveguide ports by a distance equal to or near a focal length of the lens to receive the different output optical beams at the different laser wavelengths, respectively, to direct each output optical beam to a unique beam direction based on a position of a corresponding second waveguide port of the each waveguide relative to the lens so that each output optical beam directed from each of the differently located second waveguide ports is directed by the lens to a different direction after passing through the lens. The lens is further operable to receive and direct returned light at the different laser wavelengths to the second waveguide ports, respectively, so that each waveguide used to carry a designated laser wavelength is to receive and direct a returned optical beam at the same designated laser wavelength to the first wavelength division demultiplexing device which combines different returned optical beams at the different laser wavelengths as a combined returned beam of light at the different laser wavelengths to the optical circulator or coupler.

Each photonic chip further includes a second wavelength division demultiplexing device supported by the substrate and located relative to the optical circulator or coupler to receive the combined returned beam from the optical circulator or coupler. The second wavelength division demultiplexing device is operable to separate the combined returned beam into different returned optical beams at the different laser wavelengths, respectively. Each photonic chip further includes an optical detector array of photodetectors supported by the substrate and coupled to receive the different returned optical beams at the different laser wavelengths from the second wavelength division demultiplexing device, respectively, to produce different detector output signals from the different returned optical beams at the different laser wavelengths for optical sensing; and In addition, the LiDAR device includes a detection circuit coupled to receive and process different detector output signals from each optical detector array and from different optical detector arrays in the different photonic chips for LiDAR sensing.

This LiDAR directly projects different output laser beams at different WDM laser wavelengths via the lens to different directions for sensing a target area or region without scanning any beam and without moving parts. Notably, the LiDAR may be constructed as an integrated package by stacking different photonic chips together to construct a compact, lightweight, and reliable system that can be mass produced at a relatively lower cost than various other LiDAR designs.

In the examples in FIGS. 18A and 18B, each 1-D PIC WDM LiDAR chip is configured to assign different WDM wavelengths to different 1-D waveguides between the first WDM and the 1-D input/output waveguide facets and between the second WDM and the 1-D optical detector array. The WDM wavelengths assigned between different 1-D chips can be the same or different. For example, the number of WDM wavelength channels in different 1-D chips being stacked can be the same or different. For another example, the WDM wavelengths used in in different 1-D chips may be the same or different.

In implementations, each 1-D PIC WDM LiDAR chip shown in FIGS. 18A and 18B may have its own designed MWS light source on the chip. In other implementations, two or more 1-D PIC WDM LiDAR chips may share a common MWS light source by splitting the WMS output light from the shared MWS light source into different MWS light beams and by routing split WMS output light vertically from one chip to another.

Figure 19:
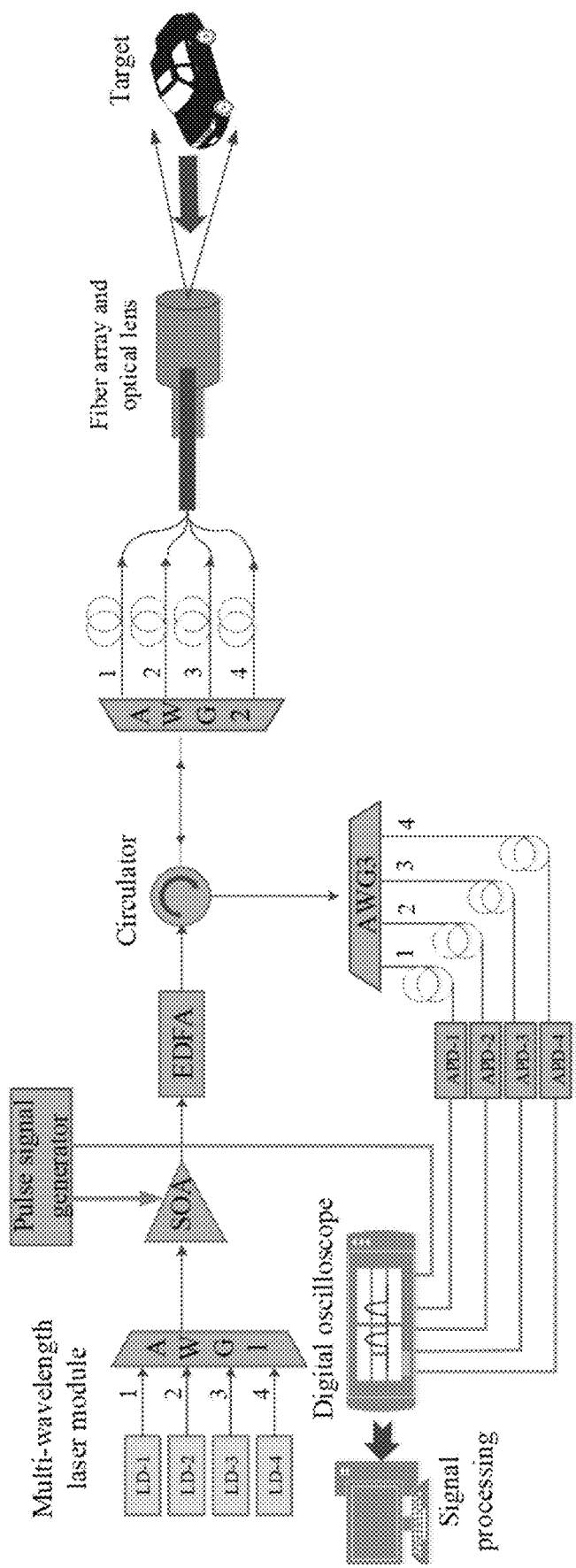
FIG. 19 shows an example of a scan-less 3D sensing/LiDAR with off-the-shelf fiber optic components based on the disclosed technology. LD: DFB laser diode; AWG: arrayed waveguide grating; EDFA: Erbium-doped fiber amplifier; APD: avalanche photodiode; SOA: Semiconductor Optical Amplifier acting both as a modulator and an amplifier.
Figure 20A:
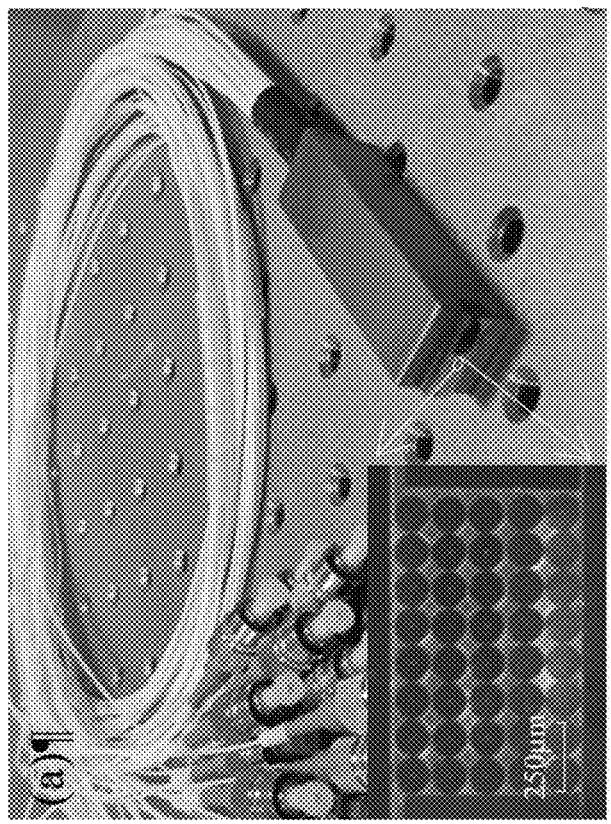
FIG. 20A shows a 2D 5×8 fiber array used in the setup where the inset in (a) shows the detail of the fiber array with a fiber spacing of 125 μm.
Figure 20B:
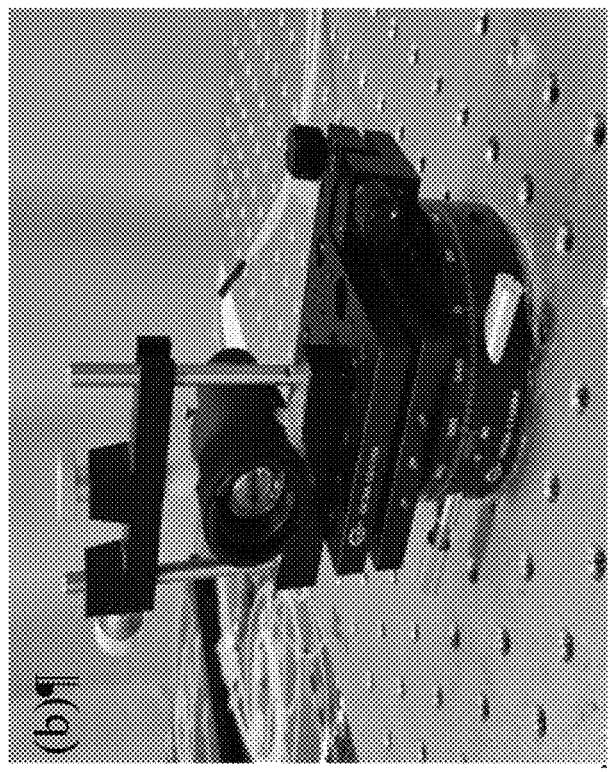
FIG. 20B shows the fiber array is placed in the focal plane of an optical lens, which collimates the lights exiting from the fibers and directs them into different directions to form an array of beams with different wavelengths (WDM beam array).

FIG. 19 shows the schematic for demonstrating an implementation of a 3D sensing/Lidar enabled by WDM and position-to-angle conversion of a lens based on the disclosed technology. FIG. 20 shows an experimental setup for testing the WDM beam forming device in FIG. 17A and the 3D sensing/LiDAR in FIG. 19. The light beams of four different wavelengths are generated by four distributed feedback (DFB) lasers on ITU grid (C31 (1552.524 nm), C32 (1551.721 nm), C33 (1550.918 nm), C34 (1550.116 nm)), which are then optically multiplexed (MUX) by a 40-channel arrayed waveguide grating (AWG) into a single fiber before entering a SOA. In conducted tests, the time of flight (ToF) measurement scheme is used for distance measurement and the SOA is used both as an amplifier and a modulator for generating multi-wavelength pulses by driven with an electrical pulse generator. Pulses with a repetition rate of 10 KHz and a width of 4 ns were used in conducted tests. The output peak power of the optical pulses from the SOA modulator is 30 mW (average power of 1.2 µW), which are further amplified by an EDFA to a total peak power of 12 W (average power of 0.48 mW). This total peak power is for light at all four ITU WDM wavelengths and therefore the peak power for each ITU WDM wavelength is 3 W. After amplification, these multi-wavelength pulses are demultiplexed (DeMUX) by another arrayed waveguide grating (AWG2) into four different fibers to form a sub-array in a 5×8 array, as shown in FIG. 20A. Note that the fiber end face was polished with an 8-degree angle to minimize Fresnel reflection from the fiber ends, otherwise the APD's would be saturated by the 4% Fresnel reflection. The fiber array was placed in the focal plane of an optical lens, as shown in FIG. 20B, to form a collimated beam array of four different wavelengths emitting in four different directions.

The pitch $d_{pitch}$ between adjacent fibers is 125 µm as shown in FIG. 20A and the lens used is an aspheric lens (AL2520M-C, Thorlabs) with a focal length f of 20 mm, a numerical aperture (NA) of 0.54, a diameter of 25 mm, and an anti-reflection coating from 1050 nm to 1700 nm. A mechanical fixture was provided as a stage to hold the lens and the fiber array together to assure that the fiber array is on the focal plane of the lens with a tolerance of +1-0.02 mm. The distance error between the array and lens will increase the beam divergence angle. For this system, +/−0.02 mm error will lead to the increase of 0.00292° divergence angle. The lens and array holding fixture is then put on a mechanical stage with translation and rotation capabilities in the horizontal plane, as shown in FIG. 20B. This setup provided the flexibility to choose which of the four fibers in the 5×8 array to light up. For example, a 1×4 sub-array, a 2×2 sub-array, or a 4×1 sub-array may be selected to be illuminated for conducting tests. In addition, the setup may be used to selectively illuminate sub-arrays with doubled or tripled spacing.

The reflected light of a beam from a target (the echo signal) will be focused back to the fiber originated the beam by the same lens. After all the echo signals of different wavelengths are focused back into their corresponding fibers, they will be multiplexed or combined by AWG2 into one fiber and then be routed to a third arrayed waveguide grating (AWG3) by an optical circulator. Next, all the echo signals are demultiplexed into four fibers with different wavelengths by AWG3 before finally received by four avalanche photodetectors APD1, APD2, APD3 and APD4. The signal outputs of the four APDs are input to oscilloscope (Rohde & Schwarz RTB2004) for signal analysis, and then processed by a computer. Finally, according to Eq. (1), the locations P (r, θ, φ) (the distance r and angular direction θ, φ) of the objects in the paths of the beams can be determined and point cloud map can be generated.

Figure 21A:
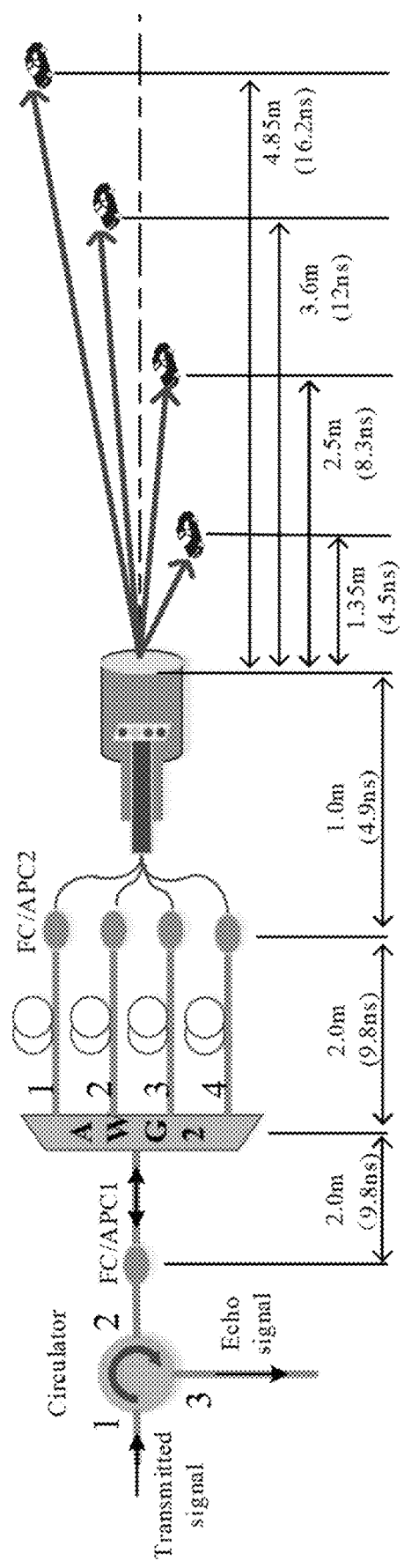
FIG. 21A shows an example of a LiDAR sensing device with a 1×4 sub-array based on the disclosed technology where examples of various fiber lengths and different distances of toy bards as targets are shown.
Figure 21C:
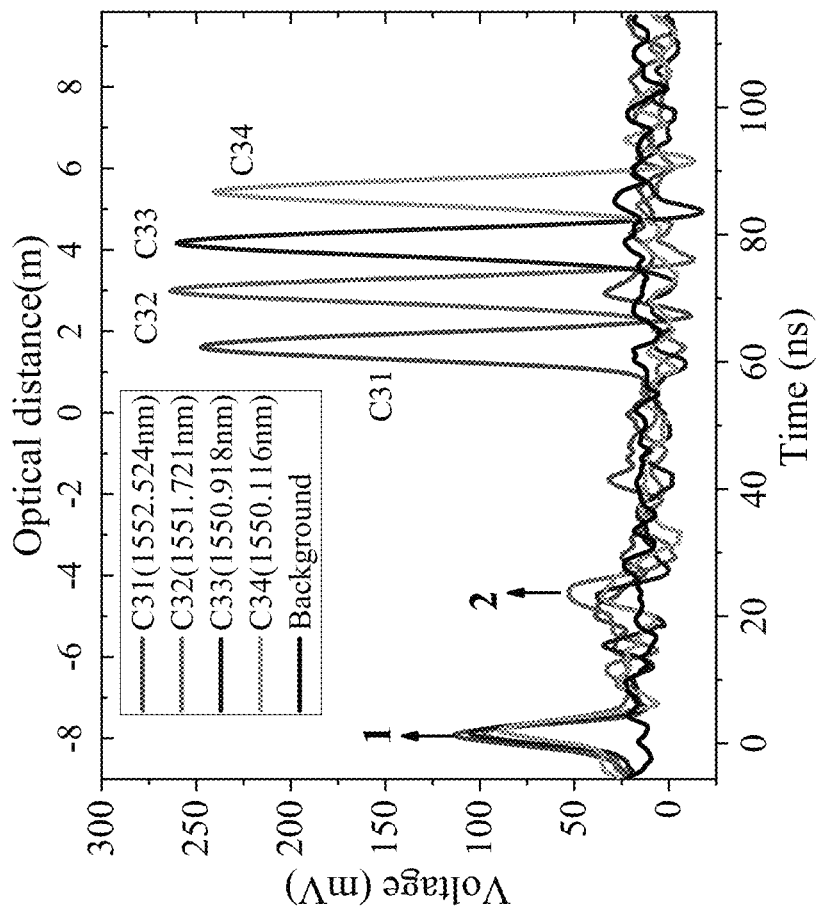
FIG. 21C shows examples of detected echo signals from the four toy cars at different locations that were obtained using the setup in FIGS. 21A and 21B.
Figure 21B:
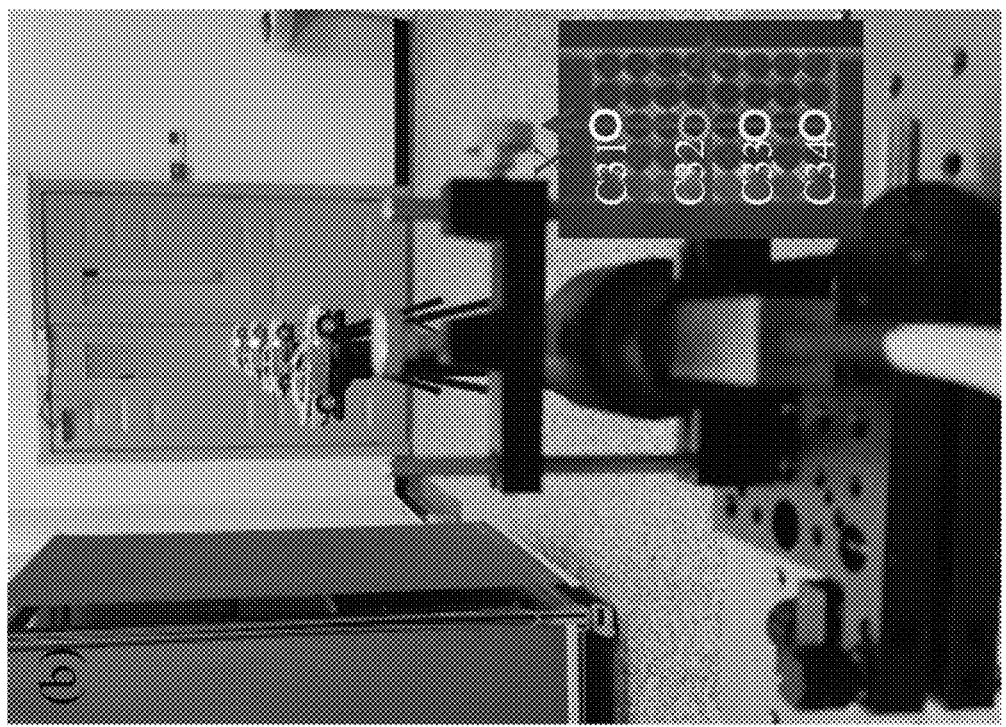
FIG. 21B shows a photo of the experiment setup showing four toy cars placed 1.35 m, 2.50 m, 3.60 m and 4.85 m, respectively, from the lens where the inset uses circles to indicate the 1×4 subarray activated with 4 different wavelengths in a 5×8 fiber array.

In conducted experiments using a 1×4 linear beam sub-array for sensing, four toy cars were used as the target objects to be simultaneously detected by the scan-less 3D sensor/Lidar to determine their distance and angular position. As shown in FIGS. 21A and 21B, the 1×4 sub-array was illuminated to obtain four vertically distributed beams of four different wavelengths to detect four toy cars with different heights at different distances of 1.35 m, 2.5 m, 3.6 m, and 4.85 m from the lens. To assist the beam alignment in space, 650 nm red laser lights were used direct red light into the corresponding fiber pigtails of the fiber array so that red spots can be observed on the targets. The red lasers were removed after the alignment was completed and the output from the AWG2 was connected with the corresponding fiber pigtails of the array.

Figures 22A, 22B:
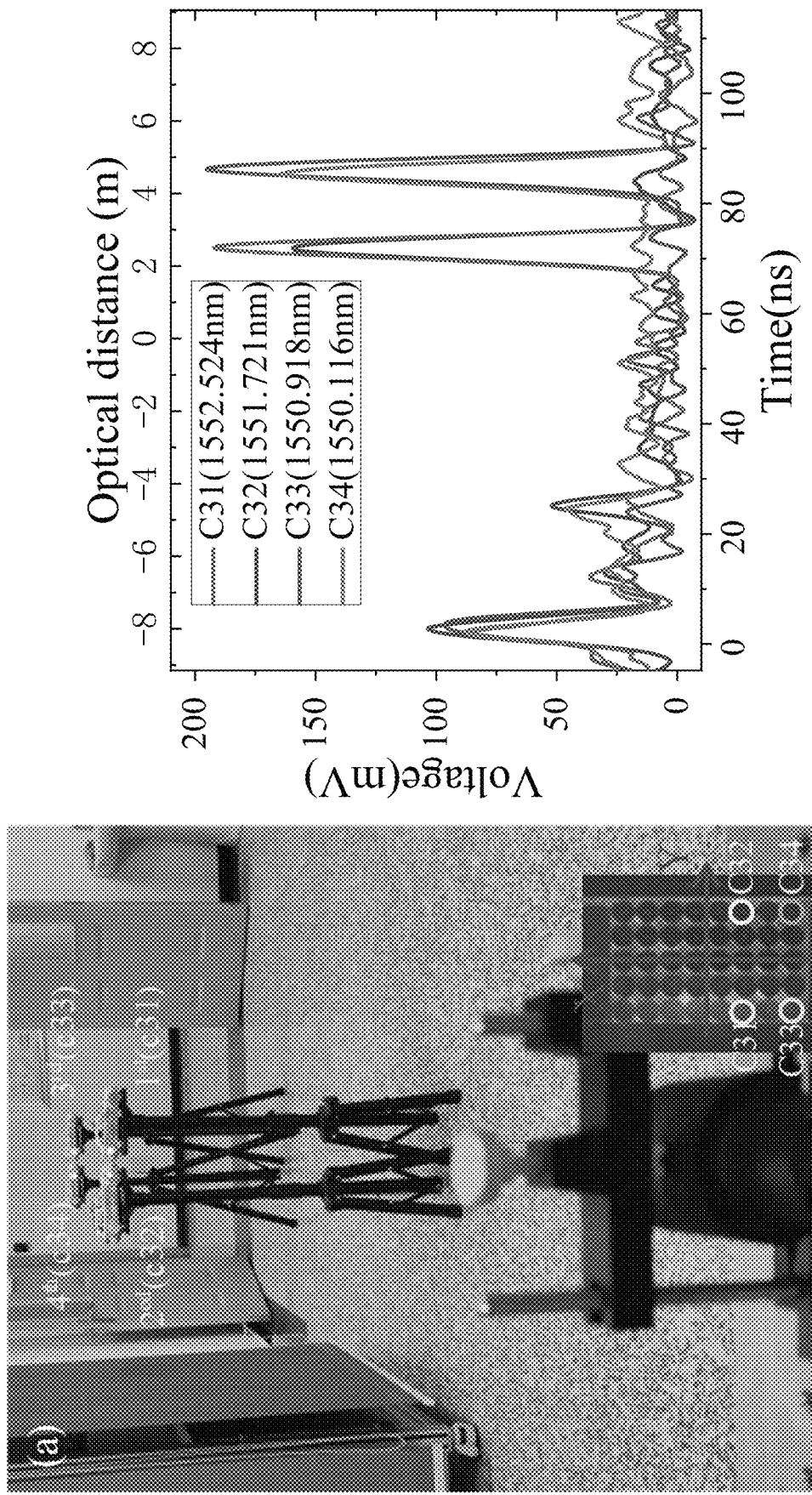
FIGS. 22A and 22B show a demonstration of 3D sensing using a setup based on the design in FIG. 21A with a 2×2 sub-array where two pairs of toy cars were placed side-by-side.
Figure 22D:
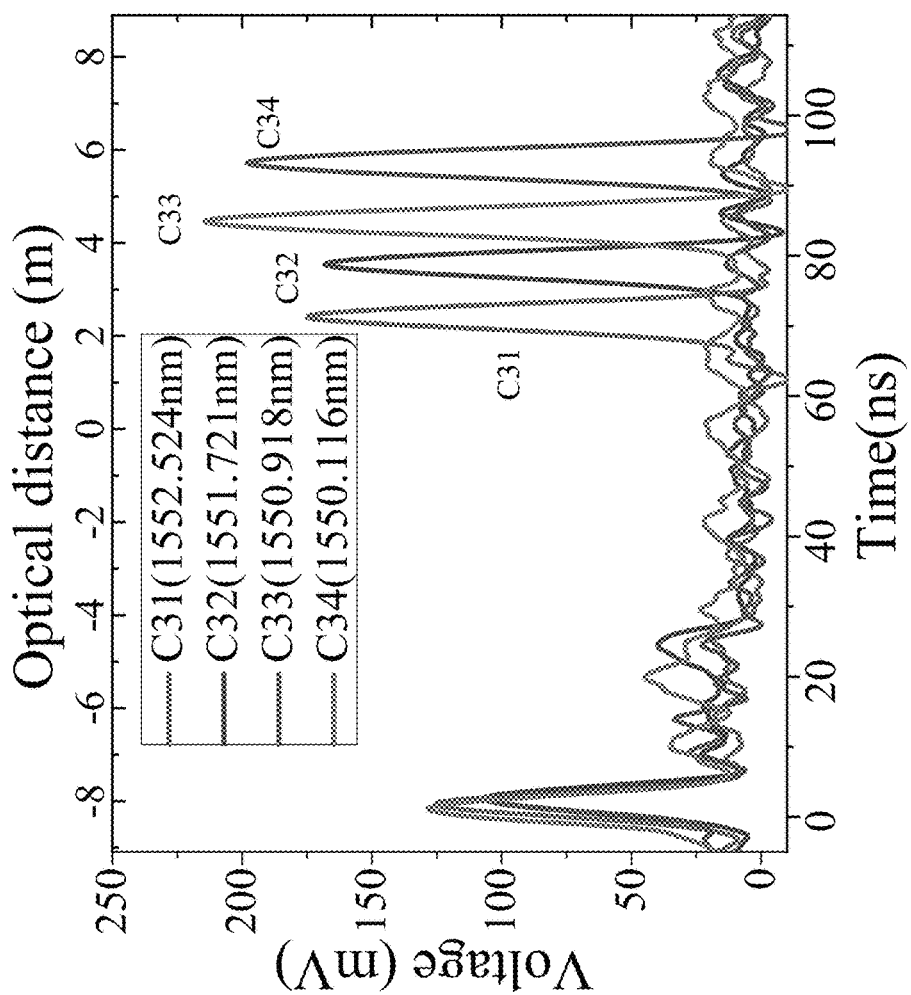
FIGS. 22C and 22D show another demonstration of 3D sensing using a setup based on the design in FIG. 21A by placing four toy cars in 4 different positions than those in FIG. 22A.

In the conducted tests, various internal reflections were present inside the system, such as those inside the AWG2 and AWG3, the FC/APC1 connector for connecting the circulator and the AWG2, and the FC/APC2 connectors from connecting different AWG2 ports to the corresponding ports of the fiber array, and finally the fiber-air interface of the fiber array, as shown in FIG. 21A. These internal reflections can be identified and verified by their pulse delay times or distances, as indicated in FIG. 21A. As shown in FIG. 21C, peak 1 is identified as the reflection from the FC/APC1 connector between the circulator and the AWG2. Because the pulse peak power for each wavelength is about 34.77 dBm at the FC/APC connector, resulting in a reflected peak power of −30.23 dBm, assuming a return loss of −65 dB for the connector, which is sufficiently high for the APD to detect. Peak 2 is identified as from the interface between the AWG2 optical chip and its fiber pigtail It is important to find the exit reference points of the 3D sensing system in time or in distance of every wavelength channels because the pigtail lengths are all slightly different from one another. To perform such a "zero" position calibration, a reflector was placed at the lens exit face to reflect light back into the system and identify the positions of reflected peaks in time or in distance, which are then stored in the computer as the "zero" references of each wavelength channel in the system. FIG. 21C shows the detected echo signals of four toy cars placed at different distances with different vertical heights, in which the zero positions of each wavelength channel are calibrated by the above experimental methods. Because the vertical angles θ of the four beams are known as −1.2531° (C31), −0.1790° (C32), 0.5371° (C33), and 1.2531° (C34), the positions of toy cars can be uniquely determined. To further demonstrate 3D sensing capability of our proposed scan-less scheme, a 2×2 sub-array was also used for testing by illuminating the array with light in four different wavelengths to detect the positions of four toy cars. FIG. 22A shows an experiment in which a first pair of toy cars are placed side-by-side separation at a distance (2.30 m) from the lens, with the same height. Another pair of toy cars are also placed side-by-side at a distance 2.10 m behind the first pair, slightly higher than the first pair. The red dots on the toy cars are from the 650 nm alignment assisting beams inputted into the corresponding fiber pigtails of the fiber array, which are removed after the alignments are completed. FIG. 22B shows the received four echo signals, indicating the distances of the two pairs of toy cars to be 2.30 m and 4.40 m, in agreement with the actual distances. Knowing the horizontal and vertical angles of the four beams, the locations P (r, θ, φ) of the four toy cars in the 3D space can be uniquely determined at C31 (2.30 m, 0.5371°, 0.7161°), C32 (2.30 m, 0.5371°, −0.7161°), C33 (4.40 m, 1.2530°, 0.7161°) and C34 (4.40 m, 1.2530°, −0.7161°, respectively.

Figure 22C:
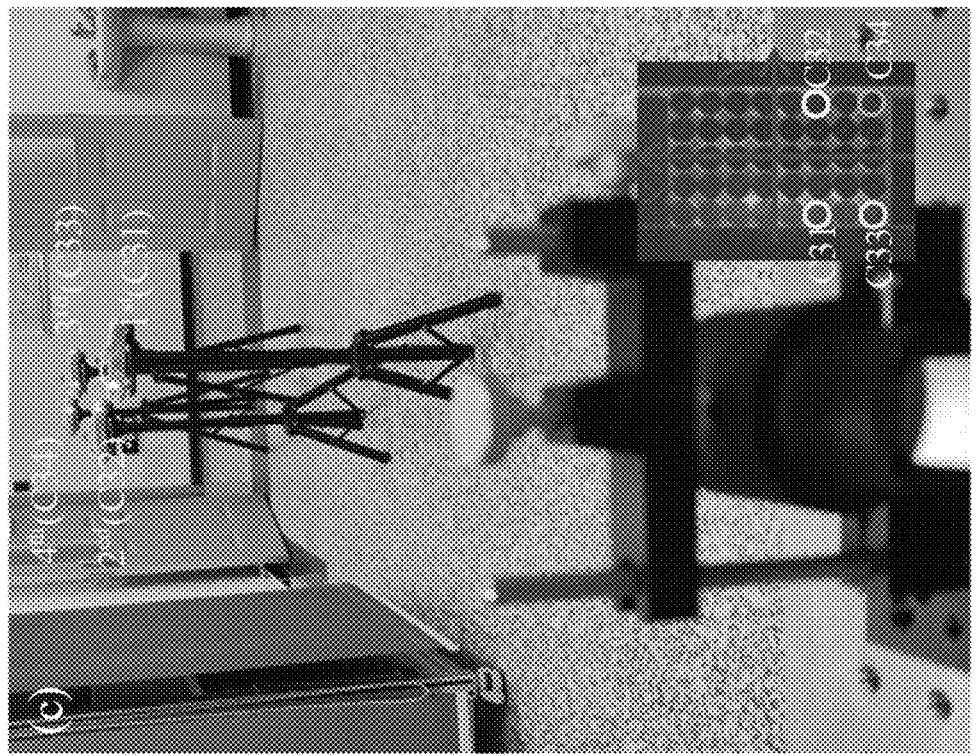

FIG. 22C shows another experiment in which the four toy cars are placed at four different places with different distances from the lens and different horizontal and vertical directions. The $1^{st}$ one is placed 2.3 m from the lens, the $2^{nd}$ one is 1.05 m behind the $1^{st}$ one but separated from it horizontally, the $3^{rd}$ one is directly behind the $1^{st}$ one by 2.1 m, but 0.075 m higher than the $1^{st}$ one. The $4^{th}$ one is directly behind the $2^{nd}$ one by 2.1 m, but 0.090 m higher than the $2^{nd}$ one. The alignment beam spots are also observable on the toy cars.

FIG. 22C shows the four echo signals from the four toy cars obtained using our proposed 3D sensing Lidar. The distances of the four toy cars are 2.3 m, 3.35 m, 4.40 m, and 5.45 m, consistent with the actual distances measured with measure tape. In the experiment, blocking one of the WDM beams only affects the detection of objects in that direction and has no or little effect on the detection in other directions.

The disclosed technology can be used to improve the angular resolution of the beams without packing more wavelength channels by slightly dithering the relative position between the array and the lens, as shown in FIG. 17C. Conversely, fewer wavelength channels and smaller array size may be implemented to achieve a good angular resolution for 3D sensing by dithering the lens or the array in the x or y directions with a small amplitude of 500 μm or less. For example, the lens may be dithered in the x direction and the array may be dithered in the y direction to improve beam angular resolution in both directions. Tests were conducted to experimentally demonstrate the feasibility of this angle resolution improvement with micro motion.

Figure 23B:
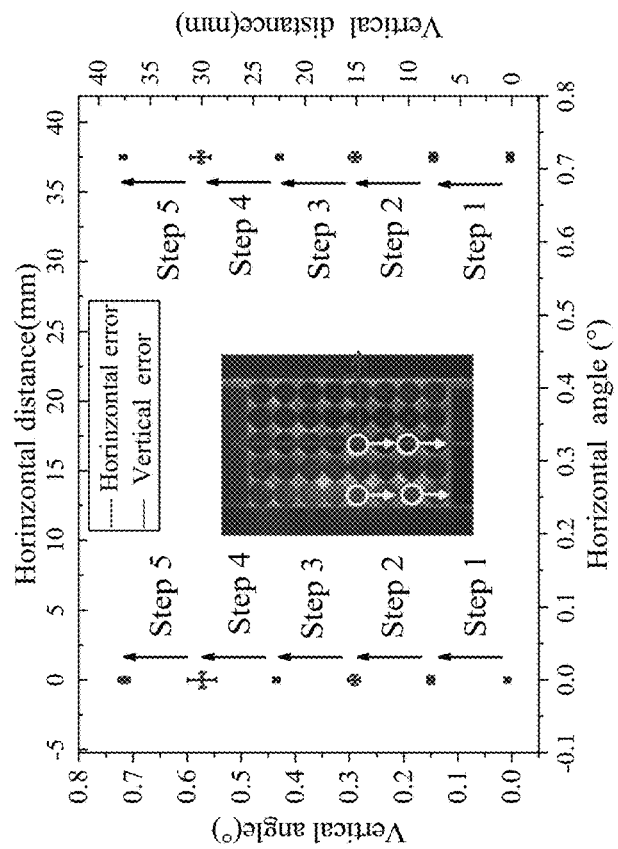
FIGS. 23A and 23B show another demonstration of beam angular resolution improvement by micro-scanning or dithering in a setup based on the design in FIG. 21A where motorized translation stage was used to move the fiber array relative to the optical lens.
Figure 23A:
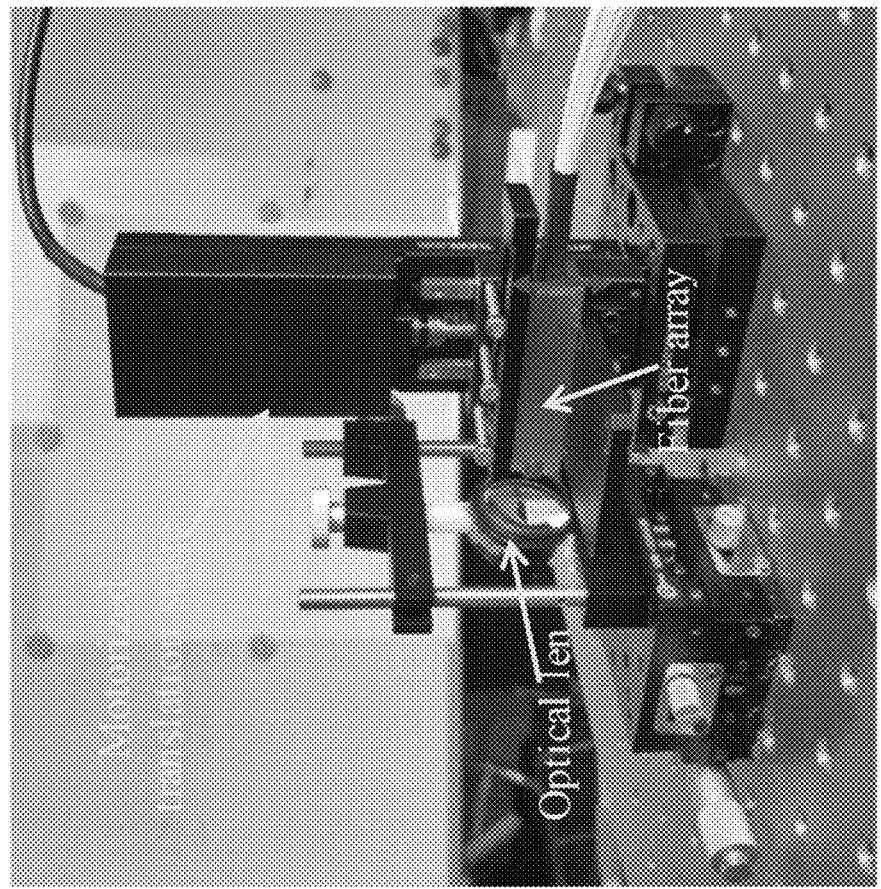

The experimental setup is shown in FIG. 23A where illumination light was directed to a 2×2 sub-array with a spacing of 250 μm between the lit fibers, as shown in FIG. 23B, which is placed in the focal plane of the lens with a focal length of 20 mm. The corresponding beam array angular resolution is 0.716° from Eq. (2). A motorized translation stage (KMTS25E/M, Thorlabs) with a resolution of 0.05 μm and bidirectional repeatability of 1.6 μm is used to change the position of the fiber array vertically, as shown with the yellow arrow in FIG. 23B. A hand-made resolution chart was placed 3 m away from the lens, on which the center-to-center spacing between adjacent bars was 7.5 mm. Red lights at 650 nm were coupled into the fiber pigtails of the fiber array to light up 4 array elements, resulting in four red spots on the resolution chart. The spacing between two spots was measured to be 37.5 mm, corresponding to a beam angle difference of 0.716°. The translation stage was set to move 5 steps, with the step size of 50 μm, resulting in the simultaneous motion of the four spots in the vertical directions. FIG. 23B shows the positions of two horizontal spots for each step of the translation stage. Clearly, the position resolution was improved from 37.5 mm to 7.5 mm, and the corresponding angular resolution was improved from 0.716° to 0.143°, a 5 times improvement. In practice, fast dithering the lens, the array, or the both with a piezo-electric transducer or a scanning driven by a micro-motor can be implemented. Clearly, by increasing the number of steps to 20, the angular resolution can be reduced to 0.0358°.

The above disclosed tests demonstrate a unique beamforming scheme for 3D sensing/Lidar without the need for beam scan or 2D photo-imaging. Light beams of different WDM wavelengths from a multiple wavelength source are separated into different WDM signals which are respectively coupled into different waveguides/fibers with their exiting ends forming a 2D array located in or near the focal plane of an optical lens. This optical lens, collimates and converts the exit light beams into an array of beams pointing at different directions. Upon reflection by an object, the echo signal of each beam will be focused back to the waveguide or the fiber originating the light beam and be directed into a unique PD to be detected according to its wavelength. Therefore, signal in each PD is mapped to the reflection in a particular direction (wavelength) in space. Because the distance of the object can be obtained by either ToF or FMCW method using the detected signal in the PD, the location of the object in space can be uniquely determined. This WDM beam forming scheme can be implemented without moving parts and thus eliminate undesired mechanical wear and tear compared with MEMS beam scan method, and can have much better beam quality and larger beam size compared with OPA beam forming. This scan-less 3D sensing/Lidar scheme can be implemented in a photonics integrated circuit (PIC) chip to enable low cost production. The disclosed technology can be used to provide an attractive alternative to the MEMS and OPA based beam scanning and can be explored further to enable low cost and high speed 3D sensing without being limited to the response speeds of any scanning components used in other LiDAR designs, particularly Lidar systems.

Additional technical features of the disclosed technology are further described with respect to FIGS. 1 through 16 as in U.S. application Ser. No. 16/279,586 which is incorporated by reference as part of this patent document. One or more features described with respect to FIGS. 1 through 16 may be combined in various ways with one or more technical features described with respect to FIGS. 17 through 23.

The technical features described with respect to FIGS. 1 through 16 are related to designs and implementations of light detection and ranging (LiDAR) systems that project light at a set of different wavelength division multiplexed (WDM) wavelengths based on WDM optical designs to reduce the number of components, complexity of LiDAR optical systems, the weight and cost of LiDAR systems for a wide range of applications.

In one aspect, the disclosed technology can be implemented to provide a light detection and ranging (LiDAR) system to include an optical transmitter module to produce probe light at different optical wavelengths that can be used for wavelength division multiplexing (WDM); an optical fiber link coupled to the optical transmitter module to receive the probe light; an optical beamforming module coupled to receive the combination optical beam from the optical fiber link and operable to separate the probe light into different optical probe beams at the different WDM wavelengths and to project the different optical probe beams to different directions for LiDAR sensing; a motor engaged to cause the optical collimator and the optical diffraction grating to rotate together to scan the different optical probe beams at different beam directions and at the different WDM wavelengths for LiDAR sensing while maintaining optical alignment with each other that are aligned relative to each other; an optical receiver module coupled to receive returned probe light via the fiber link from the optical beamforming module and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively; and an optical circulator coupled to the optical fiber link, the optical transmitter module, the optical receiver module and the optical beamforming module to direct light from the optical transmitter module to the optical beamforming module, light from the beamforming module to the optical receiver module.

In another aspect, the disclosed technology can be implemented to provide a method for performing light detection and ranging to include generating a combined optical beam including light at different WDM wavelengths; modulating the combined optical beam with a modulation signal referenced to a system clock; demultiplexing the modulated combined beam into different optical probe beams at the different WDM wavelengths; projecting the different optical probe beams at the different WDM wavelengths into different directions in space to optically probe a surrounding; receiving reflected probe beams at the different WDM wavelengths from the surrounding to combine reflected probe beams into a combined reflected probe beam; directing the combined reflected probe beam to an optical receiver module which separates the combined reflected probe beam into different reflected optical probe beams at the different WDM wavelengths along different optical paths leading to different photoreactors to produce different detector signals; processing the detector signals based on the system clock to determine distances of reflecting objects in the surrounding to cause the reflected probe beams; and using the determined distances to determine positions of the reflecting objects in space.

In another aspect, the disclosed technology can be implemented to provide a light detection and ranging (LiDAR) system to include an optical transmitter module that produces a combination optical beam which combines light at different wavelength division multiplexed (WDM) wavelengths; an optical fiber link coupled to the optical transmitter module to receive the combination optical beam from the optical fiber link; and an optical beamforming module coupled to receive the combination optical beam from the optical fiber link and operable to project different optical probe beams at the different WDM wavelengths for LiDAR sensing. The optical beamforming module includes an optical collimator and an optical diffraction grating that are aligned relative to each other to transmit light therebetween so that the combination optical beam is received by the optical collimator and is directed by the optical collimator to the optical diffraction grating that separates the combination optical beam into the different optical probe beams at the different WDM wavelengths, respectively, at different beam directions, and wherein the optical beamforming module further receives returned probe light and directs the returned probe light from the optical diffraction grating to the optical collimator. This system further includes a motor engaged to cause the optical collimator and the optical diffraction grating to rotate together to scan the different optical probe beams at different beam directions and at the different WDM wavelengths for LiDAR sensing while maintaining optical alignment with each other that are aligned relative to each other; an optical receiver module coupled to receive returned probe light via the fiber link from the optical collimator in the optical beamforming module and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively; and an optical circulator coupled to the optical fiber link, the optical transmitter module, the optical receiver module and the optical beamforming module to direct light from the optical transmitter module to the optical beamforming module, light from the beamforming module to the optical receiver module.

In another aspect, the disclosed technology can be implemented to provide a light detection and ranging (LiDAR) system that includes an optical transmitter module that produces a combination optical beam which combines light at different wavelength division multiplexed (WDM) wavelengths; an optical fiber link coupled to the optical transmitter module to receive the combination optical beam from the optical fiber link; and an optical beamforming module coupled to receive the combination optical beam from the optical fiber link and operable to project different optical probe beams at the different WDM wavelengths for LiDAR sensing. The optical beamforming module includes a WDM demultiplexer that separates the combination optical beam into the different optical probe beams at the different WDM wavelengths, respectively, different optical waveguides or fiber lines coupled to receive the different optical probe beams at the different WDM wavelengths, respectively, a lens array of optical lenses that are respectively coupled to the optical waveguides or fibers with varying spatial offsets to optic axes of the optical lenses to cause the lenses to project received optical probe beams at different output beam directions, and wherein the optical beamforming module further receives returned probe light and directs the returned probe light to the WDM demultiplexer via the different optical waveguides or fiber lines to be combined in the optical fiber link. This system further includes a motor engaged to cause the optical collimator and the optical diffraction grating to rotate together to scan the different optical probe beams at different beam directions and at the different WDM wavelengths for LiDAR sensing while maintaining optical alignment with each other that are aligned relative to each other; an optical receiver module coupled to receive returned probe light via the fiber link from the optical collimator in the optical beamforming module and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively; and an optical circulator coupled to the optical fiber link, the optical transmitter module, the optical receiver module and the optical beamforming module to direct light from the optical transmitter module to the optical beamforming module, light from the beamforming module to the optical receiver module.

In another aspect, the disclosed technology can be implemented to provide alight detection and ranging (LiDAR) system which includes an optical transmitter module that produces a combination optical beam which combines light at different wavelength division multiplexed (WDM) wavelengths; an optical fiber link coupled to the optical transmitter module to receive the combination optical beam from the optical fiber link; and an optical beamforming module coupled to receive the combination optical beam from the optical fiber link and operable to project different optical probe beams at the different WDM wavelengths for LiDAR sensing. The optical beamforming module includes a WDM demultiplexer that separates the combination optical beam into the different optical probe beams at the different WDM wavelengths, respectively, different optical waveguides or fiber lines coupled to receive the different optical probe beams at the different WDM wavelengths, respectively, an optical lens that is coupled to the optical waveguides or fiber lines with varying spatial offsets to an optic axis of the optical lens to cause the optical lens to project received optical probe beams at different output beam directions, and wherein the optical beamforming module further receives returned probe light via the optical lens and directs the returned probe light to the WDM demultiplexer via the different optical waveguides or fiber lines to be combined in the optical fiber link. This system further includes a motor engaged to cause the optical collimator and the optical diffraction grating to rotate together to scan the different optical probe beams at different beam directions and at the different WDM wavelengths for LiDAR sensing while maintaining optical alignment with each other that are aligned relative to each other; an optical receiver module coupled to receive returned probe light via the fiber link from the optical collimator in the optical beamforming module and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively; and an optical circulator coupled to the optical fiber link, the optical transmitter module, the optical receiver module and the optical beamforming module to direct light from the optical transmitter module to the optical beamforming module, light from the beamforming module to the optical receiver module.

In yet another aspect, the disclosed technology can be implemented to provide a light detection and ranging (LiDAR) system that includes different identical optical transmitter modules, each producing an optical beam combining light at a set of different wavelength division multiplexed (WDM) wavelengths; different optical fiber links coupled to the optical transmitter modules to receive, respectively, the different optical beams; and different optical beamforming modules located at different positions and coupled to the different optical fiber links, respectively. Each optical beamforming module is located and oriented to project an optical beam from one coupled optical fiber link as a 3-dimensional cone of different probe beams at the different WDM wavelengths, respectively, for LiDAR sensing. The different optical beamforming modules at the different locations are oriented to project respective 3-dimensional cone of different probe beams at the different WDM wavelengths at different directions for LiDAR sensing and to receive returned probe light. This system further includes different optical receiver modules respectively coupled to receive returned probe light via the different fiber links from the different optical beamforming modules and including a WDM demultiplexer to separate the returned probe light into the different returned optical probe beams at the different WDM wavelengths, respectively, and different optical detectors that are placed to receive and detect the different returned optical probe beams at the different WDM wavelengths, respectively. Each optical beamforming module includes (1) an optical WDM demultiplexer coupled to a corresponding optical fiber link to separate received return probe light into the different optical probe beams at the different WDM wavelengths, respectively, (2) an array of fiber lines or waveguides coupled to receive, from the optical WDM demultiplexer, the different optical probe beams at the different WDM wavelengths, respectively, (3) a projection lens located to receive, from the array of fiber lines or waveguides, the different optical probe beams at the different WDM wavelengths to project the received different optical probe beams at the different WDM wavelengths out as a 3-dimensional cone of probe beams for LiDAR sensing while maintaining optical beamforming module at a fixed position without moving any part of optical beamforming module for the LiDAR sensing.

The above aspects of the disclosed technology can be implemented in various ways. In one implementation, for example, the optical transmitter module includes different lasers to produce laser light at different wavelength division multiplexed (WDM) wavelengths; a WDM multiplexer coupled to receive the laser light from the different lasers to combine the laser light at different wavelength division multiplexed (WDM) wavelengths into a single WDM beam; and an opto-electronic oscillator that includes an electrically controllable optical modulator coupled to receive the single WDM beam output by the WDM multiplexer, an opto-electronic feedback loop that comprises an optical part and an electrical part interconnected by a photodetector to receive a portion of the modulated optical output from the optical modulator and to convert the modulated optical output into an electrical signal to control the optical modulator so that the modulated optical output is modulated to carry an electrical RF or microwave oscillation signal at a radio frequency or microwave frequency. The opto-electronic feedback loop is structured to feed the electrical signal in phase to the optical modulator to generate and sustain both optical modulation and electrical oscillation at the radio frequency or microwave frequency, and a portion of the modulated optical output from the optical modulator of the opto-electronic oscillator is output as the combination optical beam which combines light at different wavelength division multiplexed (WDM) wavelengths.

In another implementation, the optical transmitter module includes an active laser feedback loop with a first loop gain greater than unity and a first loop delay to generate a laser oscillation and including an electro-optical gain element that is operable to affect the first loop gain; and an opto-electronic feedback loop coupled with the active laser feedback loop, having a second loop gain greater than unity and a second loop delay greater than the first loop delay. The opto-electronic loop includes an optical delay line having one end coupled to the active laser feedback loop to receive an optical signal indicative of the laser oscillation and another end connected to a photodetector that converts said optical signal into an electrical modulation signal, an RF delay line having one end connected to the photodetector to receive the electrical modulation signal and another end connected to the electro-optical gain element, and an RF bandpass filter connected in the RF delay line, having a center frequency that is substantially equal to a RF beat frequency of different modes of the active laser feedback loop, whereby the active laser feedback loop is mode-locked to produce pulsed laser oscillations.

In yet another implementation, the optical transmitter module includes a substrate; a coupled opto-electronic oscillator formed on or over the substrate. The coupled opto-electronic oscillator includes: a semiconductor optical modulator to modulate an optical beam in response to an electrical modulation signal; an optical microresonator formed on or over the substrate; a first waveguide formed on or over the substrate having a first end to receive a modulated optical signal from the optical modulator, and a second end that has an angled facet coupled to the microresonator via evanescent coupling; a second waveguide formed on or over the substrate and having a first end with an angled facet which is coupled to the microresonator via evanescent coupling; a semiconductor photodetector formed on or over the substrate to receive and convert an optical output from the second waveguide into an electrical signal; and an electrical link coupled between the photodetector and the optical modulator to produce the electrical modulation signal from the electrical signal. At least part of the first and second waveguides is doped to produce an optical gain to produce a laser oscillation in a laser cavity formed by the optical waveguides and the microresonator.

Details of the technical features with respect to FIGS. 1 through 16 are provided in the following sections.

In various applications equipped with LiDAR sensors, it is desirable to use a LiDAR sensor to obtain a wide angular view of a surrounding, e.g., a full 360 degree azimuth field of view (FOV), such as a sensing system for assisting a driver in operating a vehicle or in operating a vehicle in an autonomous driving mode without user manual operation. Point cloud outputs from a LiDAR sensor constitute the necessary data for software to perform further processing to determine where potential obstacles exist in the environment of a structure (e.g., a robot) or vehicle to which the LiDAR sensor is mounted and where the robot or vehicle is spatially situated in relation to those potential obstacles.

In some implementations for LiDAR sensing for a vehicle, a LiDAR sensor for autonomous operation or other LiDAR-assisted operations of the vehicle may be mounted at a selected location of the vehicle (e.g., on the top of the vehicle) and is operated to operate a laser in the LiDAR to emit a laser beam while continuously rotating the emitted laser beam to get a full 360 degree azimuth field of view (FOV) of the surroundings. Such a circular line scanning of one laser beam can be used for obtaining a 2D circular point cloud map so as to view objects in a single plane. In other implementations, a LiDAR sensor may include multiple lasers pointing at different vertical angles, respectively, to get sufficient vertical FOV and therefore a 3D circular point cloud map.

For example, FIG. 1 shows an example of a LiDAR sensor that has multiple lasers (e.g., 64 lasers) that are arranged in a vertical plane to point at different directions and each laser is operated to emit probe laser light (e.g., at 905 nm in wavelength) to a pre-selected vertical FOV (e.g., 26.8 degrees). The multiple lasers are oriented in the vertical plane (e.g., XZ pane) with a relatively even crossing angle to cover the pre-selected vertical FOV (e.g., 26.8 degrees) in the XZ plane and are rotated around Z axis to achieve the full 360-degree FOV for each of the multiple lasers. Under this design, it can be difficult to align these lasers precisely and maintain the laser alignment, especially when considering each laser beam should be well collimated with a beam diameter large enough for distance sensing over a sufficient range (e.g., 120 meters). The relative orientation error of the lasers may cause large ranging errors. Each laser can be driven with short electrical pulses (e.g., 5 nanoseconds) of a high electrical current from a high-power driving circuit which can be costly and bulky. In addition, the optics for sending and receiving the different laser beams in such a LiDAR can be bulky and heavy, thus rendering the LiDAR bulky and heavy. Furthermore, all the lasers and associated receiving optics should be placed on the rotation stage to achieve the full 360-degree FOV. This requirement can further increase complexity of the optic head of the LiDAR and render the LiDAR bulky, heavy, and prone to mechanical failures.

In light of the above technical limitations in some LiDAR designs and based on recognition of various practical needs for high-performance, reliable, light-weight and cost-effective LiDAR sensors for commercial and other applications, this patent document provides designs of LiDAR systems that produce different probe laser beams at different laser wavelengths based on wavelength division multiplexing (WDM) to achieve simplified optical designs, reliable optical alignment, simplified electronic circuitry, and improved scanning of the different probe laser beams. Implementations of the disclosed designs can be used to construct LiDAR systems using low cost and widely available components developed for fiber optic communication industry and to efficiently obtain a large vertical FOV in LiDAR sensing operations. Various examples of WDM LiDAR designs are disclosed.

Certain implementations of the disclosed WDM LiDAR designs or features may achieve one or more of the following advantages. For example, a WDM LiDAR based on the disclosed technology can place all lasers, detection optics and electronics to be remotely located from the rotating optical head (e.g., they are in the trunk of a car while the optical head is placed on an exterior of the car such as the car rooftop) and this arrangement can be used to make the optical head simple, compact and light. For example, in some implementations, unlike the LiDAR example in FIG. 1 in which every laser has a driving circuit for generating required short pulses with high electrical current, a WDM LiDAR based on the disclosed technology can have all lasers share a single driving circuit for generating needed short pulses with a high electrical current, reducing the complicity, cost, and power consumption. For another example, unlike the LiDAR example in FIG. 1 which has separate light emitting and receiving lens systems, a WDM LiDAR based on the disclosed technology can be implemented to share the light emitting and receiving optics for the different lasers and this sharing can further reduce the size, weight and cost of the resulting LiDAR system.

Figure 2A:
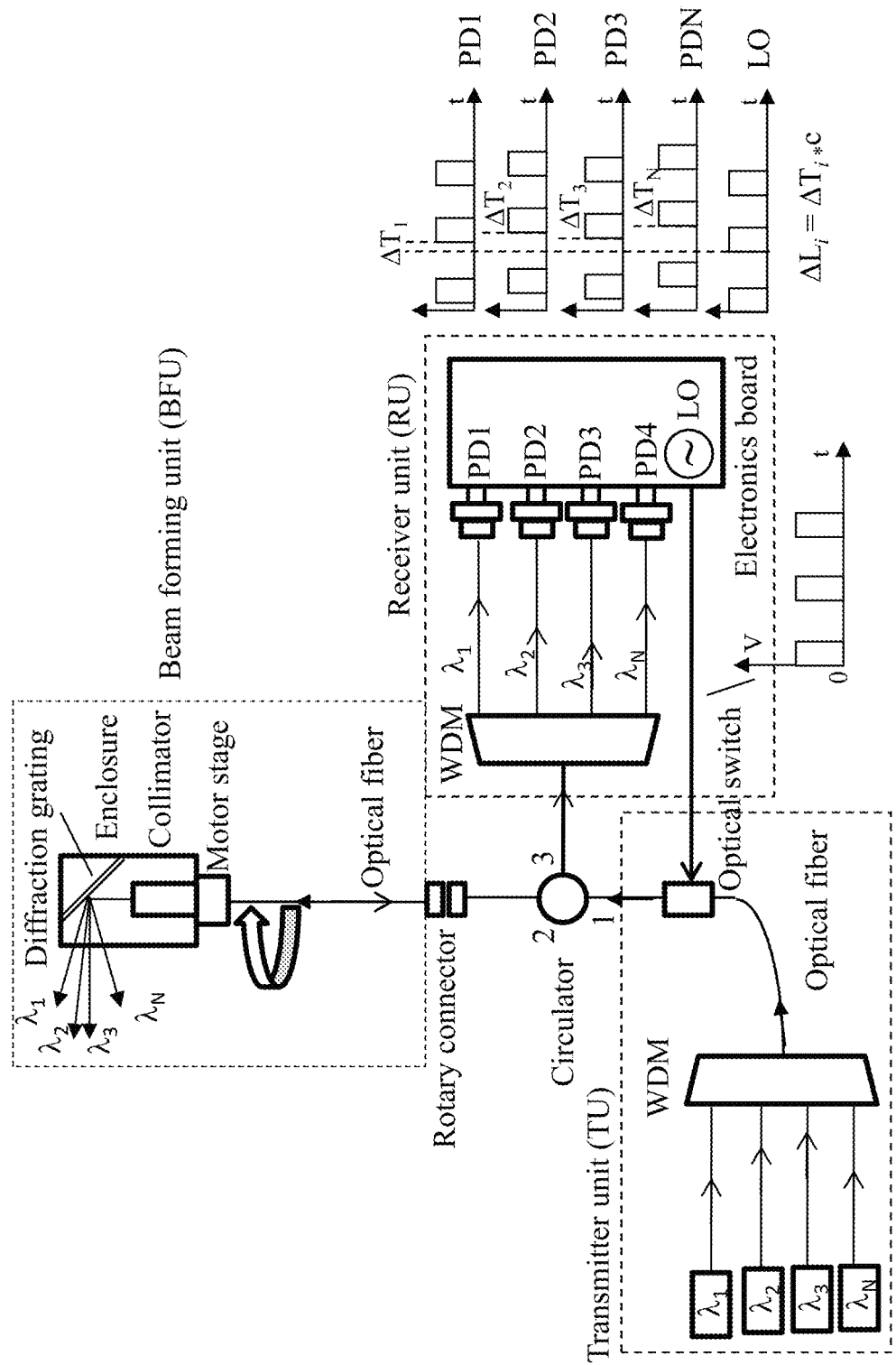
FIG. 2A shows an example of a first embodiment of the WDM based multi-channel rotating WDM LiDAR system.

FIG. 2A shows an example of a first embodiment of the WDM based multi-channel rotating LiDAR system. This LiDAR system example includes 3 main functional units: (1) a transmitter unit (TU) for generating different probe laser beams at different laser wavelengths, (2) a beam forming unit (BFU) as an optical head for using the generated probe laser beams to form output probe laser beams at different directions, for sending out the probe laser beams and for receiving the returned probe light, and (3) a receiver unit (RU) for receiving the returned probe light from the BFU and detecting different returned probe light at different wavelengths, respectively, as indicated in the dotted boxes. Multiple lasers with different wavelengths on telecom ITU grid in the transmitter unit TU may be used to generate the probe laser beams which are combined by a WDM module into a fiber. The WDM module can be implemented in various configurations, including, e.g., an arrayed waveguide grating (AWG), a thin film coating based WDM module, or other suitable WDM technologies. The fiber directs the combined optical output to an optical switch or a semiconductor optical amplifier (SOA) which can be turned on and off rapidly by electrical pulses from a local oscillator (LO) circuitry. Using an SOA as the optical switch has the advantage of having both optical amplification and switching functions in one structure or device. An additional high power optical amplifier, such as an erbium doped fiber amplifier (EDFA) or a SOA, can be used to further boost the power in all wavelength channels. The combined optical output carried by the fiber, after passing through the optical switch, is next directed to an optical circulator that is coupled to the beam forming unit (BFU) so the combined optical output is received by the BFU and is further processed for output. The optical circulator is also coupled to the receiver unit (RU) so that the returned probe light from the surroundings received by the BFU can be directed to the receiver unit RU for detection.

The specific BFU example shown in FIG. 2A includes a wavelength-selective optical device that separates the received probe light from the fiber with different WDM wavelengths into different output probe beams at the different WDM wavelengths, respectively. For example, a diffraction grating may be one implementation of this wavelength-selective optical device for diffracting the probe light at the different WDM wavelengths into different output probe beams at different directions at the different WDM wavelengths, respectively. An optical collimator may be provided to collimate the combined optical output containing light at different WDM wavelengths from the fiber when incident on the diffraction grating which diffracts the incident light containing optical pulses at different WDM wavelengths into different directions to cover different vertical angles for sensing the surroundings. In the illustrated example in FIG. 2A, a motor fixture or motor is engaged to the BFU to rotate the optical collimator and the grating assembly horizontally around a vertical axis to cover a desired FOV so that all the beams of different WDM wavelengths at different vertical angles are scanned or rotated horizontally to sense different parts of the surroundings.

The BFU in the example in FIG. 2A is also a rotating optical receiver to receive the returned probe light at the different WDM wavelengths from the surroundings. In operation, the returned probe light at the different WDM wavelengths is received by the wavelength-selective optical device (e.g., a diffraction grating) and the retro-reflected probe light at the different WDM wavelengths would be recombined into a single combined return probe beam having light in the different WDM wavelengths and the single combined return probe beam is directed into the optical collimator and is coupled into the fiber to the optical circulator. The optical circulator redirects the single combined return probe beam to the RU. The RU includes a WDM demultiplexer which separates light in the single combined return probe beam at the different WDM wavelengths into different and separated return probe beams at the different WDM wavelengths along separate optical paths. Under this design, non-retro-reflected probe light at a particular WDM wavelength does not retrace the same light path as the retro-reflected light and thus does not return to the optical fiber. Accordingly, the optical design of the BFU can automatically reject non-retro-reflected probe light from being routed back to the optical fiber. Different optical detectors, such as photodiodes PDs, are placed in the different optical paths to receive the separated return probe beams at the different WDM wavelengths, respectively. In addition, the WDM demultiplexer operates an optical filter and a spatial filter to prevent light at a WDM wavelength from getting into an optical detector designed to detect light at light at another WDM wavelength. An electronic board with detector circuitry is coupled to receive the detector output signals from the optical detectors, respectively, and processes the detector output signals to generate the analog LiDAR signals for further processing. The local oscillator (LO) circuitry for controlling and operating the optical switch or SOA may also be included in the electronic board. A timing chart of the LO signal is provided below the RU in FIG. 2A. As shown by the example timing charts of the detector output signals on the right-hand side of the RU in FIG. 2A, the pulses in the detector output signals reflect different time delays with respect to the pulses in the LO signal and contain position information of detected objects encountered by the scanning output probe beams at the different WDM wavelengths.

Figure 2B:
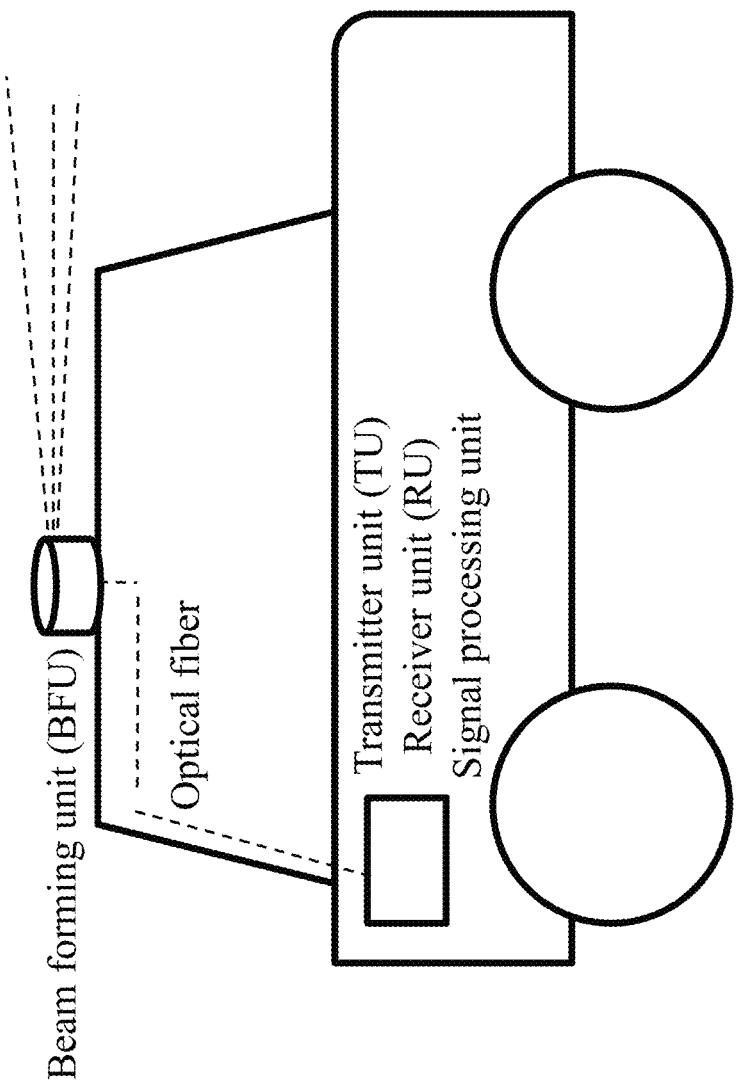
FIG. 2B shows an example for the placement of the WDM based multi-channel rotating LiDAR system. The BFU can be put on the top of the car and the transmitter, receiver, and signal processing units can be placed in the trunk or base of the car.

FIG. 2B shows an example of placement of the BFU of the LiDAR on the top of a vehicle while TU, RU and a signal processing unit are physically separated from the BFU and placed in selected parts of the vehicle (e.g., hidden in an interior of the car). The TU and RU are optically linked to the BFR via optical fiber. The rotation of the BFU causes the scanning of the different probe laser beams (at different WDM wavelengths) at different vertical angles. The transmitter and receiver units TU and RU have the flexibility of being located remotely from the BF unit with the rotating optical head, connected by a single optical fiber. For example, the transmitter and receiving units TU and RU can be placed in the trunk of a car, and the BF unit can be mounted on the top of the car, which makes the BF unit simple, compact, and light. In other implementations, all three different units can be located in three different locations in the body of a car, depending on the convenience and the needs of a particular application.

In the example in FIG. 2A, the rotating BF unit and the circulator can be connected with a fiber optic rotary connector, which allows the BF unit to be rotated rapidly while keeping the rest of the system, including TU and RU, stationary. The reflected beams of different directions (at different WDM wavelengths) are coupled back into the fiber and are directed by the circulator into the receiving unit (BU). The receiving unit BU includes a WDM demultiplexer that separates light at different WDM wavelengths into different light beams along different optical paths leading different photodetectors (which can be PIN diode, APD, photomultiplier, or other types of detectors). The photodetectors convert the received light into electrical pulses corresponding to the light pulses in the received light and the timings of such detected pulses are then compared with the pulses from LO. The time difference is directly proportional to the distance of the obstacles detected by pulses of different WDM wavelengths.

Under this design, returned light at different WDM wavelengths correspond to different beam vertical angles, respectively, for probing different regions in the surroundings and therefore a three dimensional point cloud map can be generated using the information of the beam vertical angle (wavelength or photodetector number), the horizontal rotation angle (motor rotation angle), and the distance (timing difference). Using the existing or other WDM technologies developed for telecommunications industry, a large number of WDM wavelengths is available to cover the vertical field of view (FOV) requirement for autonomous vehicle applications (e.g., more than 80 wavelength channels in the C-band).

In the example in FIG. 2A, only a single optical switch is used to generate optical pulses for lights from all lasers. In addition, a single optical amplifier can be used to amplify light beams from all lasers. An SOA can be used as both the optical switch and amplifier to further reduce the cost. This sharing of components by different WDM channels can reduce the number of components and the cost of the overall LiDAR system.

In the example in FIG. 2A, only a single optical fiber is used to deliver light at the different WDM wavelengths from all lasers in the transmitter unit TU to the fiber collimator in the beam forming unit BFU. The returned light of the different WDM wavelengths from targets is coupled back to the same collimator and the same fiber, and is directed by the optical circulator into the receiver unit. Therefore, under this design, the same optics is used for both the light emission and optical reception. This sharing of optics reduces or minimizes the number of the optical parts and reduces the cost and size.

Figure 3:
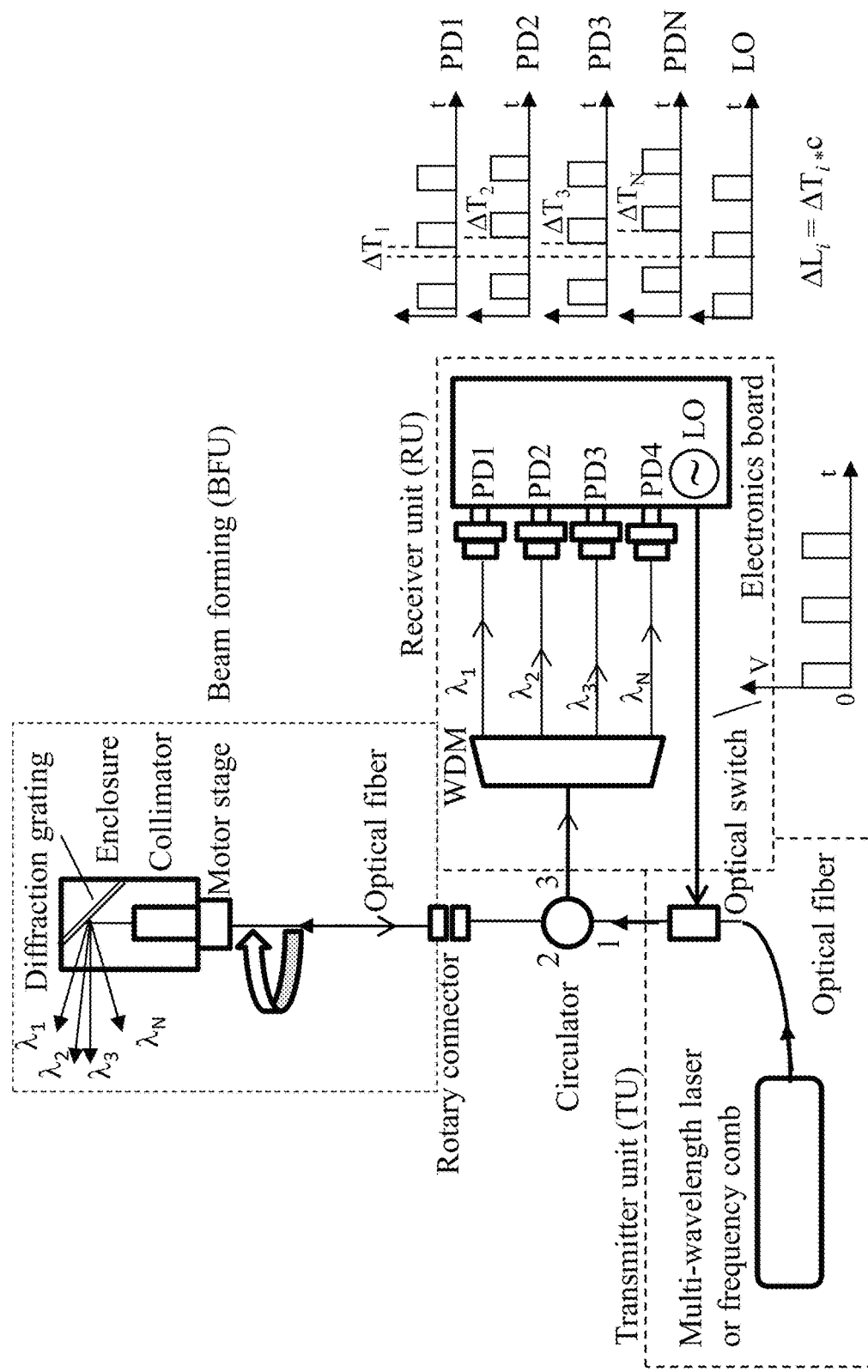
FIG. 3 shows an example of a second embodiment of the WDM based multi-channel rotating LiDAR system. A multi-wavelength laser or a frequency comb, such as a mode-locked laser is used to replace the multiple lasers used in FIG. 2.

FIG. 3 shows an example of a second embodiment of the WDM based multi-channel LiDAR system based on the disclosed technology. Like the example in FIGS. 2A and 2B, a motor is used to rotate the BFU. A multi-wavelength laser or a frequency comb, such as a mode-locked laser is used to replace the multiple lasers used in FIG. 2A to generate laser light at the different WDM wavelengths. The optical switch coupled between the laser source and the optical circulator is clocked by the LO clock signal. In some implementations, a mode-locked laser is used to generate laser pulses with the frequency comb at the different WDM wavelengths and, if the repetition rate of the mode-locked laser is sufficiently low, the optical switch can be eliminated and the LO clock can be used to control the optical modulator in the mode-locked laser. For the case of using a mode-locked laser with relatively low repetition rate, the LO can be used to drive the modulator inside the mode-locked laser.

Figure 4:
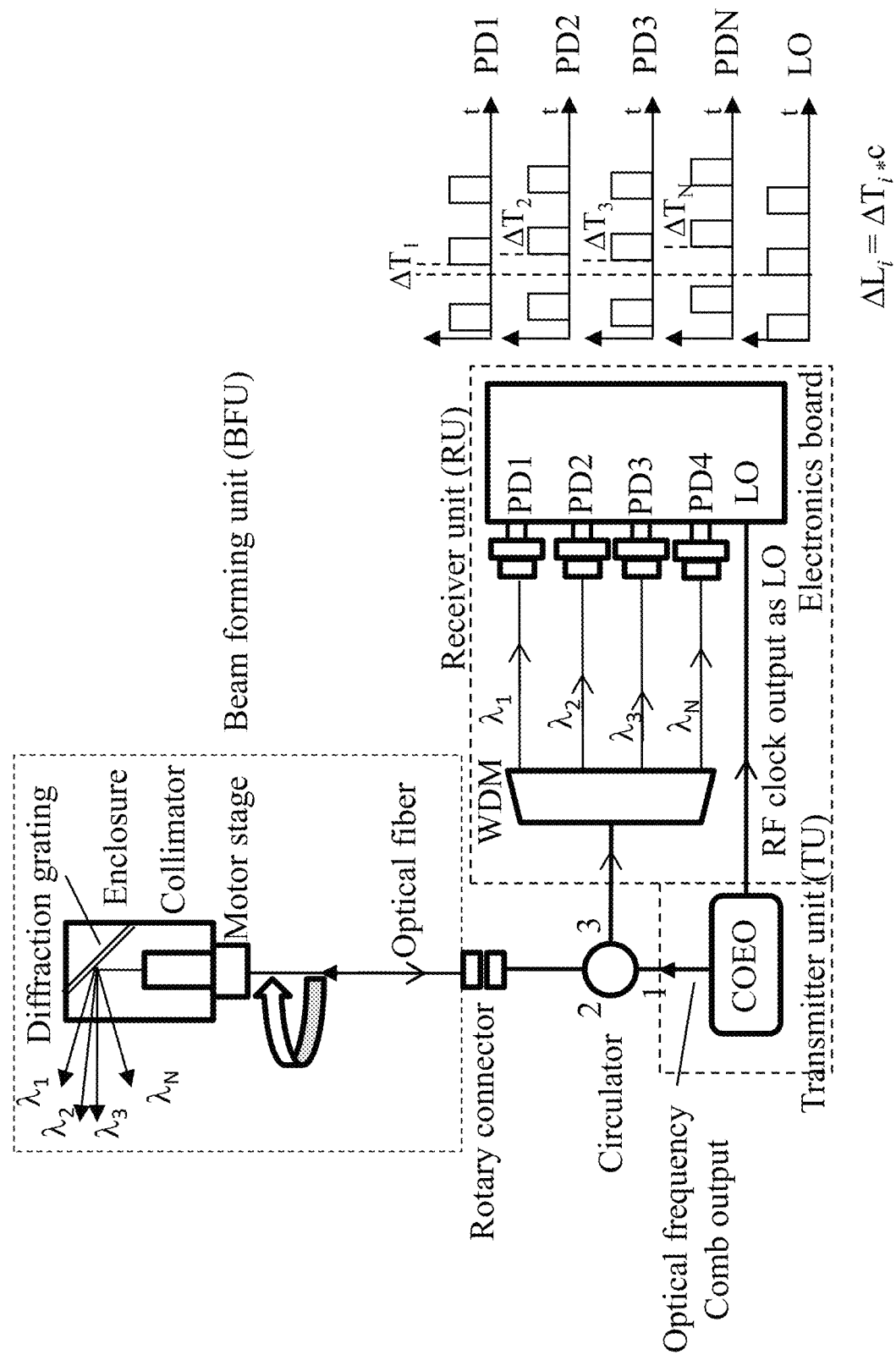
FIG. 4 shows an example of a third embodiment of the WDM based multi-channel rotating LiDAR system. This example also shows a use of a coupled opto-electronic oscillator (COEO) to generate the frequency comb and an example of using the RF output of the COEO as the clock of the local oscillator for timing.

FIG. 4 shows an example of a third embodiment of the WDM based multi-channel LiDAR system based on the disclosed technology. A coupled opto-electronic oscillator (COEO) is used to generate the probe laser light at the different WDM wavelengths in a frequency comb. The COEO also functions as an optical switch that is in the designs in FIGS. 2A and 3. In addition, the RF output of the COEO is used as the clock of the local oscillator for providing the timing reference in detecting the delays in the returned optical pulses in the returned probe light at the different WDM wavelengths. Like the example in FIGS. 2A and 2B, a motor is used to rotate the BFU. More details on COEO devices are provided in later sections of this document.

Figure 5:
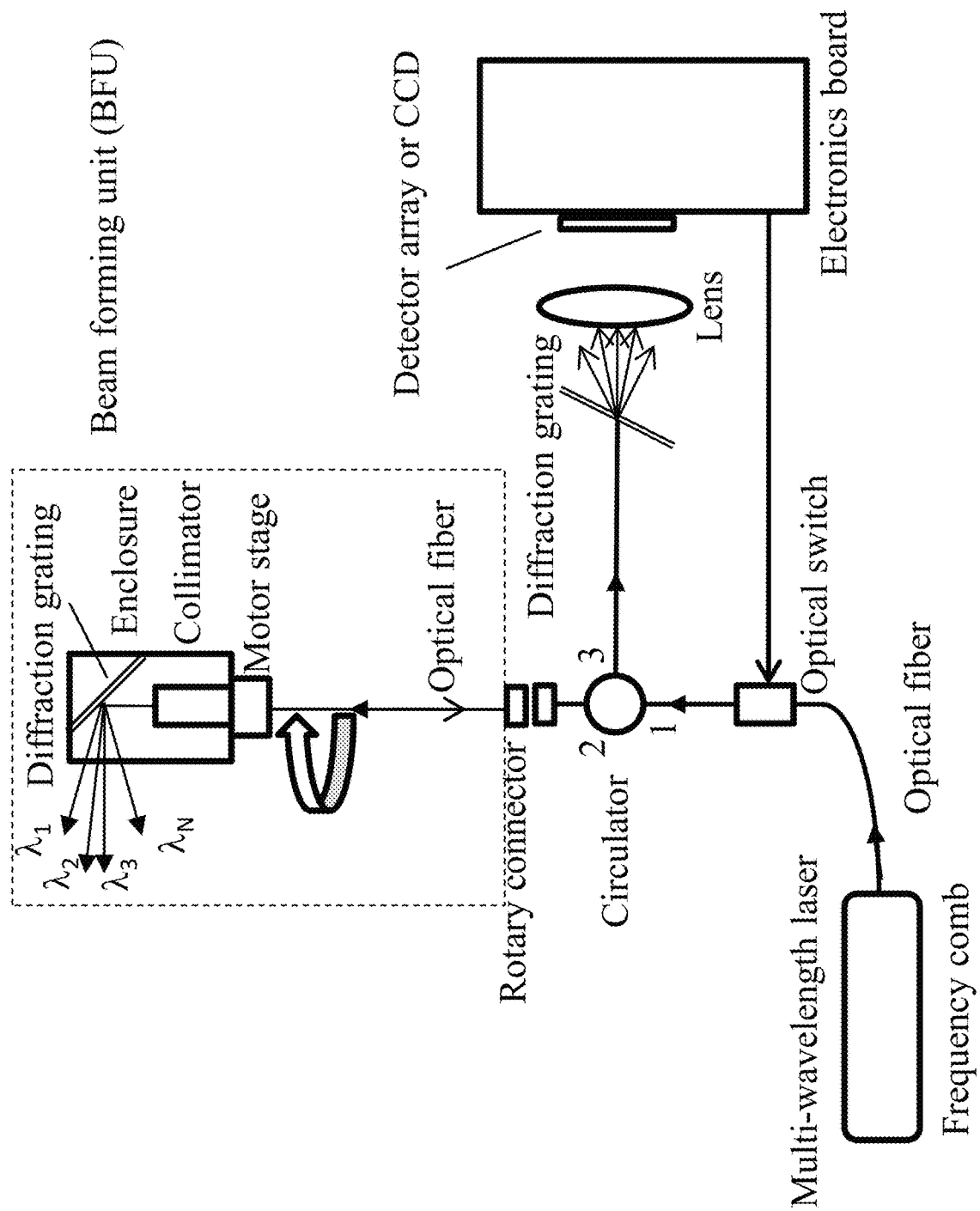
FIG. 5 shows an example of a fourth embodiment of the WDM based multi-channel rotating WDM LiDAR system.

FIG. 5 shows an example of a fourth embodiment of the WDM based multi-channel LiDAR system. One or more lasers can be used to generate the probe laser light at the different WDM wavelengths as disclosed above. In this example, a diffraction grating system is used to de-multiplex the returned signals at the different WDM wavelengths into different returned beams at the different WDM wavelengths, respectively, for optical detection. In this specific example as illustrated, a lens is used to receive the different returned beams at the different WDM wavelengths from the diffraction grating and to direct the beams to a detector array such as a CMOS sensor array or a CCD sensor array. Like the example in FIGS. 2A and 2B, a motor is used to rotate the BFU.

Figure 6:
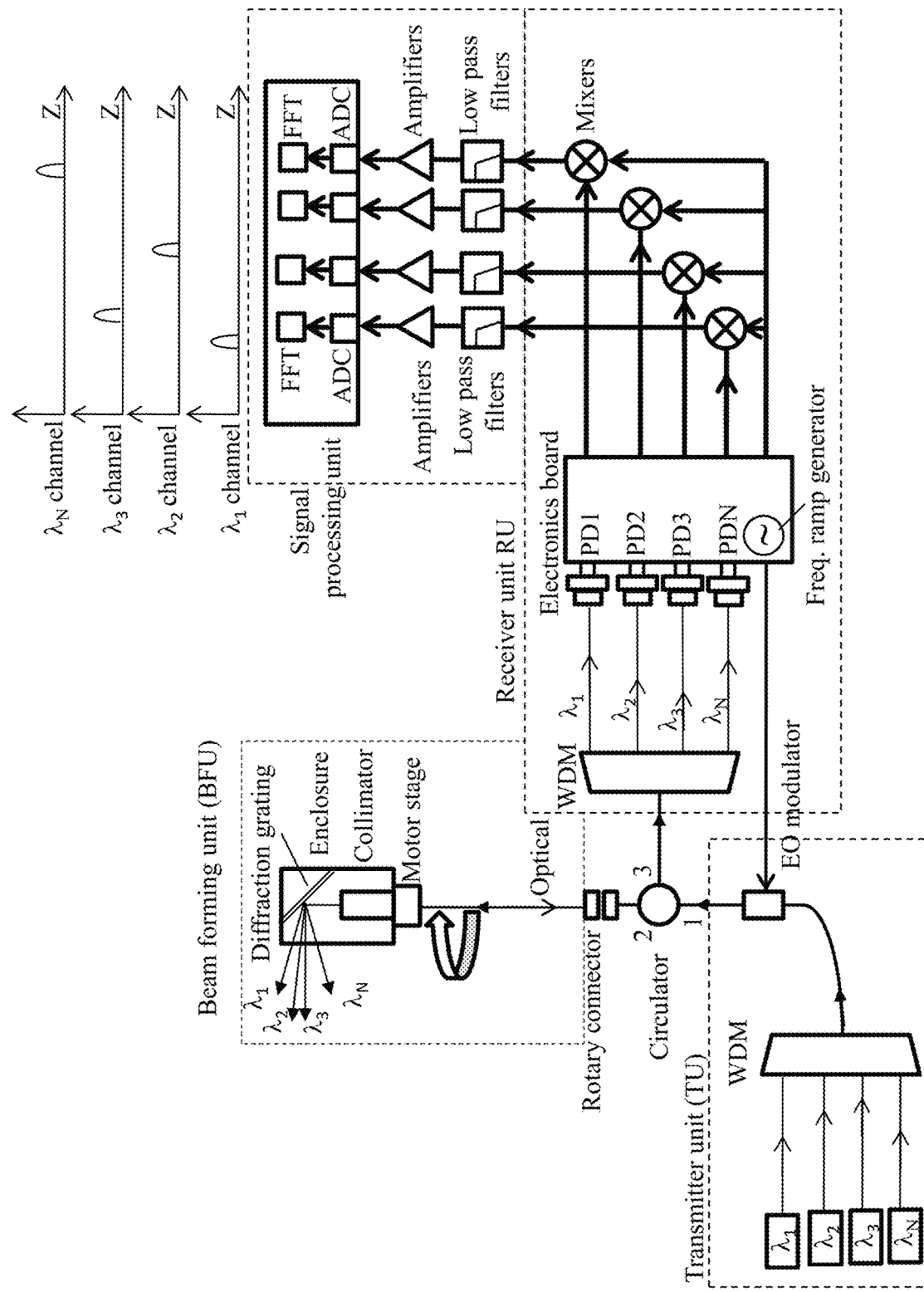
FIG. 6 shows an example of a fifth embodiment of the WDM based multi-channel rotating WDM LiDAR system.

FIG. 6 shows an example of a fifth embodiment of the WDM based multi-channel LiDAR system using a frequency modulated continuous wave (FMCW) scheme to obtain distance information of optical reflections. Different continuous wave (CW) lasers are used in this example to generate different laser beams at different WDM wavelengths. A frequency ramp generator, which may be included in the electronics board, is used to generate a frequency ramp signal applied to drive an electro-optic modulator (EO modulator) for modulating the laser beams at the different WDM wavelengths simultaneously with a modulation frequency chirp. The beams in the fiber are then coupled into the BF unit via a rotary connector. The modulated beams are directed into the BFU and, after reaching the diffraction grating, the laser beams of the different WDM wavelengths are diffracted into different directions vertically as separate outgoing probe laser beams for sensing the surroundings. The returned beams at the different WDM wavelengths from targets in the surroundings are received by the BFU and are coupled back to the fiber and directed to the WDM demultiplexer in the receiving unit RU to be de-multiplexed into different returned beams at the different WDM wavelengths to be respectively received and detected by different photodetectors. The detected signals are then amplified and filtered before mixing with the frequency ramp signal from the frequency ramp generator. The outputs from the mixers are then filtered by the low-pass filters before converting into digital signals by analog to digital converters (ADCs). In the digital processing, the detector signals are processed via Fast Fourier Transform (FFT) to obtain the reflection vs. distance information in the signal processing unit. Like the example in FIGS. 2A and 2B, a motor is used to rotate the BFU. The above signal process can be applied to other embodiments of WDM based multi-channel LiDAR systems.

Figure 7:
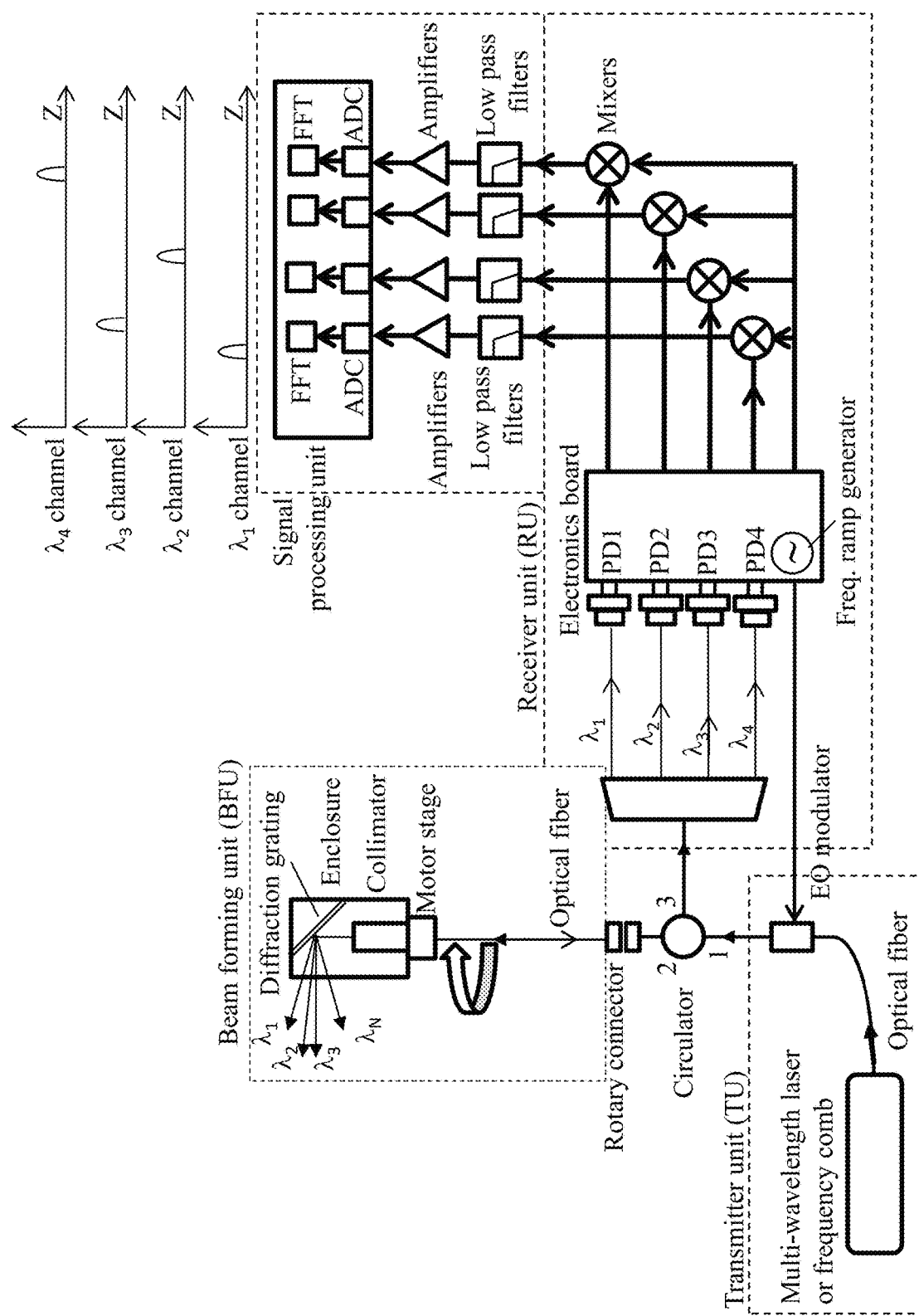
FIG. 7 shows an example of a sixth embodiment of the WDM based multi-channel rotating WDM LiDAR system.

FIG. 7 shows an example of a sixth embodiment of the WDM based multi-channel LiDAR system based on various features in the example in FIG. 6, except that the multiple CW lasers with different wavelengths in the transmitter unit in FIG. 6 are replaced with a multi-wavelength laser or a frequency comb. Like the example in FIGS. 2A and 2B, a motor is used to rotate the BFU.

Figure 8:
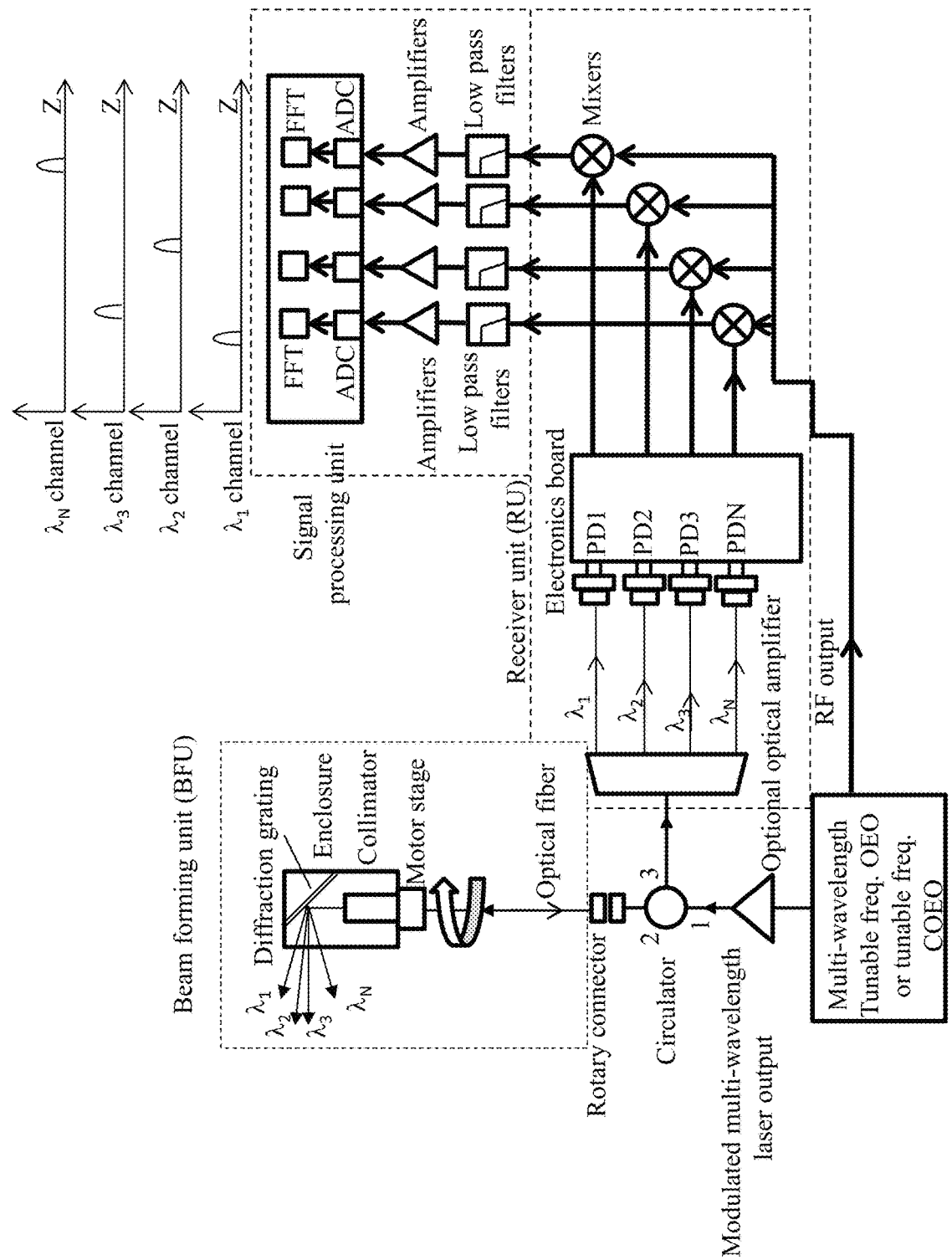
FIG. 8 shows an example of a seventh embodiment of the WDM based multi-channel rotating WDM LiDAR system.

FIG. 8 shows an example of a 7th embodiment of the WDM based multi-channel rotating LiDAR system based on various features in the example in FIG. 6 except that here the multiple CW lasers with different wavelengths in the transmitter unit are replaced with a multi-wavelength tunable frequency Opto-electronic Oscillator (OEO) or a tunable frequency COEO to generate the probe laser light at different WDM wavelengths. The RF output from the OEO or COEO is used as a LO signal to be mixed with the received signals of different wavelengths from the receiver unit. Like the example in FIGS. 2A and 2B, a motor is used to rotate the BFU. More details on multi-wavelength tunable frequency OEO devices are provided in later sections of this document.

FIG. 9A shows an example for implementing a multi-wavelength transmitter integrated in a photonics integrated circuit (PIC) for implementing the WDM based multi-channel rotating LiDAR systems in FIG. 2A and FIG. 6. Different lasers are provided to generate the laser beams at different WDM wavelengths and a WDM multiplexer is provided to combine the different laser beams into a combined laser beam. In some implementations, for example, the wavelength division multiplexer can be made with AWG technology or other integrated optic technologies. Downstream from the WDM multiplexer, an optical modulator, e.g., an electro-optic modulator (EOM) or an electro-absorption modulator (EAM) can be used as an optical switch turn on and off the laser light in response to drive to a LO signal or other reference signal. An optical amplifier, such as an SOA, may also be used as an optical switch in addition to providing a function of an amplifier. Other type optical amplifiers, such a doped waveguide optical amplifier, can be used to simply boost the power of the light in all the WDM wavelengths. The output of this TU is coupled to a fiber pigtail for delivery by a fiber coupled to the BFU and the RU in FIGS. 2 and 6.

FIG. 9B shows an example for implementing a multi-wavelength receiver integrated in a photonics integrated circuit (PIC) for using in FIGS. 2, 3, 4, 6, 7, and 8. A wavelength division demultiplexer is provided to split the received light into different optical signals at the different WDM wavelengths and this WDM can be made with AWG technology or other integrated optic technologies in implementations. At the input of this RU, an SOA can be used as a gated optical amplifier to improve signal to noise ratio because it has both the switching and amplification functions.

FIG. 9C shows an example for implementing a first embodiment of a beam forming and rotation (BF) unit integrated on a PIC chip. Different other BFU designs using a diffraction grating, a lens array of lenses is used in FIG. 9C to direct light of different WDM wavelengths into different vertical directions by optical alignment offsets for the different WDM channels. Specifically, the vertical direction α of each beam at a particular WDM wavelength can be set by controlling the offset distance d of each beam (e.g., or a waveguide for carrying each beam) to the center line of an optical axis of its corresponding lens by $\alpha = \tan^{-1}(d/f)$, where f is the focal length of the lens. In some implementations, the chip with the BF unit may be mounted on a motor stage to rotate continuously to cover 360 degree azimuth angles or to scan back and forth over a certain angle.

FIG. 9D shows an example for implementing a second embodiment of a BF unit integrated on a PIC chip. A single lens is used to direct light from different waveguides into different vertical directions. The ith beam's vertical direction $\alpha_i$ can be determined by the distance $d_i$ of the ith waveguide to the center line of the lens by $\alpha_i = \tan^{-1}(d_i/f)$, where f is the focal length of the lens. The chip is mounted on a motor stage to rotate continuously to cover 360 degree azimuth angles or to scan back and forth over a certain angle.

In implementations, the transmitter PIC chip, the receiver PIC chip, and the BF PIC chip can be all packaged together or even integrated on a same larger PIC chip.

The example in FIGS. 2A and 2B and other examples above use a motor to rotate the BFU around a vertical rotation axis to horizontally scan a set of different probe laser beams at different vertical angles (at different WDM wavelengths) to form a cone of probe laser beams for 3-D scanning and sensing. In other examples disclosed in this document, WDM LiDARs may be used to eliminate such a motor or other moving parts associated with the beam scanning while enabling formation of a cone of beams, each with a different wavelength for 3-D sensing. In such a WDM 3D beam forming, the motor fixture and the rotary connectors can be eliminated to minimize mechanical failures resulting from the moving mechanical parts.

Figure 10:
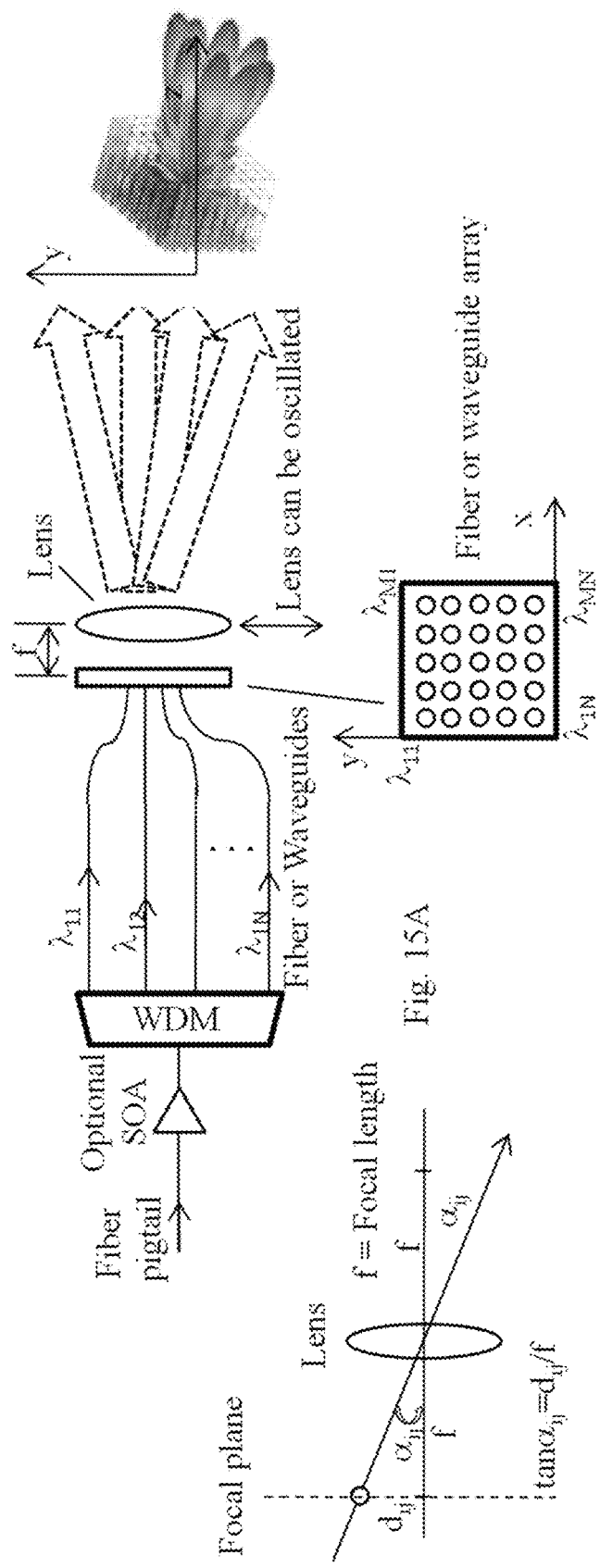
FIG. 10 shows an example of a WDM based 3D beam forming without moving beams or moving parts. Fiber or waveguide tips corresponding to different wavelengths are arranged in a 2D array. The array is placed on the focal plane of a collimating lens. The light beams from different fiber tips will form a 3D cone. Multiple such beam cones can be put together to cover a bigger space or arranged in a circle to 360 degrees with a vertical FOV. Alternatively, a beam cone can be rotated horizontally to cover 360 azimuth degrees with a vertical FOV, with the advantage of much reduced requirement on the rotational angular resolution. For example, if 3D beam cone has an azimuth FOV of 30 degrees, a rotational angular resolution of 30 degrees is sufficient, requiring only 12 steps for a full 360 degree rotation. In addition, the relative position between the 2D array and the lens can be moved or oscillated in x or y directions for quickly steering the beam cone with a certain range. For example, one may oscillate the lens vertically or horizontally to cause the beam cone to steer vertically or horizontally.

FIG. 10 shows one example implementation of a WDM based 3D beam forming without moving beams or moving parts. Fiber or waveguide tips corresponding to probe beams at the different WDM wavelengths are arranged in a 2D array. The array is placed on the focal plane of a collimating lens. The light beams from different fiber tips form a 3D cone of the light beams at the output of the collimating lens, with the direction angle $\alpha_{ij}$ of each beam determined by the distance $d_{ij}$ of the corresponding fiber tip to the center line of the lens by $\alpha_{ij} = \tan^{-1} d_{ij}/f$, where f is the focal length of the lens. Multiple such beam cones can be put together to cover a bigger space or arranged in a circle to 360 degrees with a vertical FOV. The BF unit of FIG. 10 can be used to replace the BF units in FIGS. 2-8 so that the motor fixtures and the rotary connectors can be eliminated.

Figure 11A:
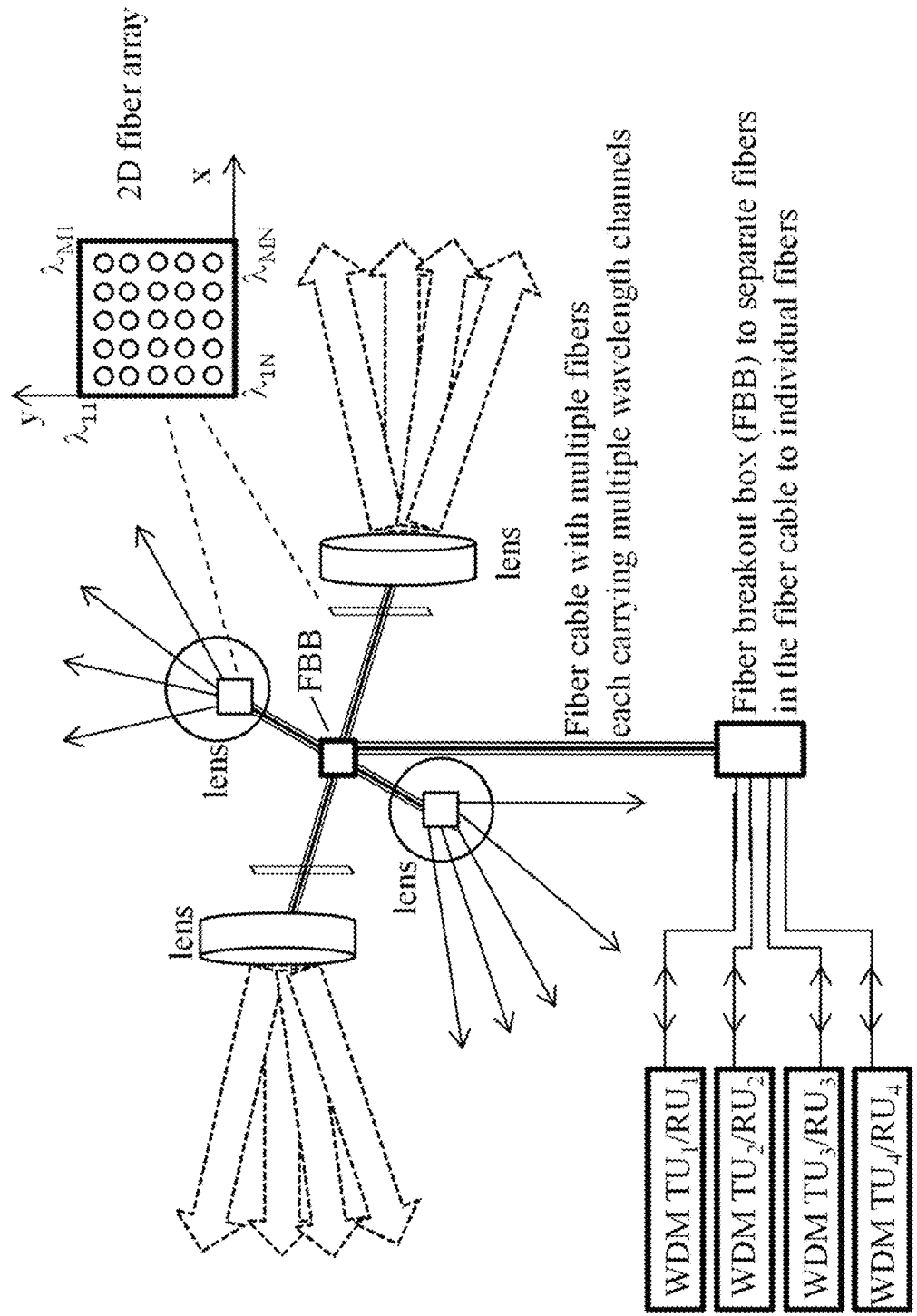
FIG. 11A shows an example of using multiple WDM 3D beam forming units with multiple beams cones to cover wide azimuth and vertical FOV's without beam scanning. The fiber cable with multiple fibers each carrying multiple wavelength channels to feed signal to a WDM 3D beam forming unit. The multiple WDM 3D beam forming units are arranged to cover the targeted spaces of interest. As illustrated, four sets of WDM TU, RU and BFU's are used, each set can use the same wavelength channels or different wavelength channels.

FIG. 11A shows an example of a WDM based multi-channel LiDAR system using multiple WDM 3D beam forming units with multiple beams cones shown in FIG. 10 to cover wide azimuth and vertical FOV's without using moving parts and beam scanning. A fiber cable or bundle having multiple fibers are provided to carry light of the different WDM wavelengths, respectively, and each fiber carries light of one of the multiple WDM wavelength channels to feed the optical signals at the different WDM wavelengths to a WDM 3D beam forming unit having multiple WDM 3D beam forming units. The multiple WDM 3D beam forming units are arranged to cover the targeted spaces of interest. As illustrated, four sets of WDM TU, RU and BFU's are used, each set can use the same wavelength channels or different wavelength channels.

Figure 11B:
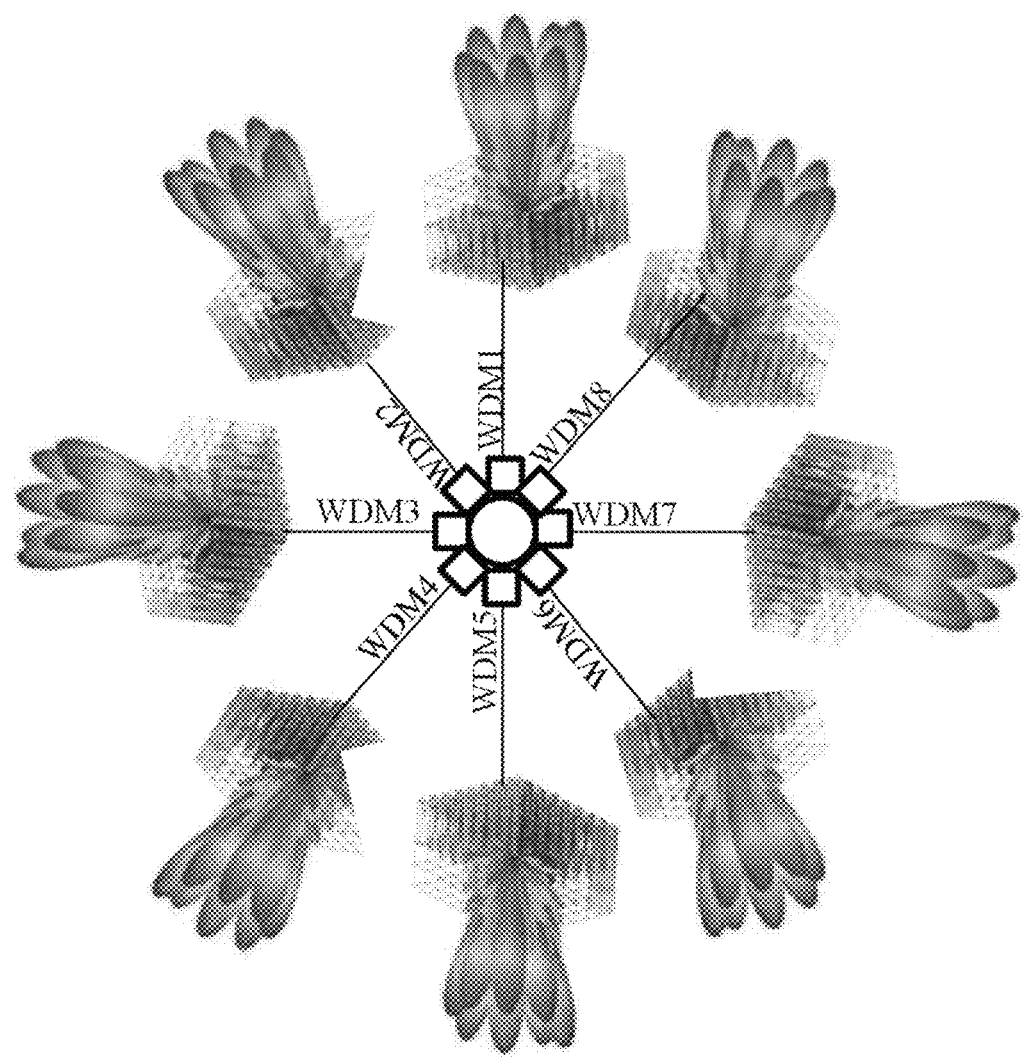
FIG. 11B shows an example of using multiple WDM 3D beam forming units with multiple beams cones to cover wide azimuth FOV and vertical FOV without beaming scanning. Here 8 WDM 3D beam forming units are arranged in a circle to cover 360 azimuth FOV without beam scanning; each WDM 3D beam forming unit can also cover required vertical FOV. There are also 8 sets of WDM TX and RX units, each is connected with a corresponding WDM BF unit.

FIG. 11B further illustrates an example of a WDM 3D beam forming unit having multiple WDM 3D beam forming units to produce multiple beams cones to cover wide azimuth FOV and vertical FOV without beaming scanning. This particular example uses 8 WDM 3D beam forming units that arranged in a circle to cover 360 azimuths FOV without beam scanning; each WDM 3D beam forming unit can also cover a desired vertical FOV. Similar to the arrangement in FIG. 11A, the same number of sets of WDM TU and RU units are provided, each connected with a corresponding WDM BFU.

The beam forming unit example shown in FIG. 9C may also be configured as a 3D beam forming unit to perform the similar 3D beam output as the example in FIG. 10 for implementing the WDM based multi-channel LiDAR system using multiple WDM 3D beam forming units shown in FIGS. 11A and 11B. The lens array shown in FIG. 9C can be arranged as a 1-dimensional array or a 2-dimensional array of lenses. To produce the similar 3D beam output as the example in FIG. 10, the lens array in FIG. 9C can be configured as a 2D lens array and the optical output terminals of the optical waveguides or fibers from the WDM demultiplexer can be respectively coupled the lenses in the 2D lens array to output a cone of output beams at different WDM wavelengths at different output beam directions.

Referring back to the example in FIG. 8, an Opto-electronic Oscillator (OEO) can be used to generate the probe laser light at different WDM wavelengths. Various implementations of such an OEO can include an electrically controllable optical modulator that receives input light such as laser light to produce a modulated optical output, an opto-electronic feedback loop that comprises an optical part and an electrical part interconnected by a photodetector to receive the modulated optical output from the optical modulator and to convert the modulated optical output into an electrical signal to control the optical modulator so that the modulated optical output is modulated to carry an electrical RF or microwave oscillation signal at a radio frequency or microwave frequency. The opto-electronic feedback loop is structured to feed the electrical signal in phase to the optical modulator to generate and sustain both optical modulation and electrical oscillation at the radio frequency or microwave frequency. OEOs are known for their unique properties or characteristics, including low phase noise, spectral purity or narrow spectral width, immunity to EM interference, sharp falloff in the frequency domain, availability of optical processing and optical transmission, among others.

A variety of OEO configurations have been developed. U.S. Pat. Nos. 5,723,856 and 5,777,778 provide examples of single-loop OEOs and multi-loop OEOs. Another type of OEOs is coupled opto-electronic oscillators ("COEOs") described in U.S. Pat. No. 5,929,430 where a COEO directly couples a laser oscillation in an optical feedback loop to an electrical oscillation in an opto-electronic feedback loop. OEOs may be constructed by including optical resonators in the OEO loops as disclosed in U.S. Pat. No. 6,567,436 in which various forms of optical resonators may be used including optical whispering gallery mode resonators (e.g., U.S. Pat. Nos. 6,389,197 and 6,795,481) and other compact resonators such as integrated ring resonators for forming integrated opto-electronic oscillators having optical resonators (e.g., U.S. Pat. No. 6,873,631). OEOs can also be implemented by having at least one active opto-electronic feedback loop that generates an electrical modulation signal based on the stimulated Brillouin scattering where a Brillouin optical medium is included in the feedback loop to provide a natural narrow linewidth of the Brillouin scattering to select a single oscillating mode (e.g., U.S. Pat. Nos. 5,917,179, 6,417,957 and 6,476,959). OEOs can be used to suppress phase noise in RF or microwave oscillation signals (e.g., U.S. Pat. No. 6,580,532). Each of the above mentioned U.S. patents is incorporated by reference and is attached here as part of the disclosure of this patent document.

In many OEO implementations, the optical input to the optical modulator in the OEO may be laser light at one laser wavelength. A multi-wavelength tunable frequency OEO device for implementing the LiDAR designs in this document and in other applications beyond LiDAR may use an optical input that contains different laser beams at different WDM wavelengths.

Figure 12:
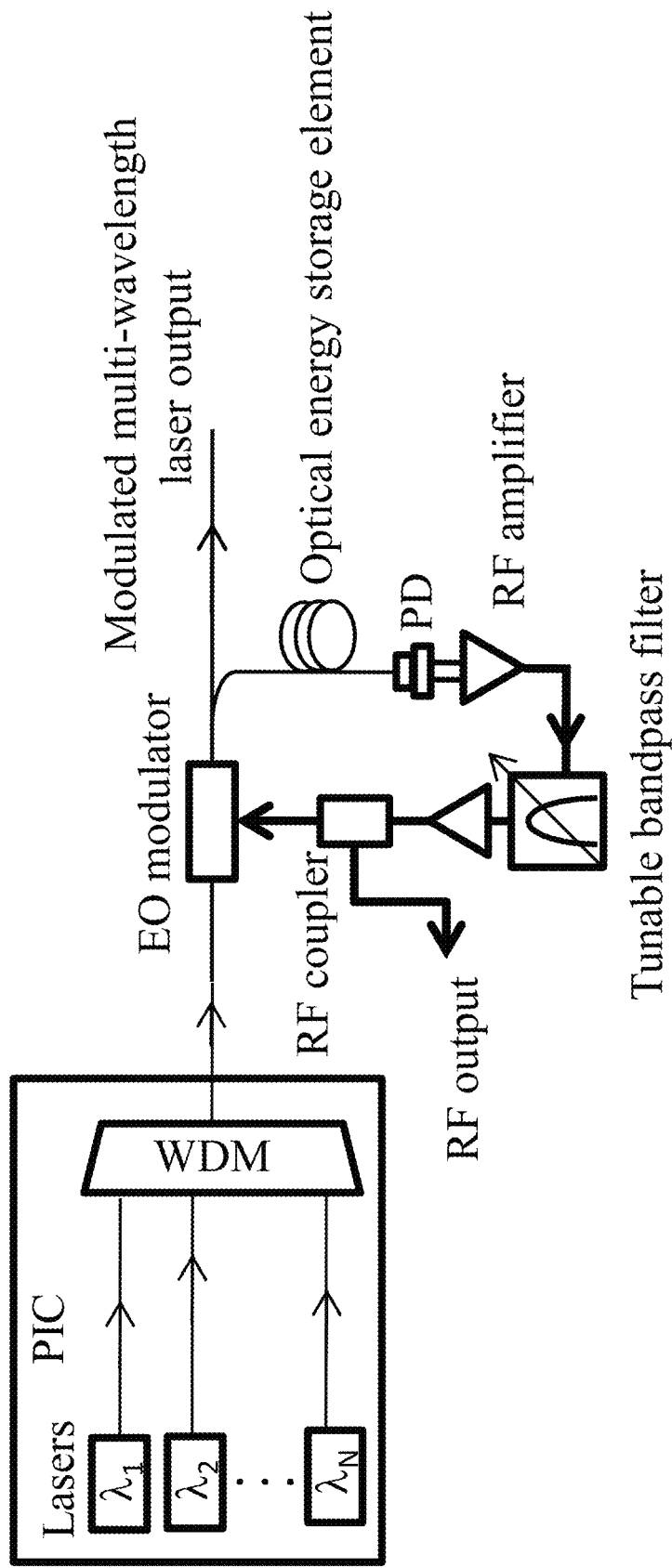
FIG. 12 shows an example of a first embodiment of a multi-wavelength tunable frequency OEO for using in FIG. 8.

FIG. 12 shows an example of a first embodiment of a multi-wavelength tunable frequency OEO for implementing the LiDAR system design in the example in FIG. 8 or in other LiDAR system designs disclosed in this patent document including, for example, the designs without moving parts in FIGS. 11A and 11B. In this example, a photonics integrated circuit (PIC) chip is provided to include different lasers at different WDM wavelengths (e.g., diode lasers or diode-laser-based lasers) and a WDM multiplexer to combine laser beams from the lasers at different WDM wavelengths into a combined beam as the optical input to the electro-optic (EO) modulator of the OEO device. In this example, the EO optical modulator is outside of the multi-laser PIC chip.

The OEO in FIG. 12 includes an opto-electronic loop formed by the EO optical modulator (or another suitable optical modulator such as an EAM) to modulate the optical input and to produce a modulated optical output, an optical delay line or an optical energy storage element (e.g., an optical resonator) coupled to receive at least a portion of the modulated optical output from the optical modulator, a photodetector as one optical-to-electrical conversion to receive the modulated optical output from the optical delay line or optical storage element, electronic circuitry coupled to the photodetector to process or condition the detector signal (e.g., a tunable RF bandpass filter, an RF amplifier and an RF coupler as shown) and to feed an electrical control signal to the optical modulator. With this opto-electronic loop, the modulated optical output produced by the optical modulator is modulated to carry an electrical RF or microwave oscillation signal at a radio frequency or microwave frequency. Here, the optical modulator is an electrical-to-optical conversion device for the OEO. The opto-electronic feedback loop is structured to feed the electrical signal in phase to the optical modulator to generate a signal gain in the loop to sustain both optical modulation and electrical oscillation at the radio frequency or microwave frequency.

In operation, the combined beam output by the WDM multiplexer having laser light at the different WDM wavelengths from the individual lasers shown in FIG. 12 is used as the optical input to the EO optical modulator and is modulated in response to the electrical control signal from the opto-electronic feedback loop. As a result of this OEO operation, the modulated optical output out of the EO optical modulator is a combined beam of different modulated optical signals at the different WDM wavelengths. At the output of the EO modulator or at another location in the optical part of the OEO loop, an optical coupler is provided to split the modulated optical output having modulated light at the different WDM wavelengths into two different optical beams: one being the output probe beam that is directed to the beamforming unit for optical sensing and another one being the optical feedback light into the optical portion of the OEO loop.

Figure 13:
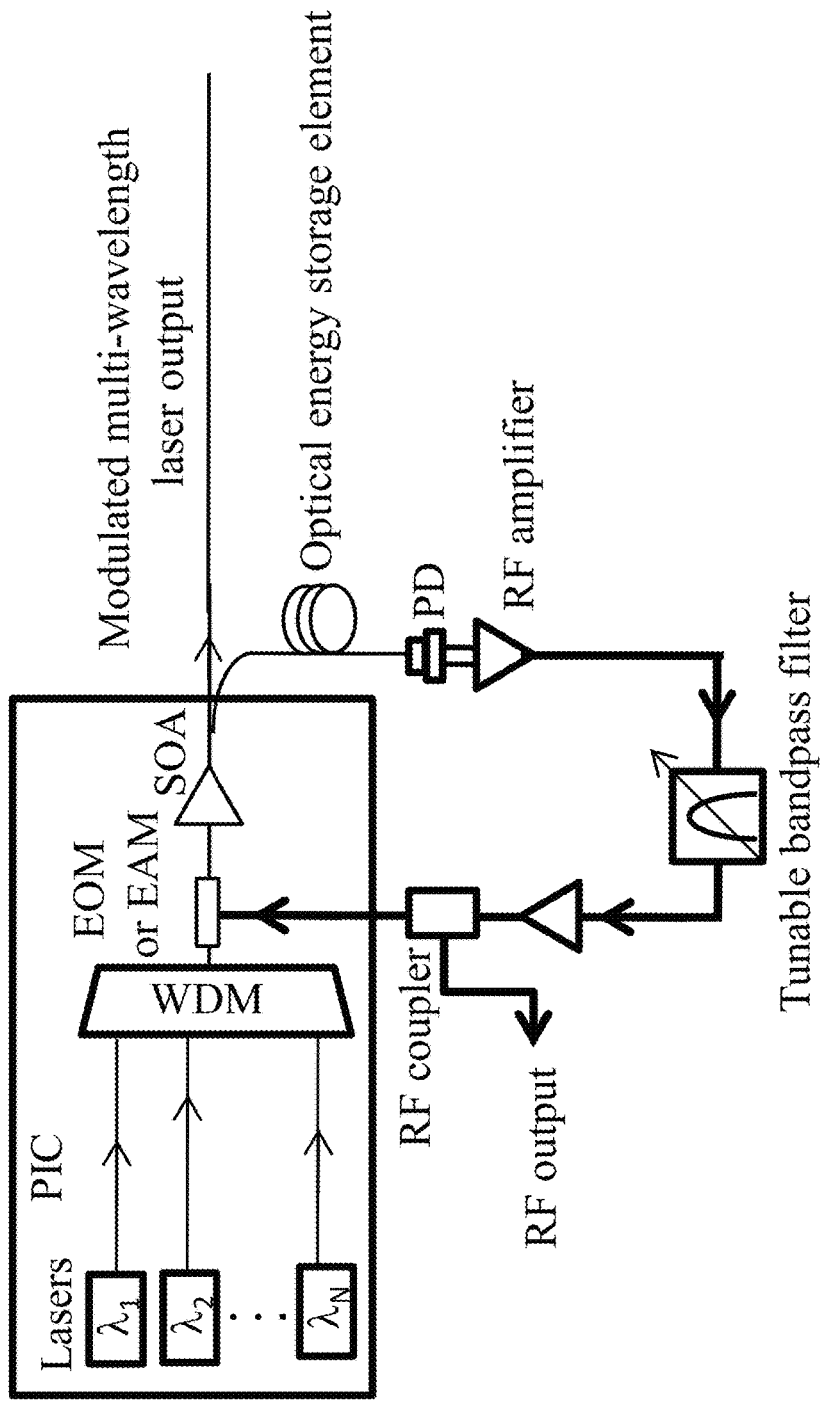
FIG. 13 shows an example of a second embodiment of a multi-wavelength tunable frequency OEO for using in FIG. 8.

FIG. 13 shows an example of a second embodiment of a multi-wavelength tunable frequency OEO for using in the LiDAR design in FIG. 8 or in other LiDAR system designs disclosed in this patent document including, for example, the designs without moving parts in FIGS. 11A and 11B. An electro-optic modulator (EOM) or electro-absorption modulator (EAM) is integrated on the multi-laser PIC chip with multiple lasers emitting laser light at different WDM wavelengths as the optical modulator for the OEO operation. In addition, an optional optical amplifier, such as a semiconductor optical amplifier (SOA), may be added to the PIC chip to amplify the modulated light output by the optical modulator.

Figure 14:
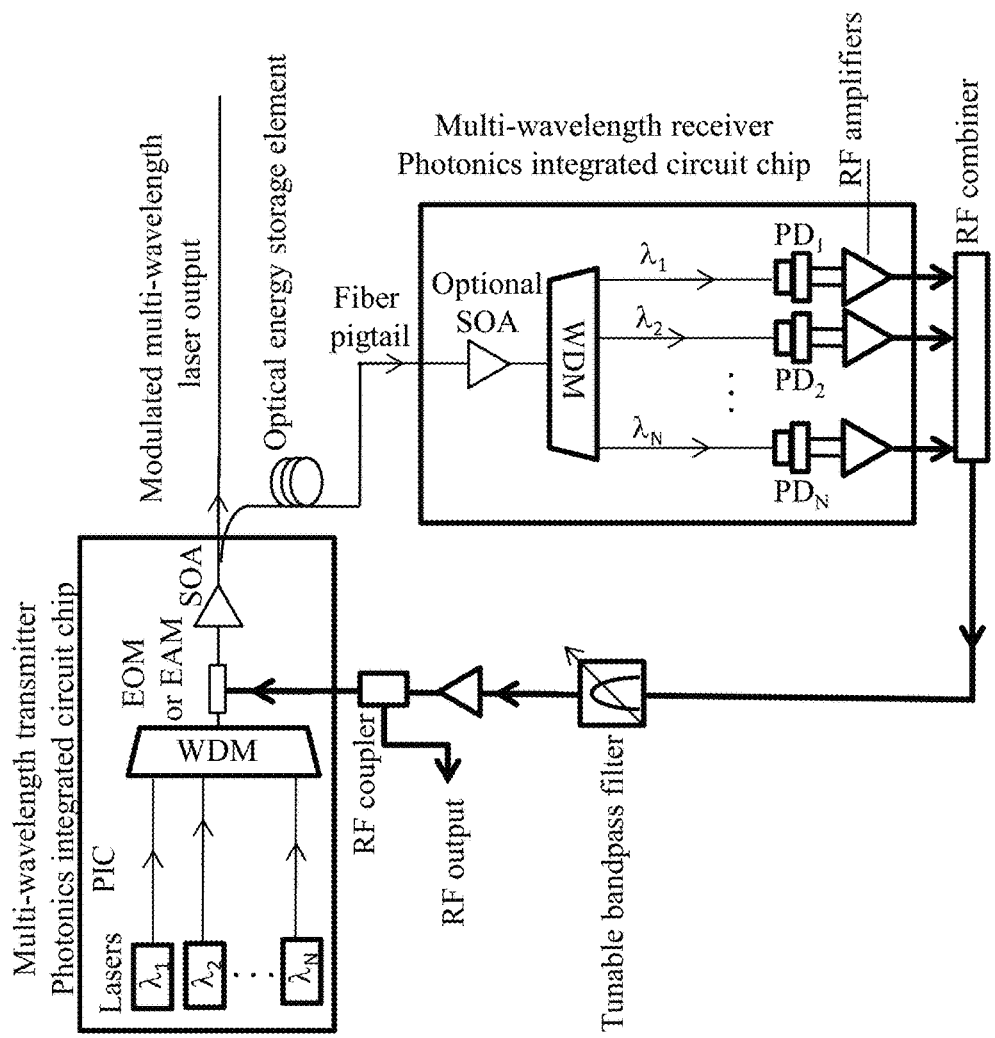
FIG. 14 shows an example of a third embodiment of a multi-wavelength tunable frequency OEO for using in FIG. 8.

FIG. 14 is an example of a third embodiment of a multi-wavelength tunable frequency OEO for using in the LiDAR design in FIG. 8 or in other LiDAR system designs disclosed in this patent document including, for example, the designs without moving parts in FIGS. 11A and 11B. In this example, the electro-optic modulator and an optional SOA are integrated on the multi-laser PIC chip. Instead of using a single optical detector to perform the optical to electrical conversion as in FIGS. 12 and 13 in the OEO loop, a multi-wavelength receiver PIC chip is used to provide different optical detectors that separately detect the returned signals of different WDM wavelengths. The detector outputs form the different optical detectors are combined by coupling a RF combiner to the outputs of the optical detectors. As shown, the multi-wavelength receiver PIC chip includes a WDM demultiplexer to separate the output light from the optical delay line or the optical energy storage element into different optical beams at different WDM wavelengths that are fed into the different optical detectors. An optional optical amplifier, such as an SOA, may be coupled before the WDM demultiplexer to amplify the light before the optical to electrical conversion at the different optical detectors. The combined RF signal from the RF combiner is directed into a tunable RF filter before being fed back to the EOM or EAM in the OEO. An RF amplifier may be optionally coupled in the electrical portion of the OEO loop.

Figure 15:
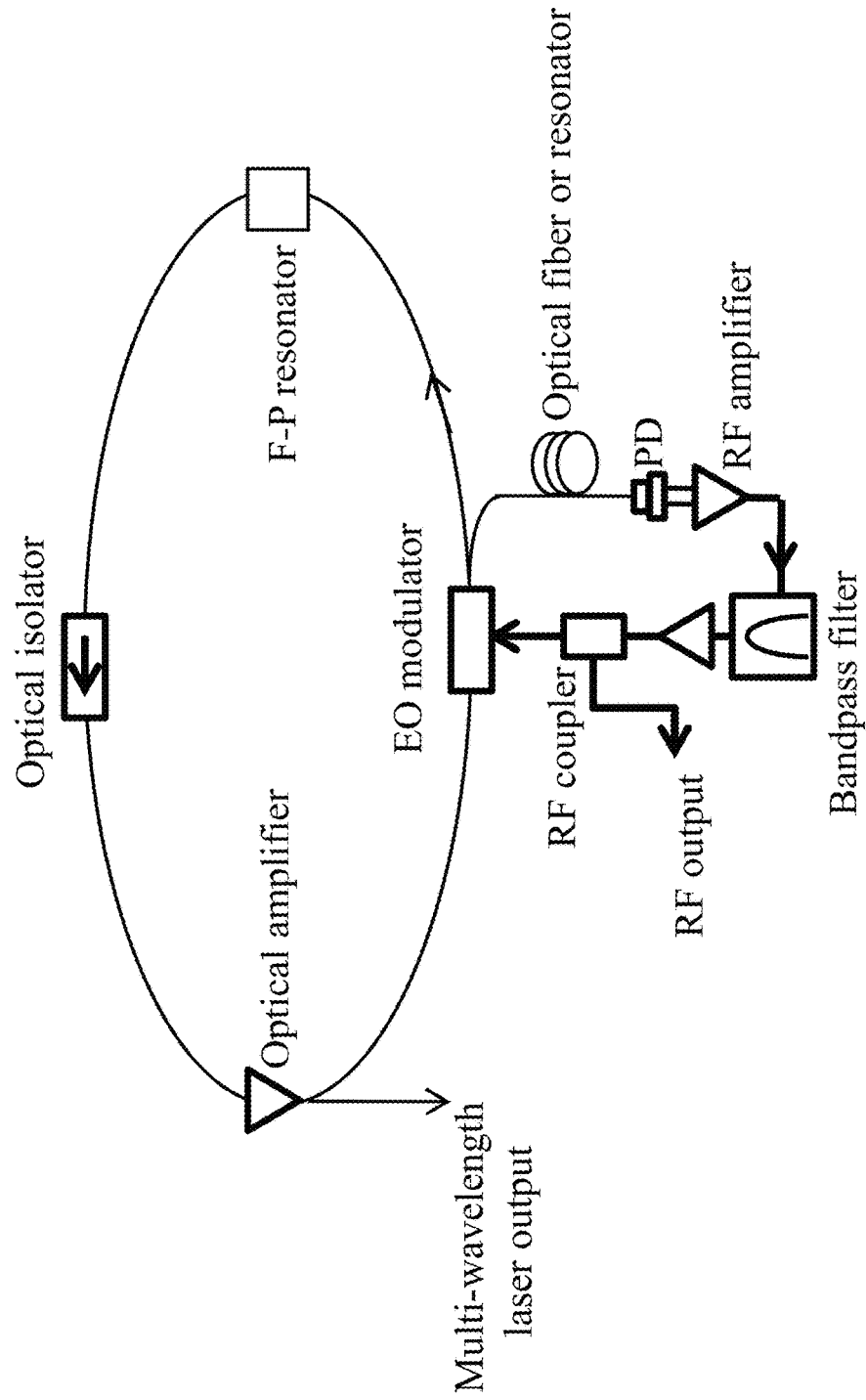
FIG. 15 shows an example of a first embodiment of a coupled electro-optic oscillator for using in FIG. 4. A tunable band-pass filter can be used to replace the fixed band-pass filter to make the COEO tunable to be used in FIG. 8.

FIG. 15 is an example of an embodiment of a coupled electro-optic oscillator (COEO) for using a LiDAR design with a COEO as light source and a rotating beam forming unit for scanning in FIG. 4 or a LiDAR design with a COEO as light source without moving parts as shown in the examples in FIGS. 11A and 11B. This OEO example and other OEO implementations are designed to directly couple a laser oscillation of an optical feedback system to an electrical oscillation of an opto-electronic feedback system. The laser oscillation and the electrical oscillation are coupled to each other and correlated with each other so that both the modes and stability of one oscillation are coupled with another oscillation. Therefore, a COEO includes two mutually coupled oscillation systems, a laser oscillator and an opto-electronic feedback oscillator. The laser oscillator includes an internal active optical feedback loop with a gain medium to effectuate a first loop gain greater than unity and is responsive to an electrical signal. The laser oscillator produces a coherent optical oscillation. The opto-electronic feedback oscillator is essentially an active opto-electronic feedback loop coupled to the laser oscillator and receives an optical signal from the output of the laser oscillator which is indicative of the optical oscillation. The opto-electronic feedback loop includes an optical delay element for producing a delay, a photodetector responsive to intensity variation of input optical signals for converting the optical signal from the optical delay element into an electrical modulation signal and an electrical interface with the laser oscillator to feed electrical modulation signal to the gain medium which modulates the optical gain in the optical feedback loop. The opto-electronic feedback loop is structured to have a second loop gain greater than unity to generate and sustain an electrical oscillation. The coupling of the two loops leads to a specific relation between (1) the loop length of the optical feedback loop in the laser oscillator and (2) the loop length of the opto-electronic feedback loop is necessary so as to make both optical and electrical oscillations stable. One of the advantages of COEOs is that the COEO can be self-oscillating without an external pump laser, although an external laser may be used in a COEO. Therefore, a coupled opto-electronic oscillator can be used to conveniently accomplish single-mode selection with ease even for a system having a very long opto-electronic feedback loop (OEO loop). In addition, a multimode laser can be used with an COEO to pump the electronic oscillation, and to achieve in an efficient operation and reduced manufacturing cost. An COEO can provide a link between the optical and the microwave or RF oscillations, which can be further used for simultaneously generating stable optical pulses and a continuous microwave oscillating signal (e.g., sinusoidal wave).

The COEO example in FIG. 15 includes a ring laser formed by an optical loop with one or more optical waveguides or fiber segments and this optical loop for the ring laser includes, an optical amplifier to produce the laser gain for the ring laser, and an optical modulator such as an EOM or EAM to modulate the laser light in the ring laser. In this specific example, an optical resonator such as a Fabry-Perot resonator is also included in the optical loop of the ring laser to produce an optical delay. An optical isolator may include in the optical loop of the ring laser to ensure the unidirectional light propagation in the ring laser. An optical coupler can be provided in the ring laser to couples a portion of laser light in the ring laser as an optical input labeled as "multi-wavelength laser output" for LiDAR sensing. Another optical coupler is provided at or near the optical modulator in the ring laser to generate an optical output to feed into the optical portion of the OEO loop. As shown in FIG. 15, the OEO loop includes an optical fiber or an optical resonator as part of its optical portion of the OEO loop, a photodetector linking the optical and electrical portions of the OEO loop, an RF amplifier, an RF or microwave bandpass filter and possibly additional elements (an RF coupler, additional RF amplifier etc.) to feed the RF or microwave oscillation signal as the control signal to the EOM or EAM. In this example, the EOM or EAM is the coupling point between the ring laser and the OEO. The ring laser and the OEO collectively form the COEO.

In some implementations, the phase delay of the opto-electronic feedback loop may be larger than the phase delay caused by the loop length of the ring laser, resulting in a corresponding mode spacing in the OEO loop smaller than the mode spacing of the ring laser. For example, the fiber in the optical loop may be a few meters while the fiber in the opto-electronic loop may be over 100 m or even many kilometers. The center frequency of the RF bandpass filter can be chosen to be substantially equal to an RF beat frequency of different optical modes of the ring laser. The bandwidth of the RF filter may be chosen to be narrower than the spacing of the beat frequencies which is equivalently the mode spacing of the ring laser. Within the passband of the RF filter, different OEO modes compete with one another in order to oscillate. However, the dominant mode has a frequency closest to a beat frequency of the ring laser's longitudinal modes so that only this OEO mode can obtain energy from the ring laser and then effectively mode locks the ring laser.

The above mode locking condition may be achieved by adjusting the relative phase delay between the optical loop of the ring and the opto-electronic loop. A correlation between the optical loop length and the loop length of the opto-electronic electronic loop is desirable in order to achieve stable oscillations in both loops and mode-lock the optical loop. The relative phase delay between the ring laser loop and the OEO loop can be adjusted with the RF variable delay in the OEO or other elements including a variable phase delay element in the optical loop such as a fiber stretcher. The relative phase delay between the two loops is so adjusted that one of the RF oscillation modes in the opto-electronic loop is close to or overlaps with a mode beat frequency of the optical loop. Once the ring laser is mode locked, the beating between any two neighboring modes adds in phase to provide a frequency equal to the frequency of the oscillation mode of OEO. This condition reinforces the OEO mode that locks the ring laser. The mode spacing of the mode-locked ring laser is equal to the oscillation frequency of the OEO in the opto-electronic loop and is a multiple of the natural mode spacing of the laser.

The COEO in FIG. 15 is an example of an opto-electronic device that includes a laser, including a laser active optical feedback loop with a first loop gain greater than unity and responsive to an electrical modulation signal to produce a coherent laser oscillation and an opto-electronic feedback loop with a second loop gain greater than unity, receiving an optical signal indicative of the laser oscillation and converting the optical signal into the electrical modulation signal having a relation with the laser oscillation so that the electrical modulation signal affects the laser oscillation in the laser active optical feedback loop.

In another aspect, the COEO in FIG. 15 is a specific implementation of an opto-electronic device that includes an active laser feedback loop with a first loop gain greater than unity and a first loop delay to generate a laser oscillation and having an electro-optical gain element that is operable to affect the first loop gain, and an opto-electronic feedback loop coupled with the active laser feedback loop, having a second loop gain greater than unity and a second loop delay greater than the first loop delay. This opto-electronic loop can include an optical delay line having one end coupled to the active laser feedback loop to receive an optical signal indicative of the laser oscillation and another end connected to a photodetector that converts said optical signal into an electrical modulation signal, an RF delay line having one end connected to the photodetector to receive the electrical modulation signal and another end connected to the electro-optical gain element, and an RF bandpass filter connected in the RF delay line, having a center frequency that is substantially equal to a RF beat frequency of different modes of the active laser feedback loop, whereby the active laser feedback loop is mode-locked to produce pulsed laser oscillations.

In some implementations, a tunable band-pass filter can be used to replace the fixed band-pass filter to make the COEO tunable to be used in the LiDAR design FIG. 8 or in other LiDAR designs in this document.

Figure 16:
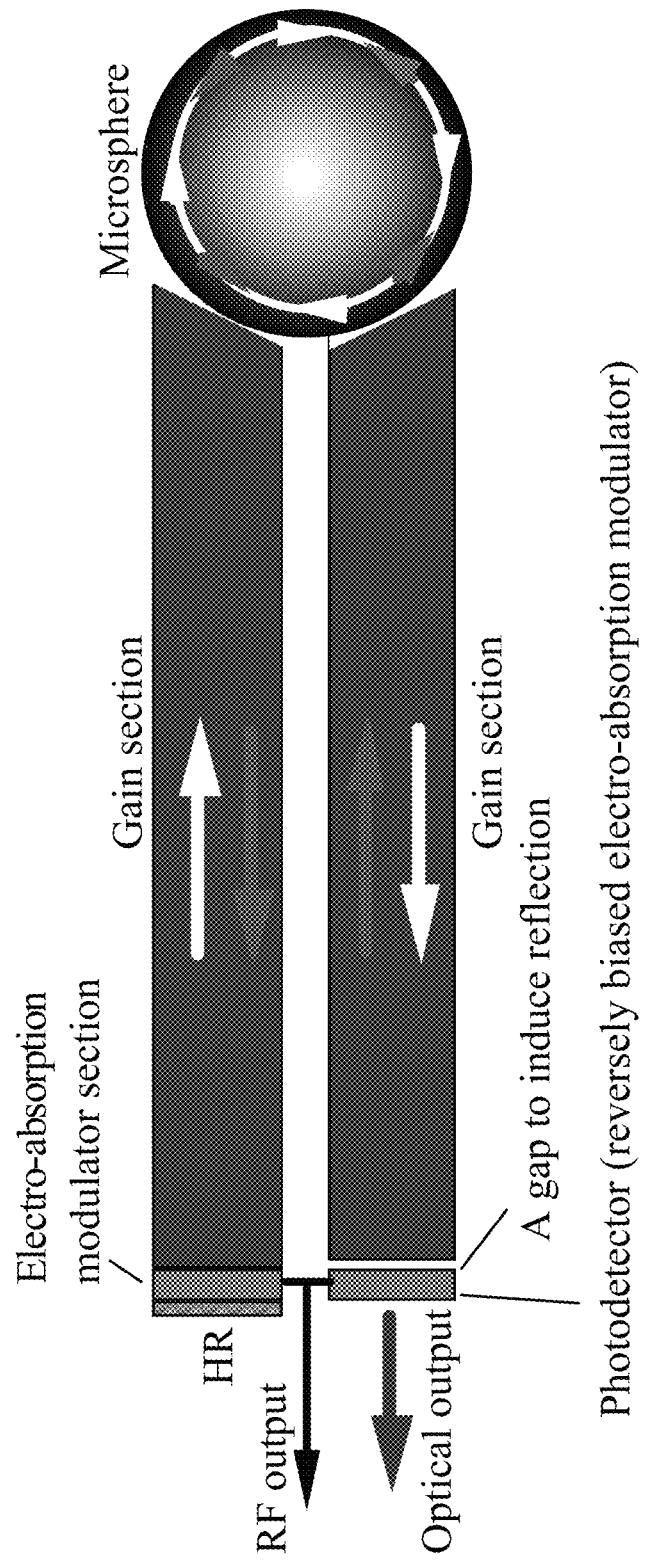
FIG. 16 shows an example of coupled optoelectronic oscillator (COEO) on a chip. The microsphere is an example micro-resonator. Other types of micro-resonators can also be used. The oscillation frequency can be tuned by tuning the resonant frequency of the micro-resonator by either applying a voltage or by changing its temperature. The COEO chip can be made with InGaAs technology.

FIG. 16 is an example of a coupled optoelectronic oscillator (COEO) that is integrated on a chip. The microsphere is an example micro-resonator. Other types of micro-resonators can also be used. The oscillation frequency can be tuned by tuning the resonant frequency of the micro-resonator by changing an operating condition of the micro-resonator, e.g., applying a voltage on the resonator that exhibits an opto-electro effect to change a refractive index of the resonator, a mechanical force to change a dimension of the resonator, or by changing its temperature.

The COEO can be formed over a substrate such as a semiconductor substrate and can include a semiconductor optical modulator formed on the substrate to modulate an optical beam in response to an electrical modulation signal. The COEO in FIG. 16 includes a first waveguide formed on the substrate having a first end that is to receive a modulated optical signal from the optical modulator, and a second end that has an angled facet coupled to the micro-resonator via evanescent coupling, a second waveguide formed on the substrate and having a first end with an angled facet which is coupled to the microresonator via evanescent coupling, and a semiconductor photodetector formed on the substrate to receive and convert an optical output from the second waveguide into an electrical signal. In addition, an electrical link is formed on coupled between the photodetector and the optical modulator to produce the electrical modulation signal from the electrical signal. At least part of the first and second waveguides is doped to produce an optical gain to produce a laser oscillation in a laser cavity formed by the optical waveguides and the microresonator.

The COEO in FIG. 16 for LiDAR systems is an integrated COEO that includes a high-Q optical resonator in an electrically controllable feedback loop. An electro-optical modulator is provided to modulate an optical signal in response to at least one electrical control signal. At least one opto-electronic feedback loop, having an optical part and an electrical part, is coupled to the electro-optical modulator to produce the electrical control signal as a positive feedback. The electrical part of the feedback loop converts a portion of the modulated optical signal that is coupled to the optical part of the feedback loop into an electrical signal and feeds at least a portion of it as the electrical control signal to the electro-optical modulator. The high-Q optical resonator may be disposed in the optical part of the opto-electronic feedback loop or in another optical feedback loop coupled to the opto-electronic feedback loop, to provide a sufficiently long energy storage time and hence to produce an oscillation of a narrow linewidth and low phase noise. The mode spacing of the optical resonator is equal to one mode spacing, or a multiplicity of the mode spacing, of the opto-electronic feedback loop. In addition, the oscillating frequency of the OEO is equal to one mode spacing or a multiple of the mode spacing of the optical resonator. The optical resonator may be implemented in a number of configurations, including, e.g., a Fabry-Perot resonator, a fiber ring resonator, and a microsphere resonator operating in whispering-gallery modes. These and other optical resonator configurations can reduce the physical size of the OEO devices and allow integration of an OEO with other photonic devices and components in a compact package such as a single semiconductor chip.

The above disclosed WDM LiDAR technology can be implemented in various configurations. Some design examples are listed below.

For example, a wavelength division multiplexed (WDM) LiDAR system includes a transmitter unit (TU) which generates a combined optical beam with different wavelengths coupled into a single optical fiber and then passes through an optical modulation device; a fiber optic circulator with a first port connecting to the optical switch device to direct the combined beam of different wavelengths received from the optical switch to a beam forming unit (BFU) connected to the second port of the optic circulator with a fiber optic connector; a wavelength demultiplexing device in the beam forming unit to receive the combined beam, separate the combined beam into different beams according to their wavelengths, and direct the different beams of different wavelengths into different directions in space; a receiver unit (RU) connected with a third port of the optic circulator receives reflected light beams of different wavelengths from the BFU and demultiplexes them into different optical paths to be received by different photodetectors followed by amplifiers and electronic circuitry; a modulation signal generator with a system clock in the receiver unit generates a modulation signal connected to the optical modulation device to modulate the combined light beams; and a signal processing circuit uses the system clock and received signals from different photodetectors to determine the distances of reflections in the paths of the optical beams of different wavelengths. FIG. 2 shows a specific example of this design. In some implementations, the transmitter unit in Design 1 includes a wavelength division multiplexer and multiple lasers with different wavelengths to generate the combined beam of different wavelengths For another example, a WDM LiDAR system can be implemented by implementing the transmitter unit by including a multi-wavelength optical source as illustrated by the example in FIG. 3. In implementations, the multi-wavelength source may include a mode-locked laser (FIG. 3) a coupled opto-electronic oscillator (COEO) (FIG. 4).

In implementing an optical transmitter with the optical modulation device, the optical modulation device can include an electro-optic modulator or electro-absorption modulator or a semiconductor optical amplifier.

In implementing a WDM LiDAR system, the optical transmitter may be in an integrated configuration in which the lasers for producing light at the different WDM wavelengths, the wavelength division multiplexer, the optical switching device and other components can be integrated on a single photonics integrated circuit as shown by an example in FIG. 9A.

In some implementations, the wavelength division multiplexer can be implemented based on various WDM technologies, including, for example, an arrayed waveguide grating, a thin film coated filter, or a diffraction grating.

In some implementations, the beam forming unit in a WDM LiDAR system can be coupled to and rotated by a motor stage to rotate continuously to cover 360 degree azimuths field of view.

In some implementations, the wavelength demultiplexing device in the beam forming unit can include a beam collimator and a diffraction grating to direct light beams of different wavelengths into different directions as shown by the examples in FIGS. 2-8.

In some implementations, the wavelength demultiplexing device inside the beam forming unit is structured and configured to vertically spread the beams of different wavelengths to cover a vertical field of view for the LiDAR operation.

In some implementations, the beam forming unit can include a wavelength division multiplexer coupled to fibers or waveguides carrying the different WDM beams in which the tips of fibers or waveguides are arranged in a one dimensional array and each fiber or waveguide tip is placed in the focal plane of an array of different lenses in one dimensional array with a fiber or waveguide being at a defined offset from the center line of a corresponding lens to collectively form an one dimensional beam spread. FIG. 9C shows one such an example.

In some implementations, the wavelength demultiplexing device in the beam forming unit can include a wavelength division multiplexer coupled to the tips of fibers or waveguides arranged in a one dimensional array for respectively carrying different WDM channels and the tips of the waveguides or fibers are placed in the focal plane of a common lens to form a one dimensional beam spread as shown in the example in FIG. 9D.

In some implementations, the beam forming unit can include a wavelength division multiplexer coupled to the tips of fibers arranged in a two dimensional array and the tips are placed in the focal plane of a common lens to form a cluster of beams of different wavelengths and pointing angles with a two dimensional beam spread. This is shown in the example in FIG. 10.

Some implementations of a WDM LiDAR system can include more than one beam forming units to form more than one clusters of beams of different wavelengths and different pointing angles, together with the corresponding transmitter units and receiver units to increase the azimuth field of view or vertical field of view without moving beams. Two examples are shown in FIGS. 11A and 11B.

In some implementations, the receiver unit can include an optional optical amplifier to amplify received reflected light beams and a wavelength division de-multiplexer to separate reflected light beams of different wavelengths into different photodetectors. The wavelength division demultiplexing device may be structured to include a diffraction grating and a focusing lens to focus beams of different wavelengths to the corresponding photodetectors in a detector or an array of detectors such as a CCD array. See the example in FIG. 5. The optical amplifier, the wavelength division demultiplexer, the photodetectors may be integrated on a single photonics integrated circuit, as illustrated by the example in FIG. 9B. Also, the wavelength division demultiplexer can be implemented by using various technologies, including, for example, an arrayed waveguide grating, a diffraction grating, or a thin film filter coating.

In some implementations of the WDM LiDAR systems, the modulation signal generator can be used to generate short pulses to modulate the combined optical beam via the optical switching device. See the examples in FIGS. 2 and 3. The modulation signal generator may generate a sinusoidal signal of linearly varying frequencies to modulate the combined optical beam via the optical switching device as shown by examples in FIGS. 6 and 7.

In some implementations, the signal processing unit is operated to determine the distances of reflections by comparing the timing difference between the system clock and received signals in the receiver unit. See the examples in FIGS. 2 and 3.

In some implementations, the signal processing unit is operated to determine the distances of reflections by mixing the received signal from a photodetector in the receiver unit with the sinusoidal signal of linearly varying frequencies in a mixer, passing the output from the mixer through a low pass filter, and taking FFT with the filtered signal. See the examples in FIGS. 6 and 7.

In some implementations, the beam forming unit can include an optical connector connecting the optical circulator and the beam forming unit in form of a rotary connector as shown in the examples in FIGS. 2-8.

In some implementations, a signal processor is operated to calculate and obtain a 3-dimensional point cloud map using the information of the identification of photodetectors designated to the different WDM wavelength channels, the motor encoder angle, and the distances of the reflections.

The disclosed technology can be used to provide a method a LiDAR system without beam scanning as illustrated in examples shown in FIGS. 2-8. Such a method can include generating a combined optical beam with more than one defined wavelengths and directing it to an optical modulation device; modulating the combined optical beam with a modulation signal referenced to a system clock; receiving the modulated combined optical beam and demultiplexing the combined beam with a first wavelength division multiplexing/demultiplexing device into different beams according to their wavelengths; Sending different beams of different wavelengths into different directions in space to be reflected as reflected beams; multiplexing reflected beams using the first wavelength division multiplexing device into a second combined beam and sensing it to a receiving unit; and separating the second combined beam into different optical paths according to wavelengths and routing the separated beams at the different wavelengths into different photoreactors with a second wavelength division multiplexing device to produce different detector signals, with each photodetector labeled with a photodetector number corresponding to a designated wavelength. This method further includes Processing the detector signals together with the system clock to determine the distances of reflections and combining the information of the photodetector number and reflection distance to determine the position of the reflections in space and obtaining the corresponding point cloud map.

In some implementations of the above method, the operation for generating a combined beam with more than one defined wavelength can use a wavelength division multiplexing device to multiplex lasers with different wavelengths into a single optical fiber or waveguide (e.g., FIGS. 2,6); the operation for generating a combined beam with more than one defined wavelength can be based on various technologies, including, for example, a multi-wavelength laser source, a mode-locked laser, a frequency comb, or a coupled opto-electronic oscillator (e.g., FIGS. 3-5); the wavelength multiplexing may be achieved via various technologies, including, for example, using an arrayed waveguide grating, a diffraction grating, or a thin film coated filter; the sinusoidal modulation with a linear frequency chirp may be generated by an opto-electronic oscillator configuration; the pulses may be generated by a coupled opto-electronic oscillator configuration; the step of sending different beams of different wavelengths into different directions in space may be accomplished by a fiber optic collimator followed by a diffraction grating (e.g., FIGS. 2-8); and the step of sending different beams of different wavelengths into different directions in space may be accomplished by the following sub-steps: demultiplexing the combined beam into different optical fibers or waveguides; arranging the tips of the optical fibers or the waveguides in a 2-dimensional array; placing the 2-dimensional array in the focal plane of a lens. (FIGS. 9-11)

In some implementations of the disclosed WDMLiDAR systems or methods, the system clock can be generated by an electronic oscillator, an opto-electronic oscillator, or a coupled opto-electronic oscillator (e.g., FIGS. 2-8); or the modulation signal may be in one of the following format: short pulses, sinusoidal modulation with a linear frequency chirp, OKK, return-to-zero, duel binary, DPSK, QPSK, or PAM4.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is what is disclosed or/and illustrated, including:

1. A light detection and ranging (LiDAR) device, comprising:
   a plurality of different photonic chips formed on separate substrates, respectively, wherein the different photonic chips are engaged and stacked with one another and each photonic chip carries laser light at different laser wavelengths; and
   a lens spaced from the different photonic chips and shared by the different photonic chips to receive light from the different photonic chips and to direct returned light back to the different photonic chips,
   wherein each photonic chip includes:
   an optical circulator or coupler supported by a corresponding substrate to receive an optical beam of laser light at different laser wavelengths and re-direct the optical beam;
   a first wavelength division demultiplexing device supported by the substrate to receive the optical beam from the optical circulator or coupler and to separate the received optical beam into different optical beams at the different laser wavelengths, respectively;
   an array of optical waveguides supported by the substrate and structured to include first waveguide ports, respectively, which are coupled to receive the different optical beams at the different laser wavelengths, respectively, from the first wavelength division demultiplexing device, and second waveguide ports, respectively, which output the different optical beams at the different laser wavelengths received by the optical waveguides as different output optical beams at the different laser wavelengths, respectively, wherein each optical waveguide is designed to carry light at a designated laser wavelength of the different laser wavelengths;

wherein the lens shared by the different photonic chips is spaced from the second waveguide ports by a distance equal to or near a focal length of the lens to receive the different output optical beams at the different laser wavelengths, respectively, to direct each output optical beam to a unique beam direction based on a position of a corresponding second waveguide port of the each waveguide relative to the lens so that each output optical beam directed from each of the differently located second waveguide ports is directed by the lens to a different direction after passing through the lens, wherein the lens is further operable to receive and direct returned light at the different laser wavelengths to the second waveguide ports, respectively, so that each waveguide used to carry a designated laser wavelength is to receive and direct a returned optical beam at the same designated laser wavelength to the first wavelength division demultiplexing device which combines different returned optical beams at the different laser wavelengths as a combined returned beam of light at the different laser wavelengths to the optical circulator or coupler;

a second wavelength division demultiplexing device supported by the substrate and located relative to the optical circulator or coupler to receive the combined returned beam from the optical circulator or coupler, wherein the second wavelength division demultiplexing device is operable to separate the combined returned beam into different returned optical beams at the different laser wavelengths, respectively; and an optical detector array of photodetectors supported by the substrate and coupled to receive the different returned optical beams at the different laser wavelengths from the second wavelength division demultiplexing device, respectively, to produce different detector output signals from the different returned optical beams at the different laser wavelengths for optical sensing.

2. The device as in claim 1, wherein each light source includes an optical comb generator.

3. The device as in claim 2, wherein the light source includes a coupled opto-electronic oscillator.

4. The device as in claim 1, wherein each photonic chip includes a semiconductor optical amplifier and located to receive the optical beam at the different laser wavelengths to amplify and modulate the optical beam at the different laser wavelengths to produce optical pulses at the different laser wavelengths that are directed to the first wavelength division demultiplexing device.

5. The device as in claim 1, wherein the first or second wavelength division demultiplexing device in each photonic chip includes an arrayed waveguide grating.

6. The device as in claim 1, further comprising a positioning device engaged to adjust a relative position between the lens and the different photonic chips.

7. The device as in claim 1, wherein the lens includes an aspheric lens.

8. The device as in claim 1, further comprising:
a detection circuit coupled to receive and process different detector output signals from each optical detector array and from different optical detector arrays in the different photonic chips for LiDAR sensing, wherein the detection circuit is configured to apply time of flight measurements in processing the different detector output signals from each optical detector array and from different optical detector arrays in the different photonic chips for determining distances of objects that reflect back the returned light back to the different photonic chips for LiDAR sensing.

9. The device as in claim 1, comprising one or more light sources for producing the optical beams carried by the different photonic chips,
wherein two or more of the photonic chips share one common light source by vertically coupling laser light from one chip.

10. The device as in claim 1, comprising different light sources in the different photonic chips, respectively, to produce different optical beams that include laser light at different laser wavelengths so that a light source on one photonic chip produces laser light at different laser wavelengths.

11. The device as in claim 10, wherein the different laser wavelengths produced by a light source in one photonic chip is different from the different laser wavelengths produced by another light source in another one photonic chip.

12. The device as in claim 1, further comprising:
a detection circuit coupled to receive and process different detector output signals from each optical detector array and from different optical detector arrays in the different photonic chips for LiDAR sensing,
wherein the detection circuit is configured to provide information of lateral locations of objects detected in the target space based on the wavelength information of the different wavelengths received at optical detectors of the optical detector arrays; and timing information from detector signals from the optical detectors of the optical detector arrays in the different photonic chips to determine distance information of objects detected in the target space from the center of the lens, and
wherein the information of lateral locations of objects detected in the target space and the determined distance information of objects detected from the center of the lens are used to obtain a 3-D mapping of the objected detected in the target space.

* * * * *